(12) United States Patent  
Moran

(10) Patent No.: US 6,430,542 B1
(45) Date of Patent: Aug. 6, 2002

(54) COMPUTER-IMPLEMENTED PROGRAM FOR FINANCIAL PLANNING AND ADVICE SYSTEM

(75) Inventor: William J. Moran, Minnetonka, MN (US)

(73) Assignee: American Express Financial Corporation, New York, NY (US)

( * ) Notice: Subject to any disclaimer, the term of this patent is extended or adjusted under 35 U.S.C. 154(b) by 0 days.

(21) Appl. No.: 09/141,013

(22) Filed: Aug. 26, 1998

Related U.S. Application Data

(63) Continuation-in-part of application No. 08/684,344, filed on Oct. 6, 1998, now Pat. No. 5,819,263.

(51) Int. Cl.[7] ............................................. G06F 17/60
(52) U.S. Cl. ........................................... 705/36; 705/35
(58) Field of Search .............................. 705/67, 35, 36; 706/62; 707/503; 713/172, 180; 235/379–380; 345/338; G06F 17/60

(56) References Cited

U.S. PATENT DOCUMENTS 4,588,192 A * 5/1986 Laborde ...................... 273/240
4,864,110 A * 9/1989 Guillou ....................... 235/380

(List continued on next page.)

FOREIGN PATENT DOCUMENTS

| EP | 1105815 A1 | * | 6/2001 | G06F/17/21 |
|----|------------|---|--------|------------|
| JP | 405225222 A | * | 9/1993 | G06F/15/30 |
| JP | 411007476 A | * | 1/1999 | G06F/17/60 |
| JP | 02001051974 A | * | 2/2001 | G06F/17/18 |
| JP | 02001125962 A | * | 5/2001 | G08F/17/60 |

OTHER PUBLICATIONS

Verschoor, The new PFP pronouncement, from CPA Journal, v63n7, pp.68–69, Jul. 1993.*

Bernstein, New guidance on personal financial planning engagement functions and responsibilities, from Journal of Accountancy, v174n6, pp. 111–115, Dec. 1992.*

Ferrara et al., Highlights of the 28th annual Institute of Securities Regulation . . . , from S&P's Review of Securities & Commodities Regulation, from p. 109, vol. 30 No. 8, Apr. 1997.*

(List continued on next page.)

Primary Examiner—Cuong Nguyen
(74) Attorney, Agent, or Firm—Snell & Wilmer L.L.P.

(57) ABSTRACT

The present financial planning and advice system allows an advisor to provide proactive, efficient service to clients. An advisor can analyze a client's relationship(s) with his/her family, business and pension to provide overall financial planning and security. The financial planning and advice system includes numerous innovative, coordinated features including, inter alia, demographic and financial data files, a Virtual Executor, a financial Simulator, an Earmarker, a Strategizer, and a Proposal Constructor. For example, Virtual Executor preferably simulates the steps required to settle a person's estate from the moment of death until all property, net of costs and taxes, is suitably distributed to survivors (i.e., surviving family members, etc.). Virtual Executor suitably determines the legal survivors of the decedent, and suitably transfers to financial Simulator the net amounts passing to the survivors. As another example, Financial Simulator not only simulates the results of Virtual Executor disbursement, but it also simulates the combination of the disbursements and the resources already belonging to the survivors before the death occurred.

78 Claims, 52 Drawing Sheets

U.S. PATENT DOCUMENTS

| | | | |
|---|---|---|---|
| 5,319,543 A | | 6/1994 | Wilhelm .................. 705/3 |
| 5,319,777 A | | 6/1994 | Perez .................... 707/10 |
| 5,361,199 A | | 11/1994 | Shoquist et al. .......... 705/26 |
| 5,371,675 A | | 12/1994 | Greif et al. ............ 707/503 |
| 5,410,634 A | * | 4/1995 | Li ...................... 706/62 |
| 5,410,693 A | | 4/1995 | Yu et al. ............... 707/100 |
| 5,452,416 A | | 9/1995 | Hilton et al. ........... 345/346 |
| 5,471,575 A | * | 11/1995 | Guillou ................. 235/380 |
| 5,546,577 A | | 8/1996 | Marlin et al. ........... 707/103 |
| 5,611,048 A | | 3/1997 | Jacobs et al. ........... 713/202 |
| 5,649,192 A | | 7/1997 | Stucky .................. 707/103 |
| 5,652,908 A | | 7/1997 | Douglas et al. ........... 714/4 |
| 5,694,561 A | | 12/1997 | Malamud et al. |
| 5,774,881 A | | 6/1998 | Friend et al. |
| 5,819,263 A | | 10/1998 | Bromley et al. |
| 5,857,176 A | | 1/1999 | Ginsberg |
| 5,884,287 A | | 3/1999 | Edesess |
| 5,911,136 A | | 6/1999 | Atkins |
| 5,918,217 A | | 6/1999 | Maggioncalda et al. |
| 5,933,815 A | | 8/1999 | Golden |
| 6,012,043 A | | 1/2000 | Albright et al. |
| 6,021,397 A | | 2/2000 | Jones et al. |
| 6,055,517 A | * | 4/2000 | Friend et al. ............ 705/36 |
| 6,058,376 A | | 5/2000 | Crockett |
| 6,061,662 A | | 5/2000 | Makivic |
| 6,064,984 A | | 5/2000 | Ferguson et al. |
| 6,078,904 A | | 6/2000 | Rebane |
| 6,085,175 A | | 7/2000 | Gugel et al. |
| 6,125,355 A | | 9/2000 | Bekaert et al. |
| 6,154,732 A | | 11/2000 | Tarbox |
| 6,275,814 B1 | * | 8/2001 | Giansante et al. ......... 705/36 |
| 6,321,205 B1 | * | 11/2001 | Eder ..................... 705/7 |
| 6,330,543 B1 | * | 12/2001 | Kepecs .................. 705/14 |

OTHER PUBLICATIONS

From Dialog(R) file 148, Structured financing techniques . . . , Business Lawyer, 50, n2, 527–606, Feb. 1995.*

Katinsky, Pension world's Mar. 1993 software product directory, from Pension World, v29n3, pp. 27–52.*

Gerlach, The Japanese Corporate Network: A Blockmodel Analysis, from Administrative Science Quarterly, v27n1, pp. 105–139, Mar. 1992.*

Robinson et al., Economics, culture, and accounting standards . . . , from Canadian Journal of Administrative Sciences, v13n2, pp. 119–131, Jul. 1993.*

Shaw, et al., "Microsoft Office 6 in 1", Que Corporation, (1994), pp. 608–609, 631–633, 713–717.

* cited by examiner

LIABILITIES: BURKE, CRAIG AND MELANIE

$ LIABILITIES

CATEGORY SETS DEFAULT VALUES FOR OTHER FIELDS.

*INDICATES REQUIRED FIELDS.

- PAYMENT ON AN INSTALLMENT LOAN SHOULD INCLUDE PRINCIPAL AND INTEREST ONLY.

- TO ENTER RELATED PAYMENTS GO TO EXPENSES, HOUSING REAL ESTATE TAXES, PREMIUMS, HO, OR HOUSING OTHER.

- INTEREST ON THIS LOAN IS TREATED AS AN ITEMIZED DEDUCTION IN THE INCOME TAX ANALYSIS.

- IF ADDITIONAL PRINCIPAL PAYMENTS HAVE BEEN MADE ON AN INSTALLMENT LOAN, SEE HELP.

171 →

LIABILITY DETAIL
CATEGORY: SECOND RESIDENCE — 316
DESCRIPTION: SECOND RESIDENCE — 317
RELATED ASSET: NONE — 318  ADD ASSET — 319
DEBTOR: CRAIG & MELANIE — 320
PAYMENT TYPE: ○ INSTALLMENT  ○ REVOLVING CREDIT  ○ INTEREST ONLY — 322
CALCULATION METHOD: ○ USE CURRENT LOAN INFORMATION  ○ USE ORIGINAL LOAN INFORMATION — 323
INTEREST RATE: 0.0%    ORIGINAL BALANCE: $0
PAYMENT: $0    ORIGINATION DATE:
FREQUENCY: MONTHLY    TERM IN MONTHS: 360
CURRENT BALANCE: $0    BALLOON DATE:
ADD PRINCIPAL PMT $0    SOLVE FOR UNKNOWN: SOLVE FOR — 324
PAID AT DEATH  ☑ CRAIG    ☑ MELANIE — 325

SAVE/RETURN — 111    SAVE/ADD ANOTHER — 197    CANCEL — 27    HELP — 39

CURRENT

| | ⊢——— CURRENT ———⊣ | | | ⊢——— ALTERNATE ———⊣ | | |
|---|---|---|---|---|---|---|
| GOALS | ASSETS STILL NEEDED | SAVINGS OR INCOME NEEDED | CALC TIME | ASSETS STILL NEEDED | SAVINGS OR INCOME NEEDED | CALC TIME |
| CASH RESERVE | | | 0:03 | | | 0:03 |
| EDUCATION: KATIE | | | 0:07 | | | 0:07 |
| EDUCATION: KELLY | | | 0:07 | | | 0:07 |
| RETIREMENT | | | 0:20 | | | 0:20 |
| DISABILITY: CAROL | | | 0:20 | | | 0:20 |
| DISABILITY: DAVID | | | 0:20 | | | 0:20 |
| DEATH: CAROL | | | 0:20 | | | 0:20 |
| DEATH: DAVID (MULTIPLE) | | | 2:50 | | | 2:50 |
| NET WORTH | | | 0:01 | | | 0:01 |
| CASH FLOW | | | 0:02 | | | 0:02 |
| INCOME TAX | | | 0:04 | | | 0:04 |
| ESTATE | | | 0:20 | | | 0:20 |
| ASSET MANAGEMENT | | | 0:01 | | | 0:01 |

CALCULATION STATUS

ALL GOALS NEED TO BE CALCULATED

SELECTED GOALS CALC. TIME 0:00

ALL GOALS CALC. TIME 9:50

CURRENT AND ALTERNATE GOALS ARE CALCULATED AT THE SAME TIME

CALCULATION RATES

CALCULATE SELECTED | CALCULATE ALL

OPEN EARMARK STATUS | OPEN TEXT STATUS | CLOSE | HELP

FIG.31

COMPUTER-IMPLEMENTED PROGRAM FOR FINANCIAL PLANNING AND ADVICE SYSTEM

RELATION TO OTHER DOCUMENTS

This patent is CIP of U.S. patent application Ser. No. 08/684,344 issued Oct. 6, 1998 as U.S. Pat. No. 5,819,263 to inventors John W. Bromley, et al. and assigned to American Express Financial Corporation, the entire contents of which are herein incorporated by reference.

TECHNICAL FIELD OF THE INVENTION

The present invention generally relates to a computer-implemented program for a financial planning and advice system, and more particularly, to a computer-implemented program to assist financial advisors in performing financial simulations and other tasks for clients and prospective clients.

BACKGROUND OF THE INVENTION

To achieve their personal and financial objectives in a prudent and thoughtful manner, investors typically seek a long-term relationship with a trusted and knowledgeable financial advisor. An advisor typically establishes strong one-on-one relationships with clients by consulting with clients regarding their goals and objectives, preparing a financial plan, and eventually conducting financial transactions for the clients. Thus, investors put a large amount of trust in their advisor.

Because a large segment of the financial planning and advising industry is transaction based, a successful advisor, typically should initiate, build, and maintain a long-term advisory relationship with each client. Therefore, in order to remain competitive, all barriers to acquiring a client and maintaining a relationship (i.e., service delays and errors, lack of information, poor product performance, and the like) should be identified and substantially reduced. Hence, advisors are continually searching for the best method to foster and maintain relationships with clients.

As the market demand for financial consulting continues to expand, more companies are hiring advisors to acquire and service clients. In order to assist new and existing advisors in finding, creating a rapport, gaining the trust, and ultimately obtaining the business of prospective clients, many companies have found that increased contact between the home office and the advisor is highly desirable. To maintain this close contact, the advisor should know most of the financial products which are provided by his or her company in order to address the client's questions and concerns.

However, in practice, an advisor typically does not maintain sufficient contact with his or her home office. The lack of communication between the field and the home office often results in reinventing effective methods and systems in different locations. In fact, in many financial planning and advice systems, advisors keep their personal client information locally on a closed system apart from the facilities of the home office. Thus, advisors using an exclusively local database are often required to re-enter corporate data multiple times as they work through the planning process with clients. Failure to properly enter and receive the desired information often creates delays and errors which may lead to a loss of clients. Therefore, a system is needed which allows an advisor to directly communicate with a continuously updated host database (located at a home office), and provide clients with real time and current information.

To provide these services, advisors typically need an effective financial planning and advisory system which has the capability of analyzing future financial options. For many years, the financial planning industry has attempted to create an optimal system to service its clients. Because companies are often concerned that their advisors spend too much time performing administrative or clerical tasks not related to client development, a financial planning and advising system needs to allow the advisor to concentrate on customer service.

Goal tracking is an aspect of customer service which corporations often inefficiently organize. At any time, clients usually want to know how their financial portfolio is performing in relation to their goals. In other words, clients want to know "How am I doing?" and "How close am I to my goal?" Advisors should have "real time" access to client data, transaction records, and client history in order to solve problems, answer client questions, provide information for scheduled client reviews, and track clients' goals. The ability to provide immediate answers to a client helps support the relationship sought between the advisor and the client. Currently available systems, presentation tools, and data integration methods are often cumbersome, slow, antiquated, and manually intensive such that they do not meet the growing needs of field advisors. A user friendly financial planning and advising system is needed to assist advisors in using information to create marketing plans, provide base information, and facilitate the transfer of information from advisors to marketing specialists in the home office.

Furthermore, a client typically expects an appropriate amount of information in clear and easy-to-understand statements from the advisor. A need exists for an improved financial planning and advising system within which an advisor may personalize a plan's contents to each client's unique situation and preferences.

Currently available financial planning and advising systems often suffer from the principal disadvantages of not being tailored to financial planners and not being able to perform creative financial planning with funds distribution analysis. Thus, the limited data found in existing systems typically does not provide enough information for the advisor to effectively service clients. Current systems also do not often have the ability to perform hypothetical "what if" financial scenarios, conduct creative searches, and perform key activities from these search results. As a result, client relations may suffer due to the lack of an efficient system for providing information to the clients; thereby resulting in clients receiving unsound advice.

The foregoing explanation indicates that while conventional computer-implemented financial planning and advising systems exist, they each suffer from the principal disadvantages of not being able to provide sufficient information, manage groups of clients, conduct creative simulations, and perform key financial planning activities from these results. A system and method is needed for providing financial planning and advising which overcomes the shortcomings of the prior art.

SUMMARY OF THE INVENTION

The financial planning and advising system of the present invention includes numerous innovative and coordinated features including, inter alia: a user friendly interface; unique grouping capabilities; a Virtual Executor; a financial Simulator; an Earmarker; a Strategizer; a Data Wrapper representative of real world grouping of assets, liabilities, income, and expenses; and a Proposal Constructor. As an example of the innovative features of the present invention, the Virtual Executor simulates the steps required to settle a person's estate, including all steps from the moment of death until all property, net of costs and taxes, is suitably distributed to survivors (i.e., surviving family members, etc.). The Virtual Executor also suitably determines the legal survivors of the decedent, and transfers the net amounts passing to the survivors to the financial Simulator. As another example, the financial Simulator simulates the results of Virtual Executor disbursement and combines the disbursements with the resources already belonging to the survivors before the death of the family member. These and other objects, features and advantages of the present invention will become more apparent to those skilled in the art from the following more detailed description of the non-limiting preferred embodiments of the invention taken with reference to the accompanying Figures.

BRIEF DESCRIPTION OF THE DRAWING FIGURES.

Preferred exemplary embodiments of the present invention will hereinafter be described in conjunction with the appended drawing figures, wherein like numerals denote like elements and:

FIG. 24 is an exemplary screen shot of the Liabilities Template window in a preferred embodiment of the present invention;

FIG. 25 is an exemplary screen shot of the Policies Template window in a preferred embodiment of the present invention;

FIG. 31 is an exemplary screen shot of the Analysis Status window in a preferred embodiment of the present invention;

FIG. 37 is an exemplary screen shot of a data field shown in

Figure 36:
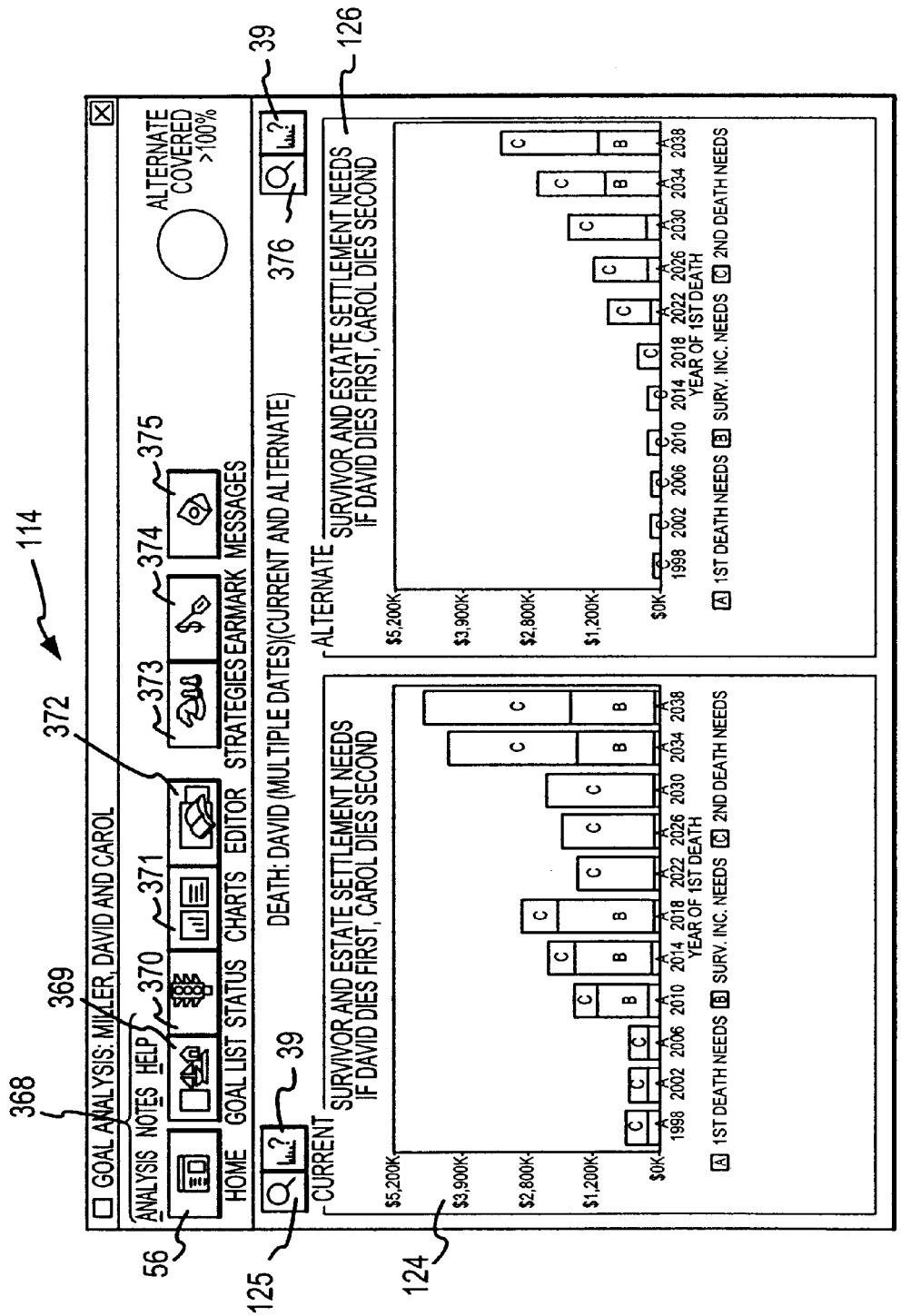
FIG. 36 is an exemplary screen shot of the Goal Analysis window in a preferred embodiment of the present invention.
Figure 38:
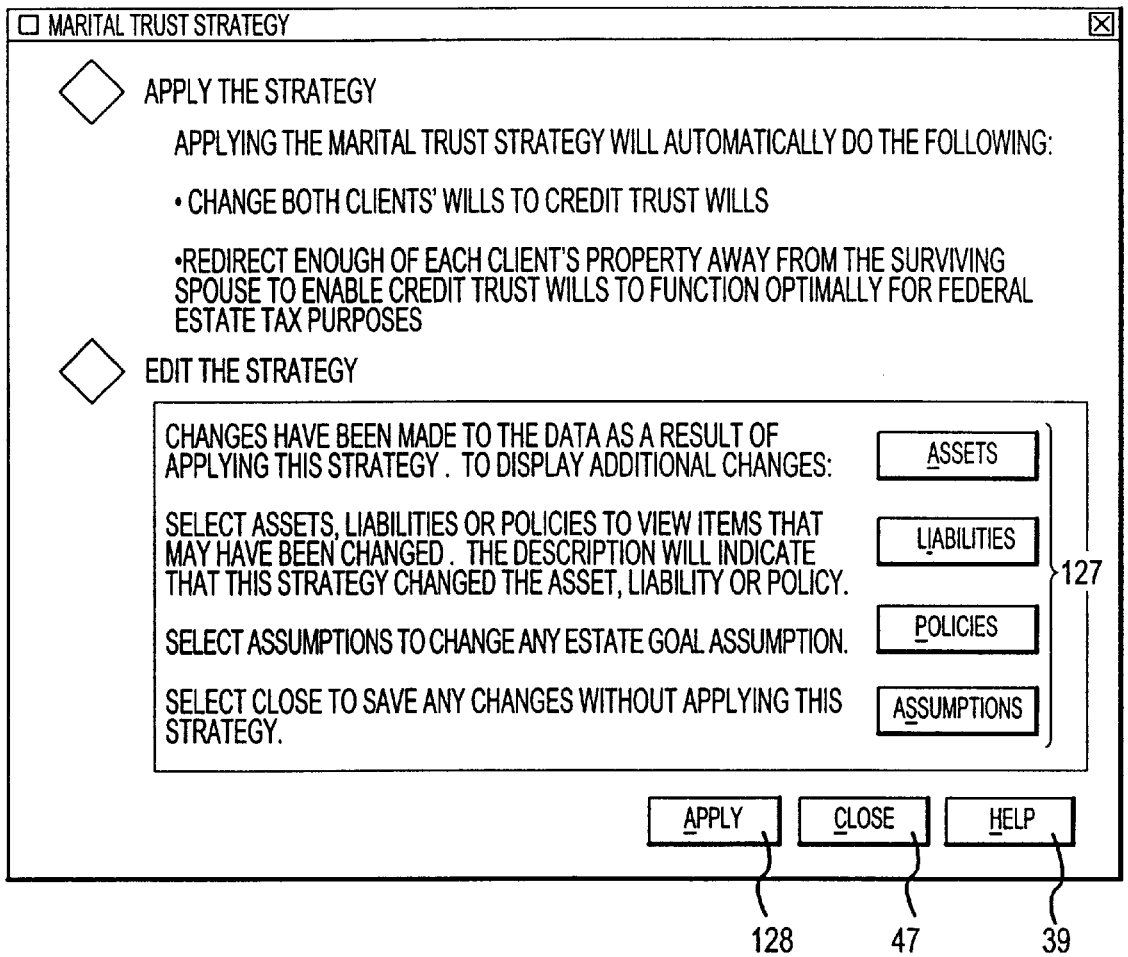
Figure 39:
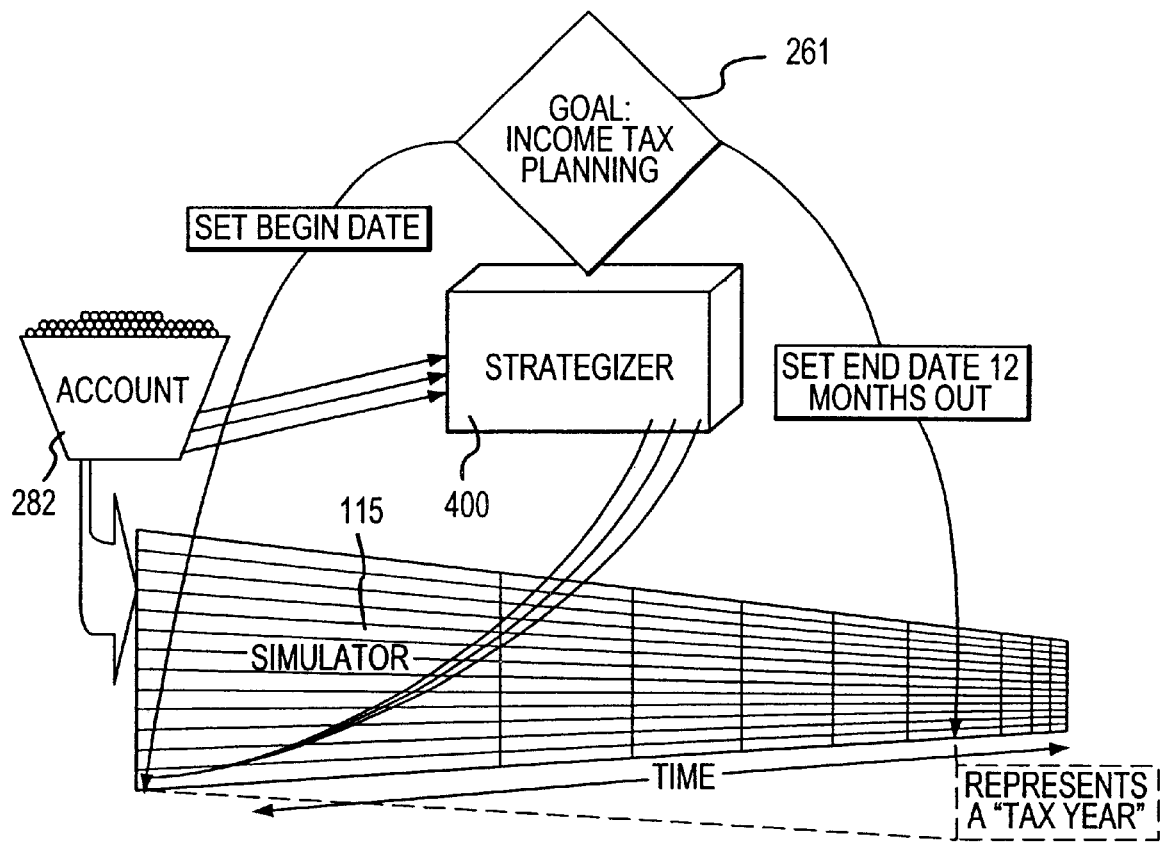
Figure 40:
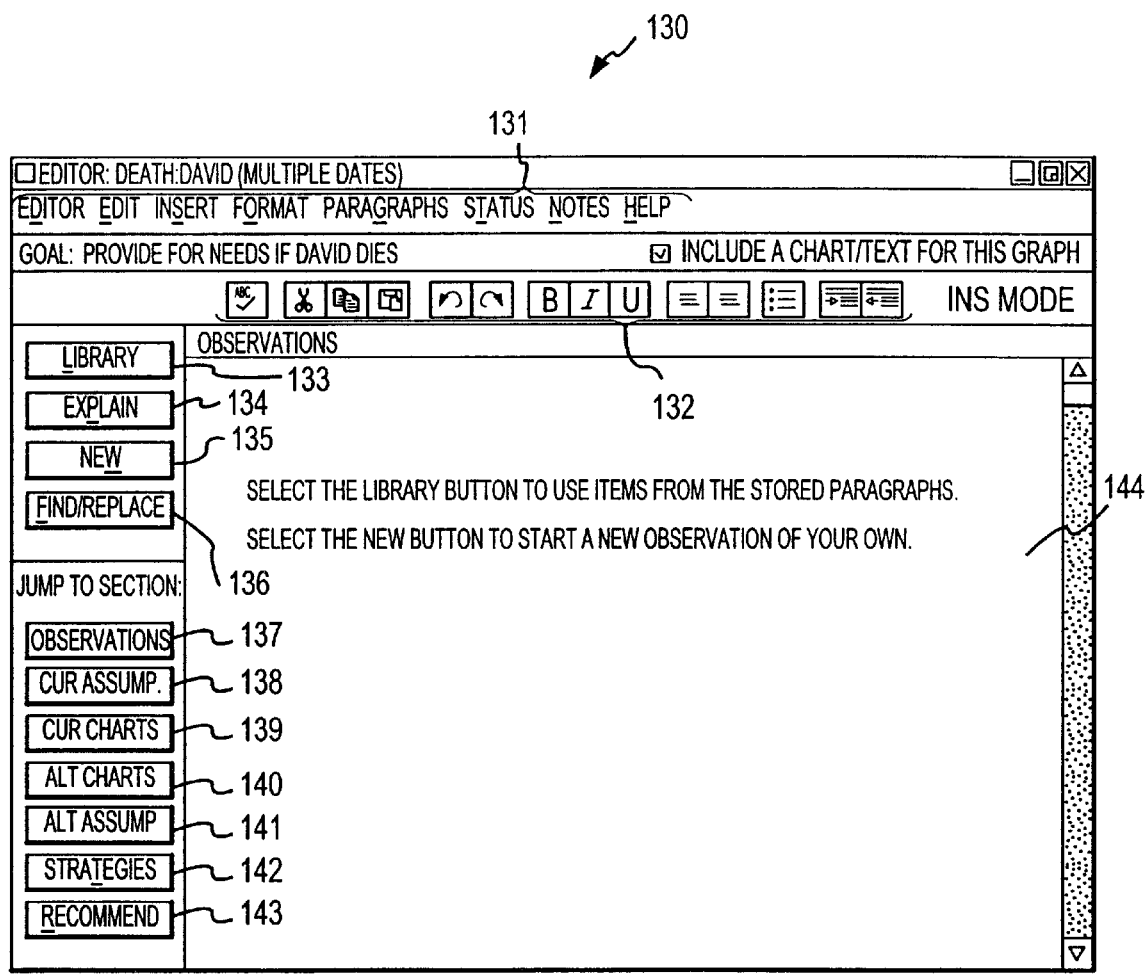
Figure 41:
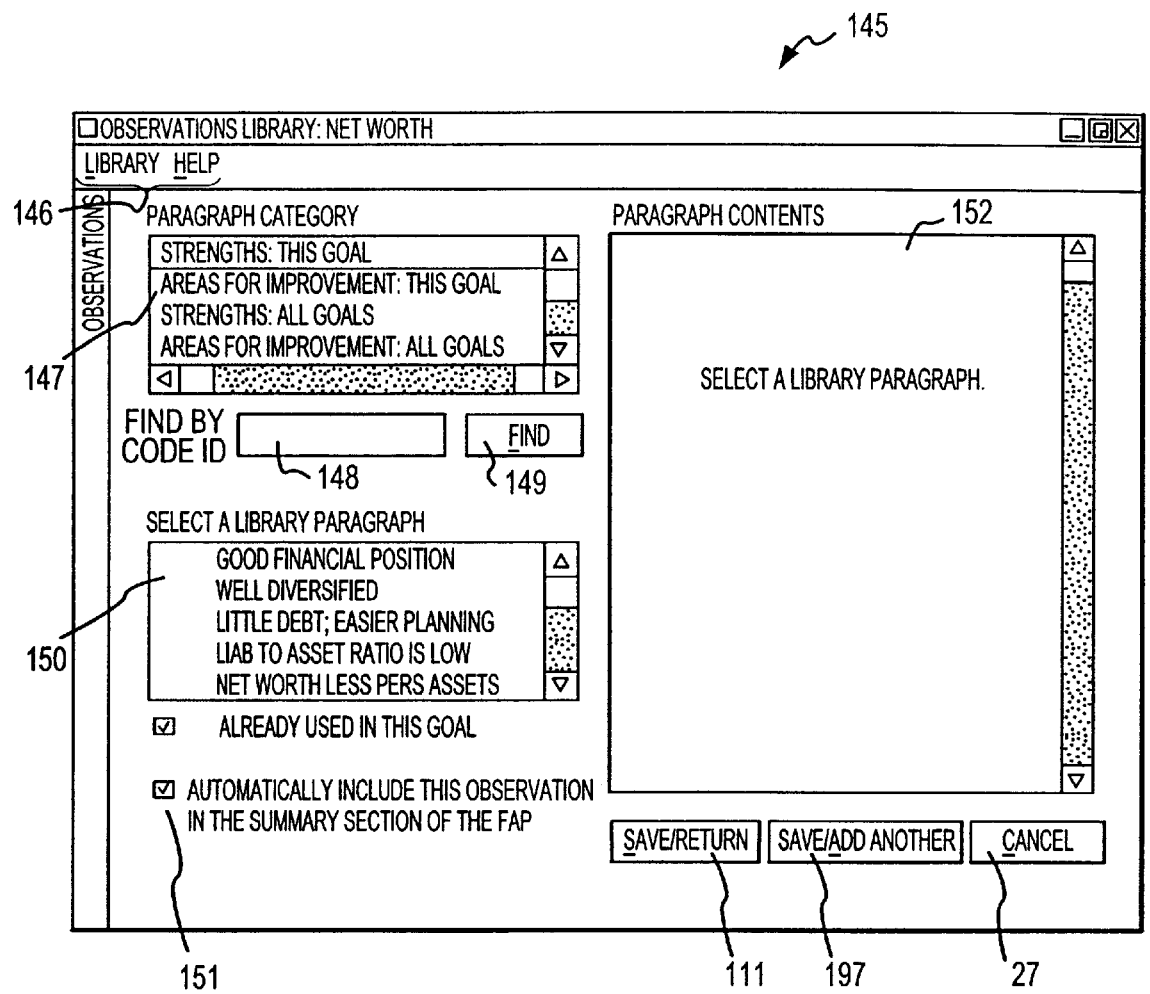
Figure 42:
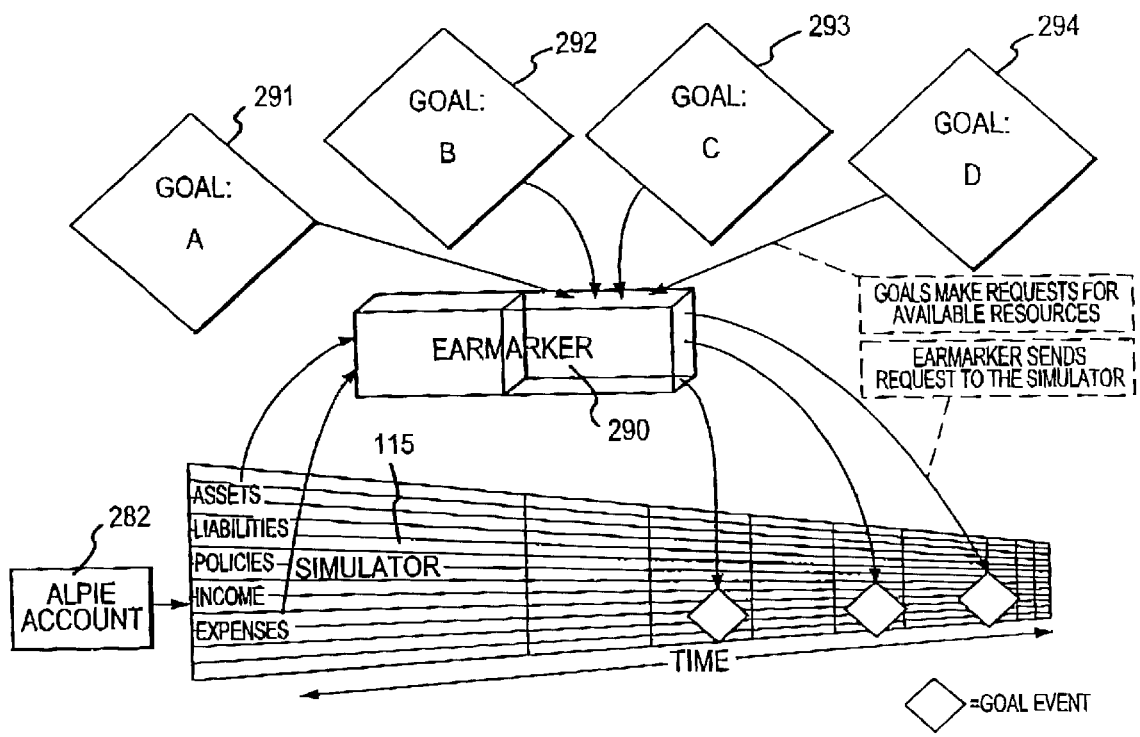
Figure 43:
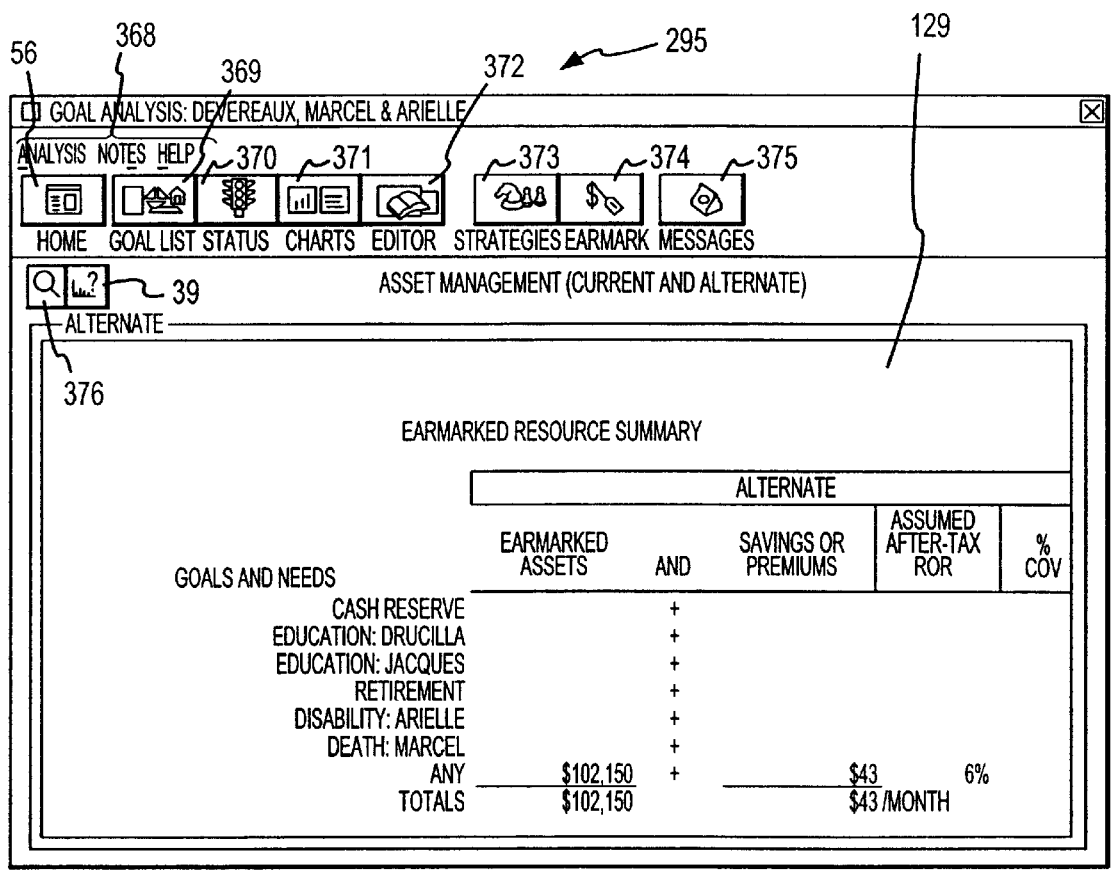
Figure 44:
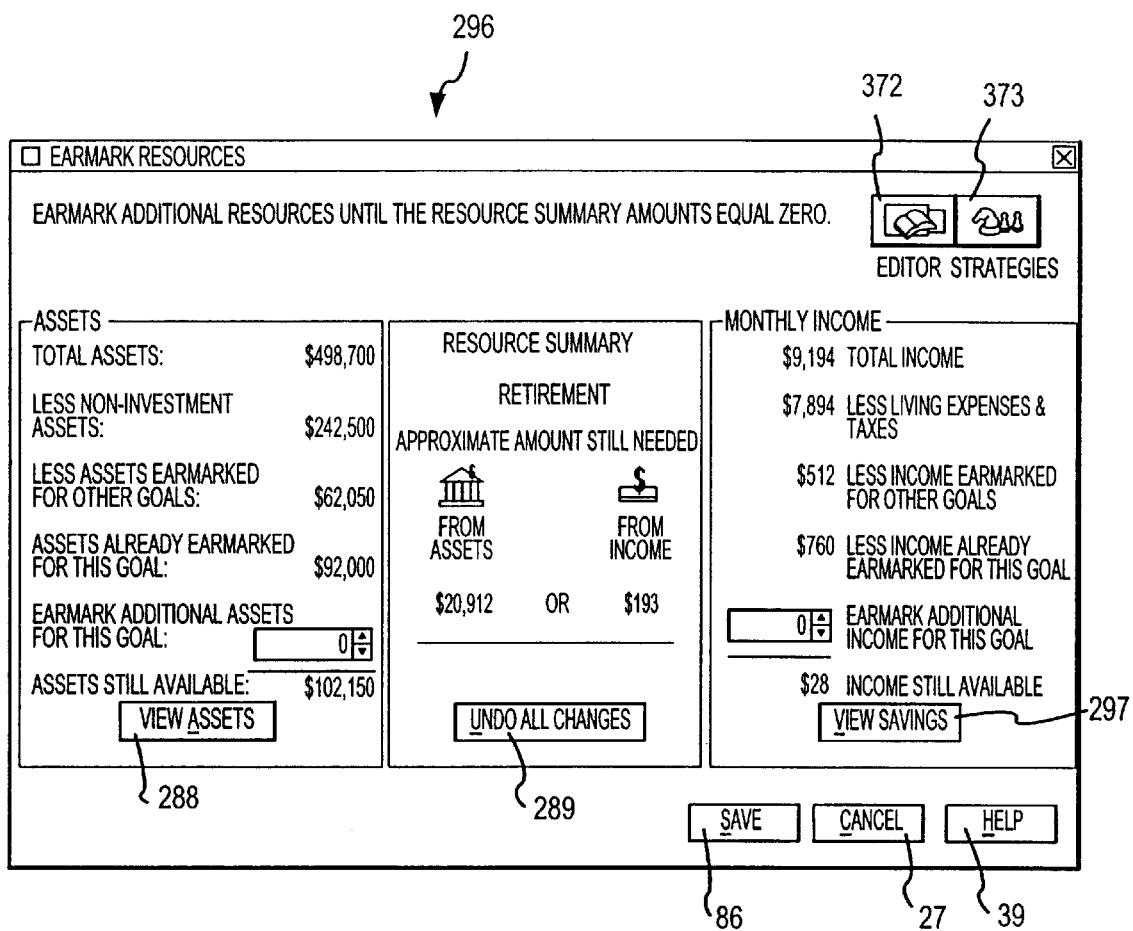
Figure 45:
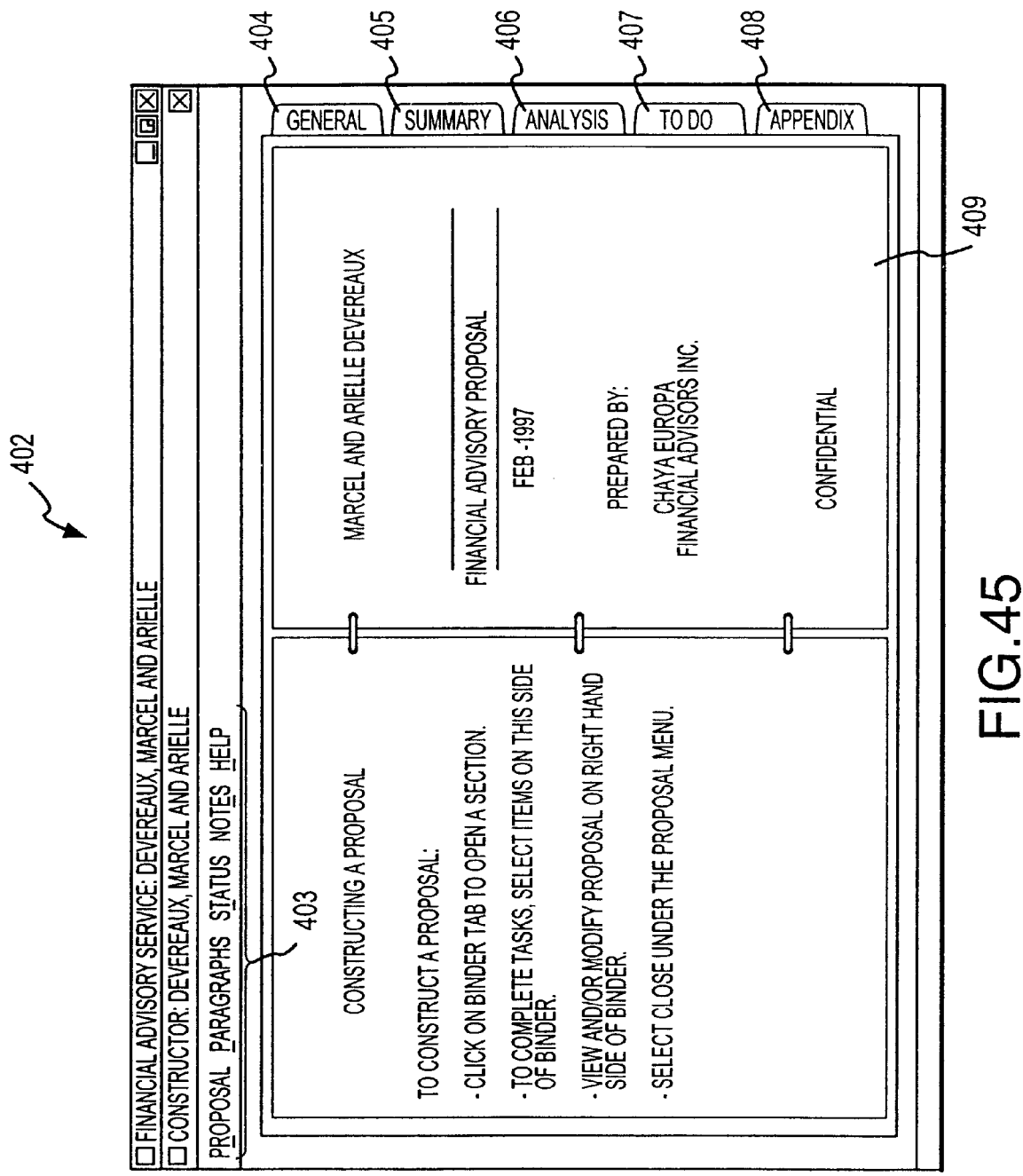
Figure 46:
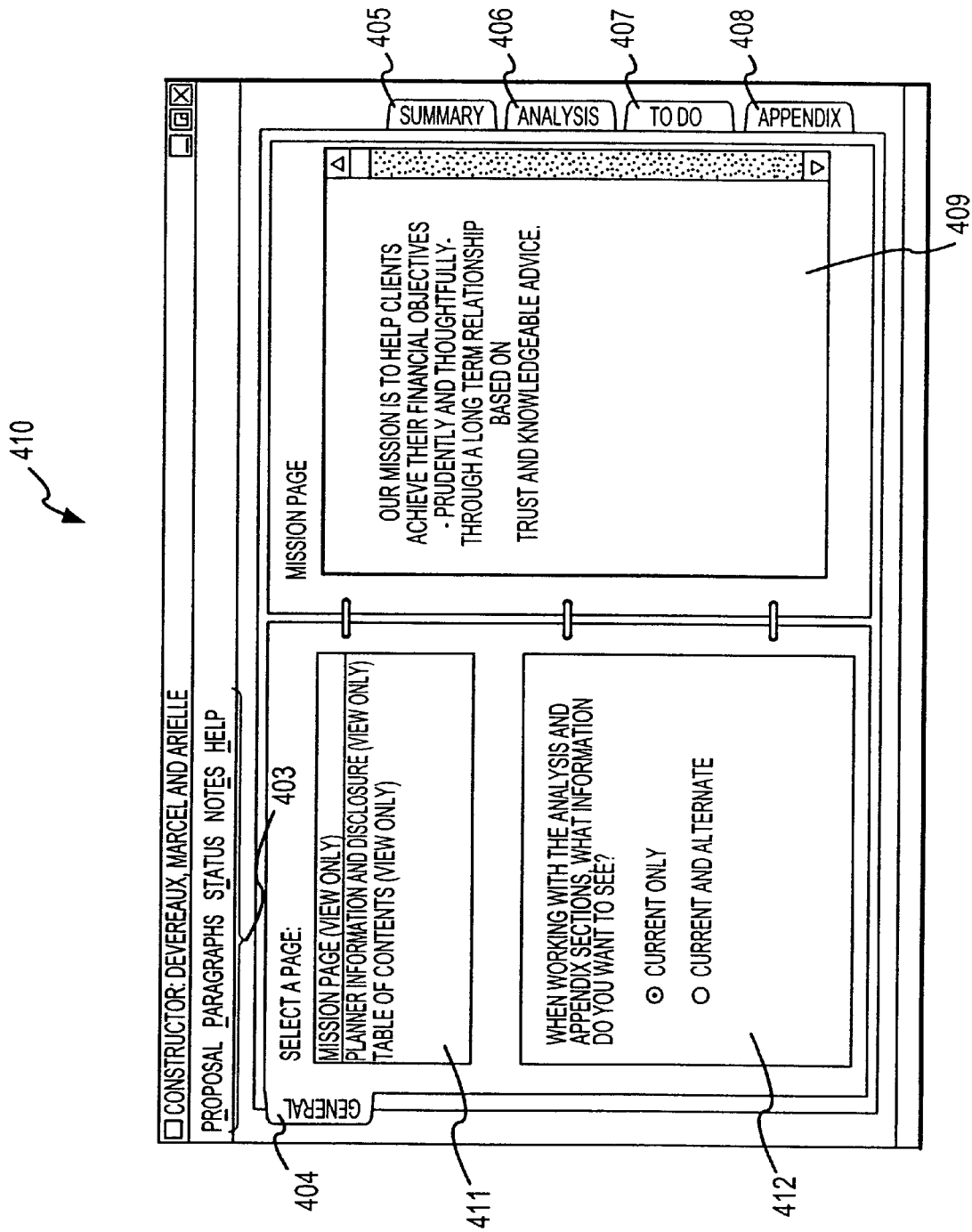
Figure 47:
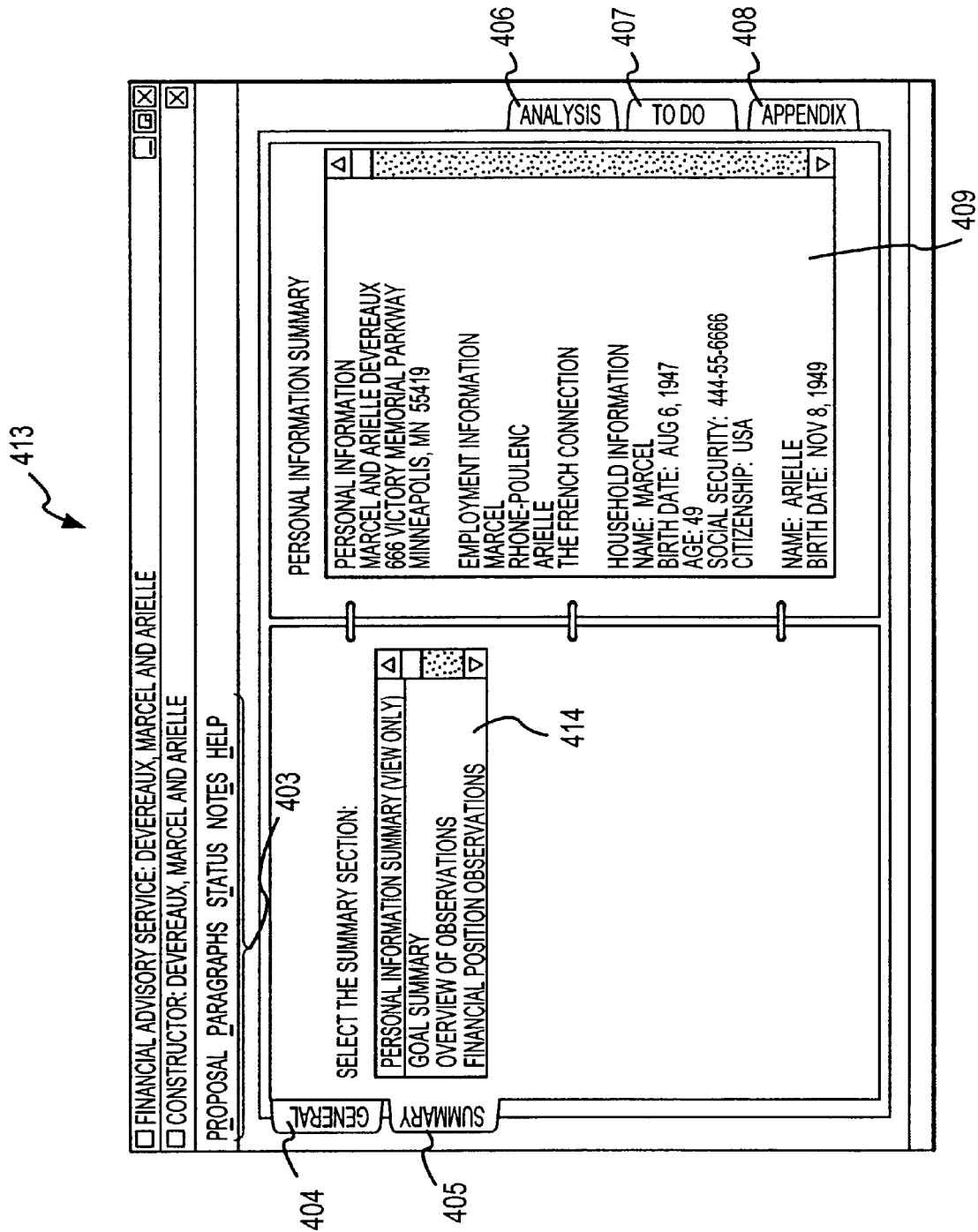
Figure 48:
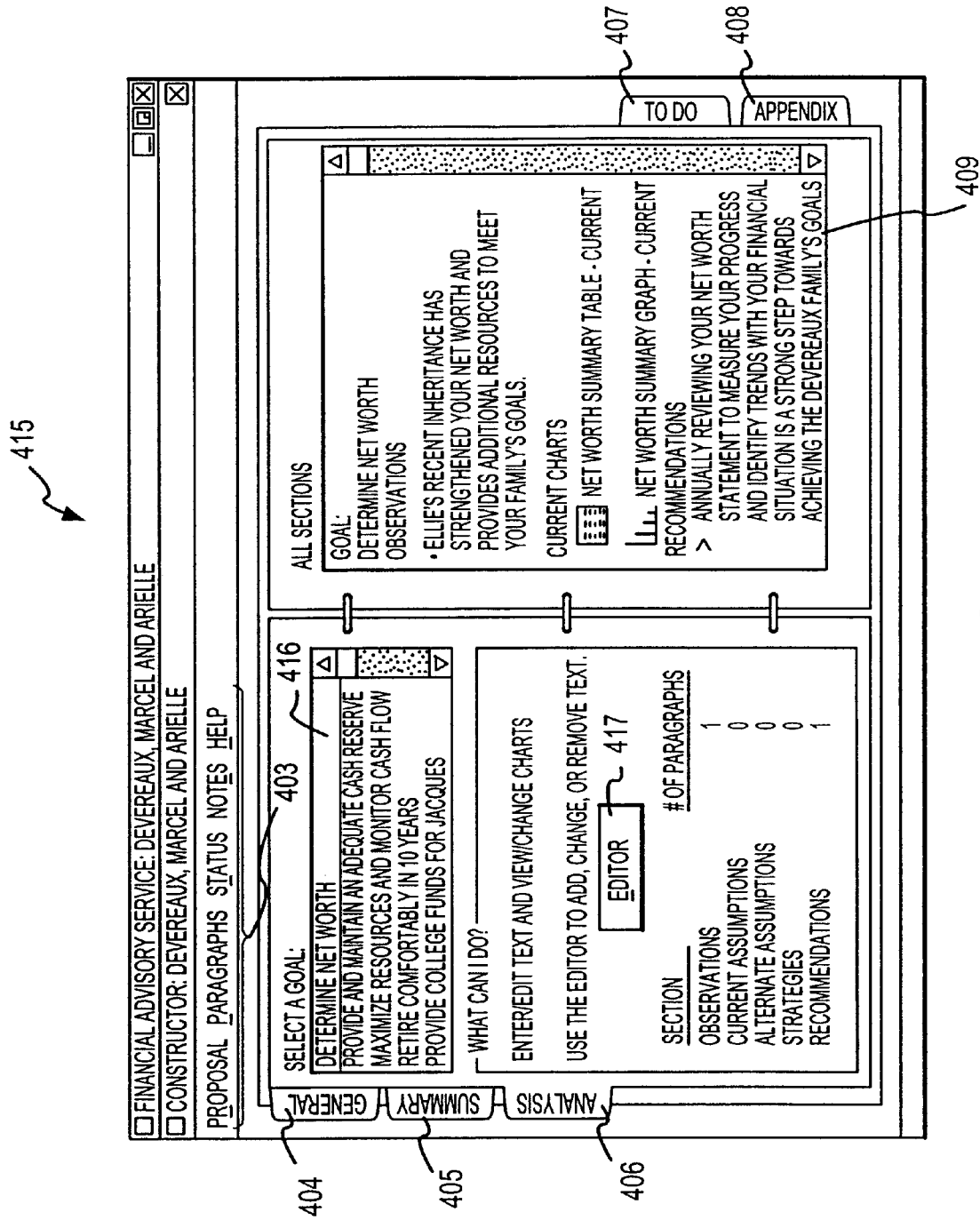
Figure 49:
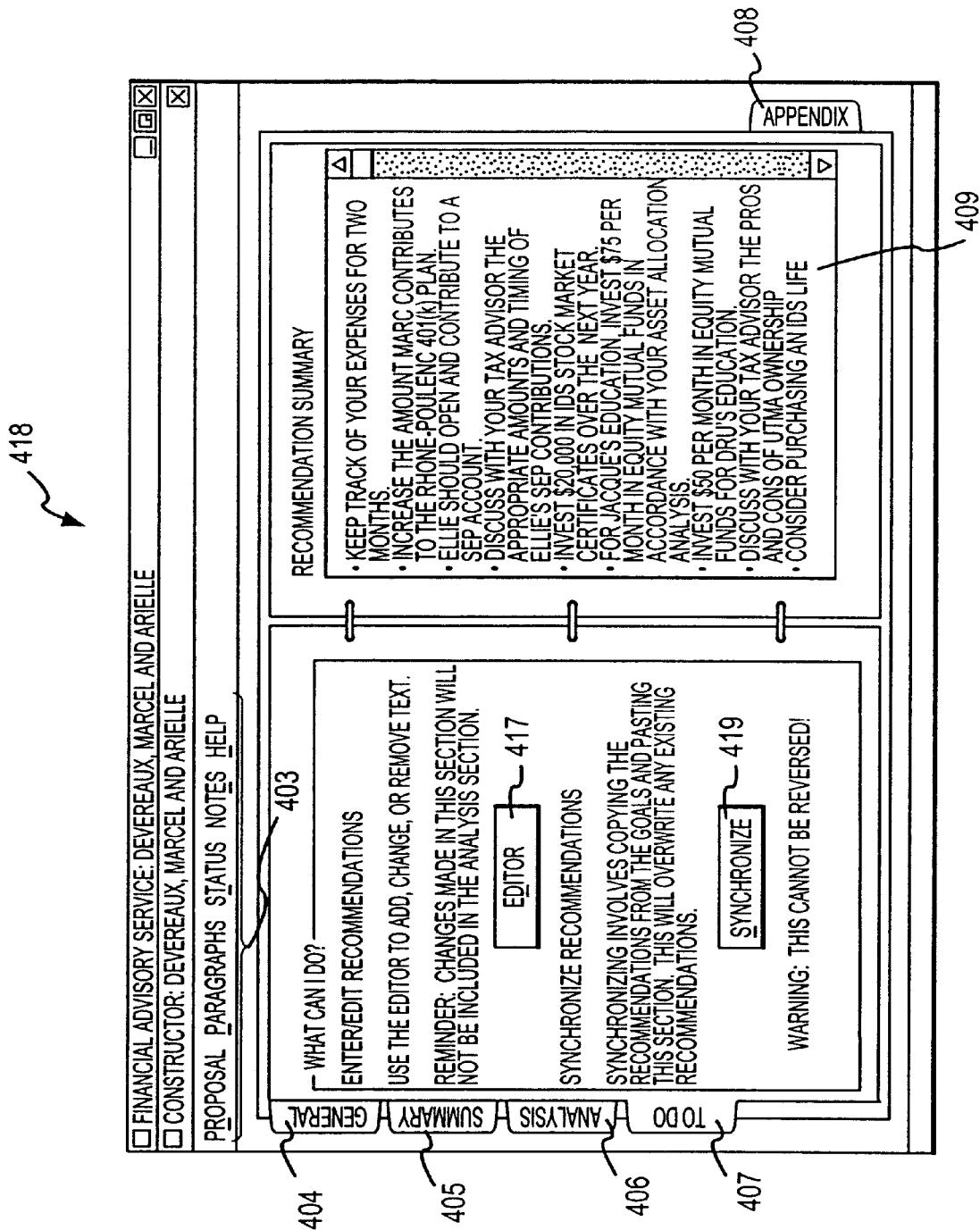
Figure 50:
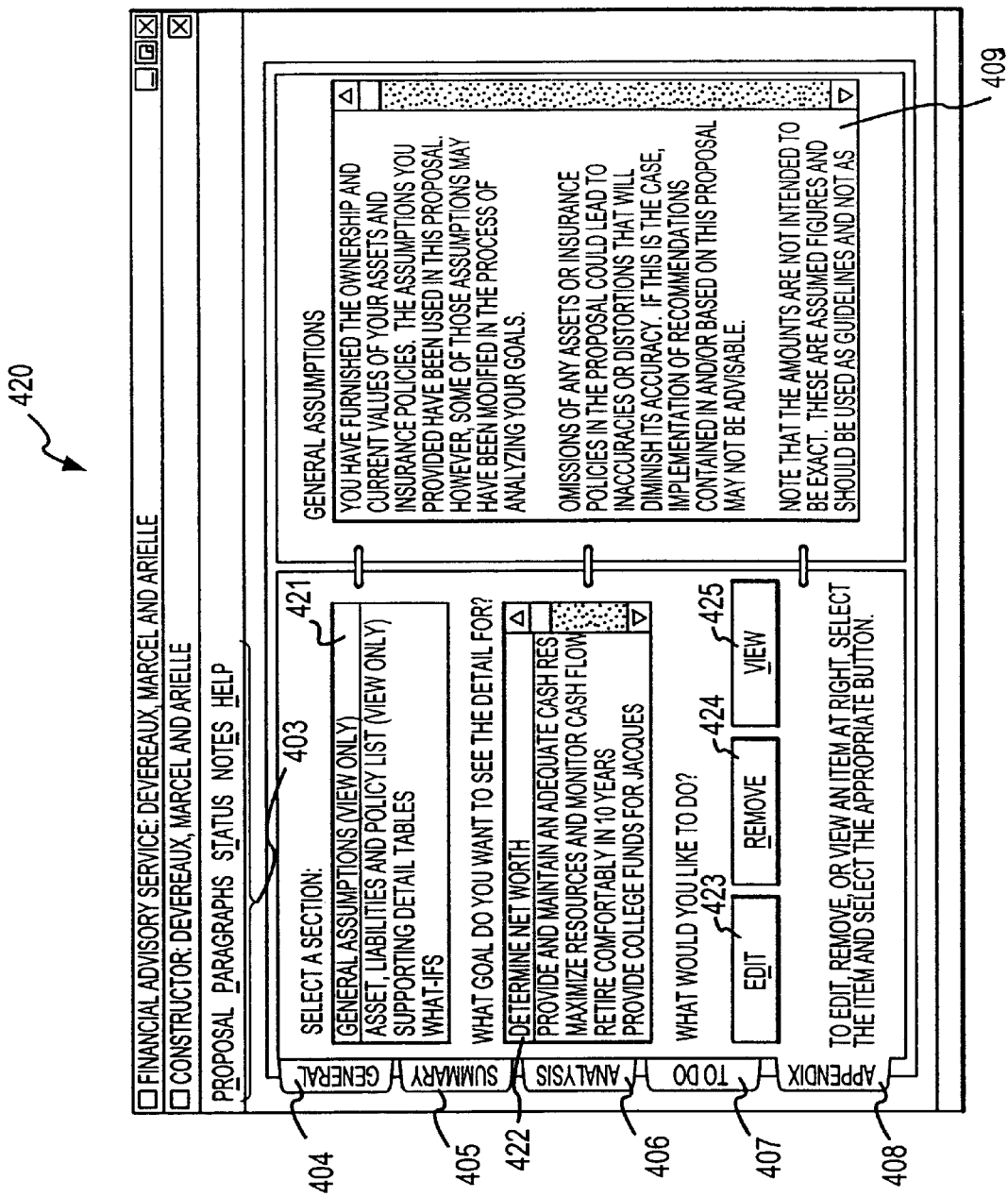
Figure 51:
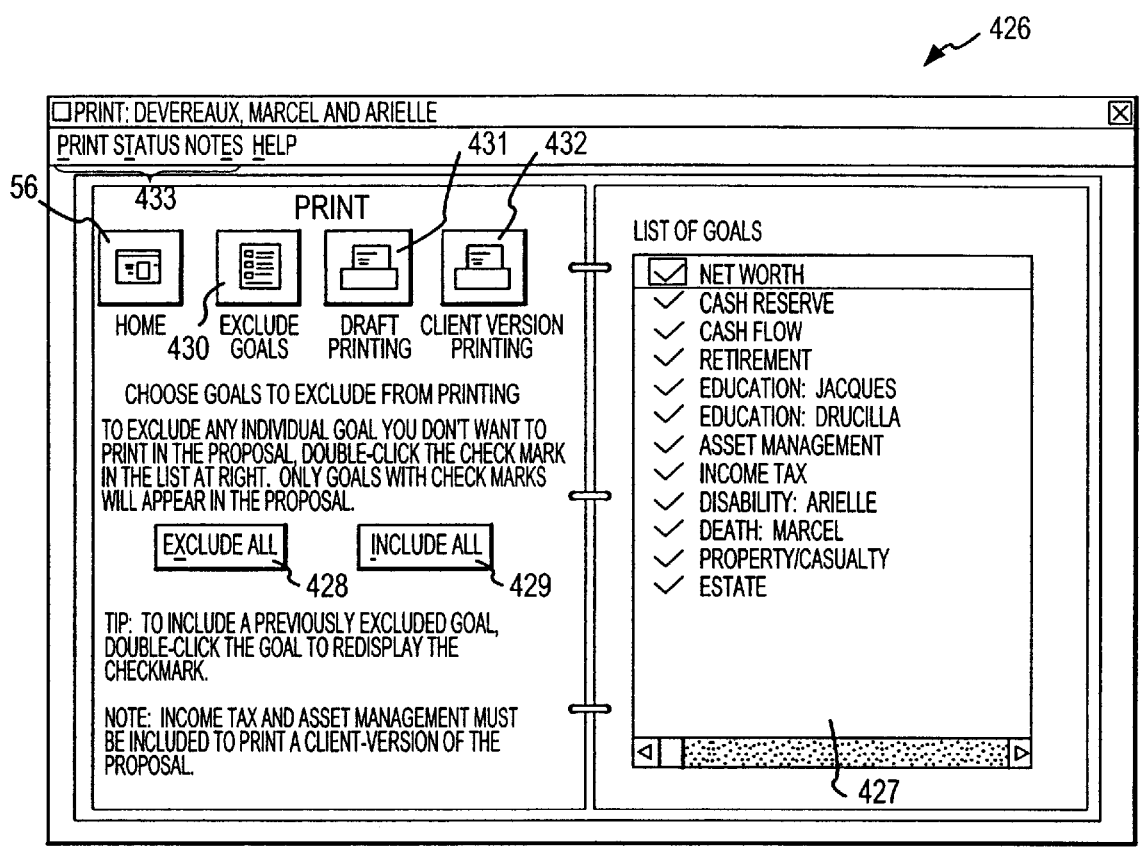
Figure 52:
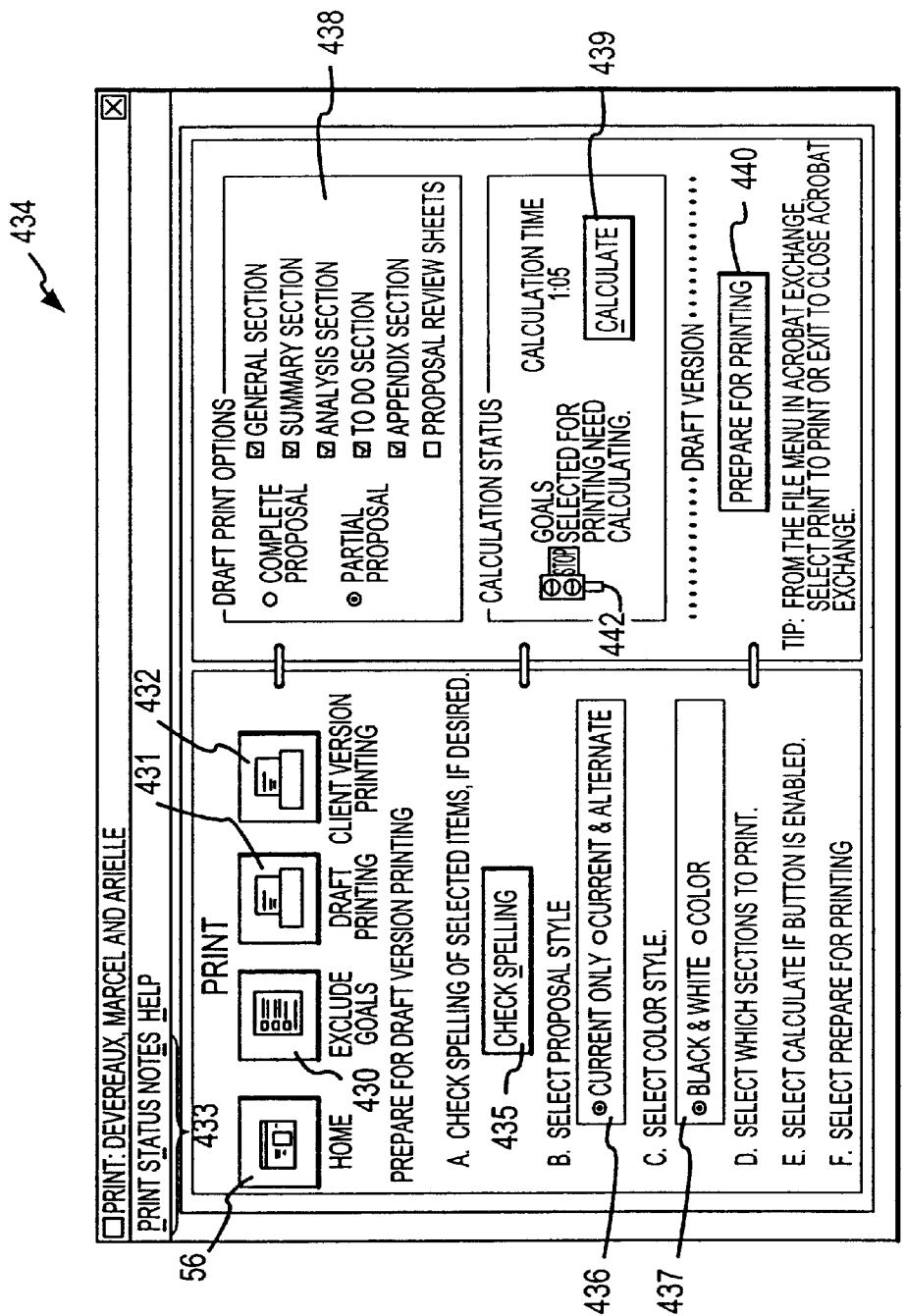
Figure 53:
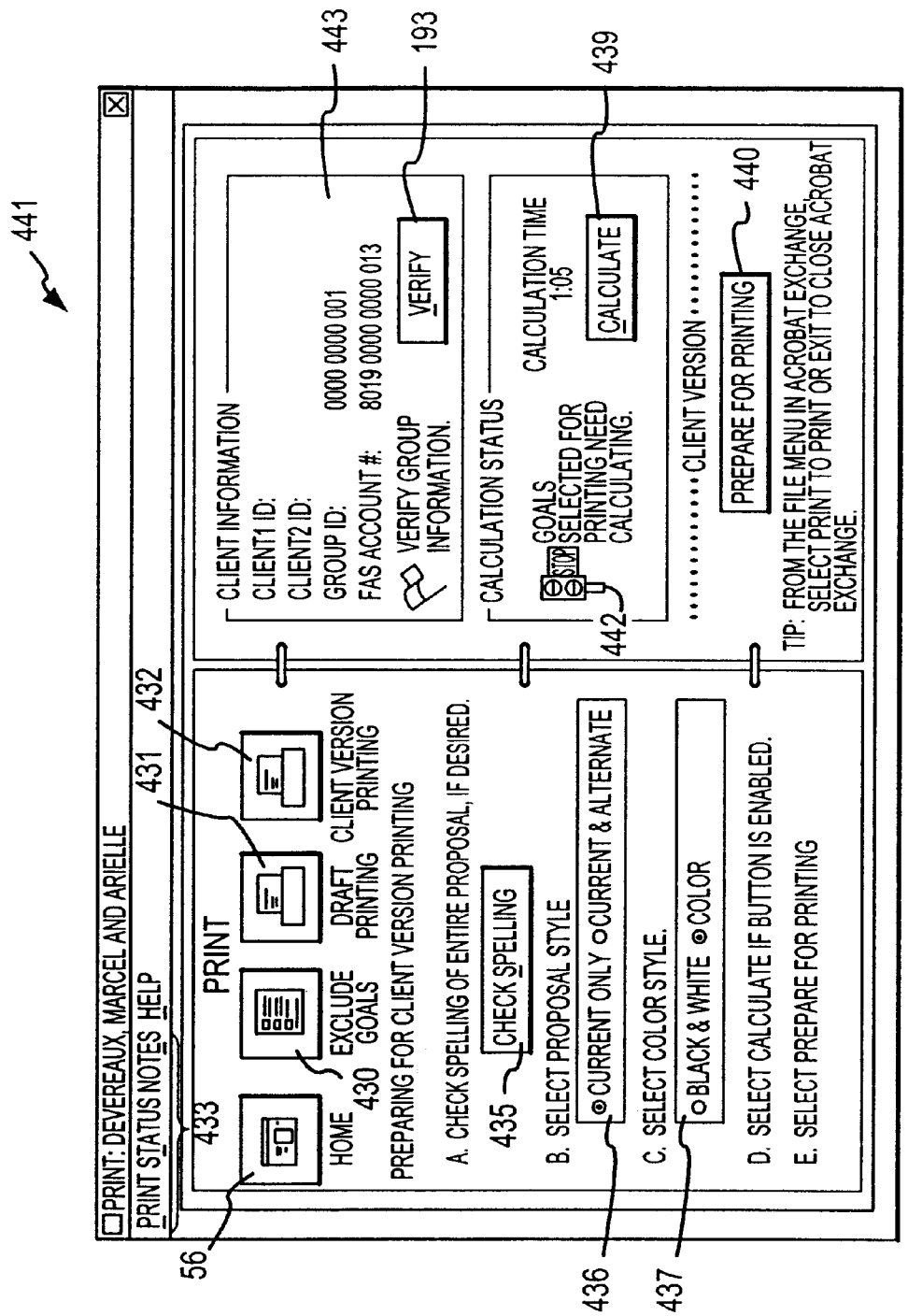
Figure 54:
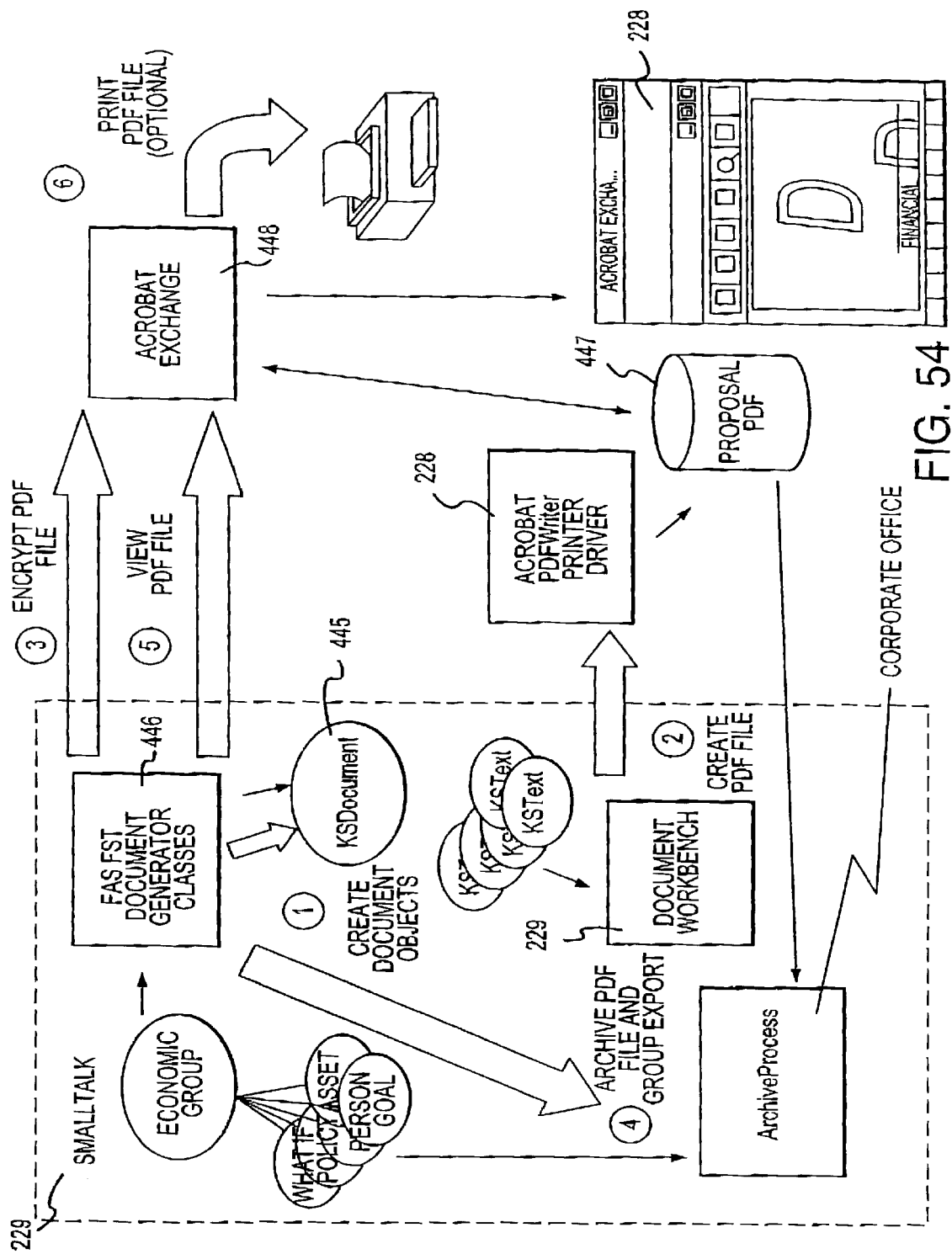

FIG. 36 which has been preferably enlarged to a full screen size in a preferred embodiment of the present invention;

FIG. 38 is an exemplary screen shot of the Marital Trust Strategy window in a preferred embodiment of the present invention;

FIG. 39 is an exemplary flow diagram of the operations of the Strategizer in a preferred embodiment of the present invention;

FIG. 40 is an exemplary screen shot of the Editor window in a preferred embodiment of the present invention;

FIG. 41 is an exemplary screen shot of the Library window in a preferred embodiment of the present invention;

FIG. 42 is an exemplary flow diagram of the operations of the Earmarker in a preferred embodiment of the present invention;

FIG. 43 is an exemplary screen shot of the Earmarked Resources Summary window in a preferred embodiment of the present invention;

FIG. 44 is an exemplary screen shot of the Earmarker Resources window in a preferred embodiment of the present invention;

FIG. 45 is an exemplary screen shot of the Proposal Constructor Intro window in a preferred embodiment of the present invention;

FIG. 46 is an exemplary screen shot of the Constructor General window in a preferred embodiment of the present invention;

FIG. 47 is an exemplary screen shot of the Constructor Summary window in a preferred embodiment of the present invention;

FIG. 48 is an exemplary screen shot of the Constructor Analysis window in a preferred embodiment of the present invention;

FIG. 49 is an exemplary screen shot of the Constructor To Do window in a preferred embodiment of the present invention;

FIG. 50 is an exemplary screen shot of the Constructor Appendix window in a preferred embodiment of the present invention;

FIG. 51 is an exemplary screen shot of the Print Exclude Goals window in a preferred embodiment of the present invention;

FIG. 52 is an exemplary screen shot of the Draft Print window in a preferred embodiment of the present invention;

FIG. 53 is an exemplary screen shot of the Client Print window in a preferred embodiment of the present invention; and FIG. 54 is an exemplary flow diagram of the interactions which occur when a client version of a financial proposal is printed in a preferred embodiment of the present invention.

DETAILED DESCRIPTION OF PREFERRED EXEMPLARY EMBODIMENTS

Figure 1:
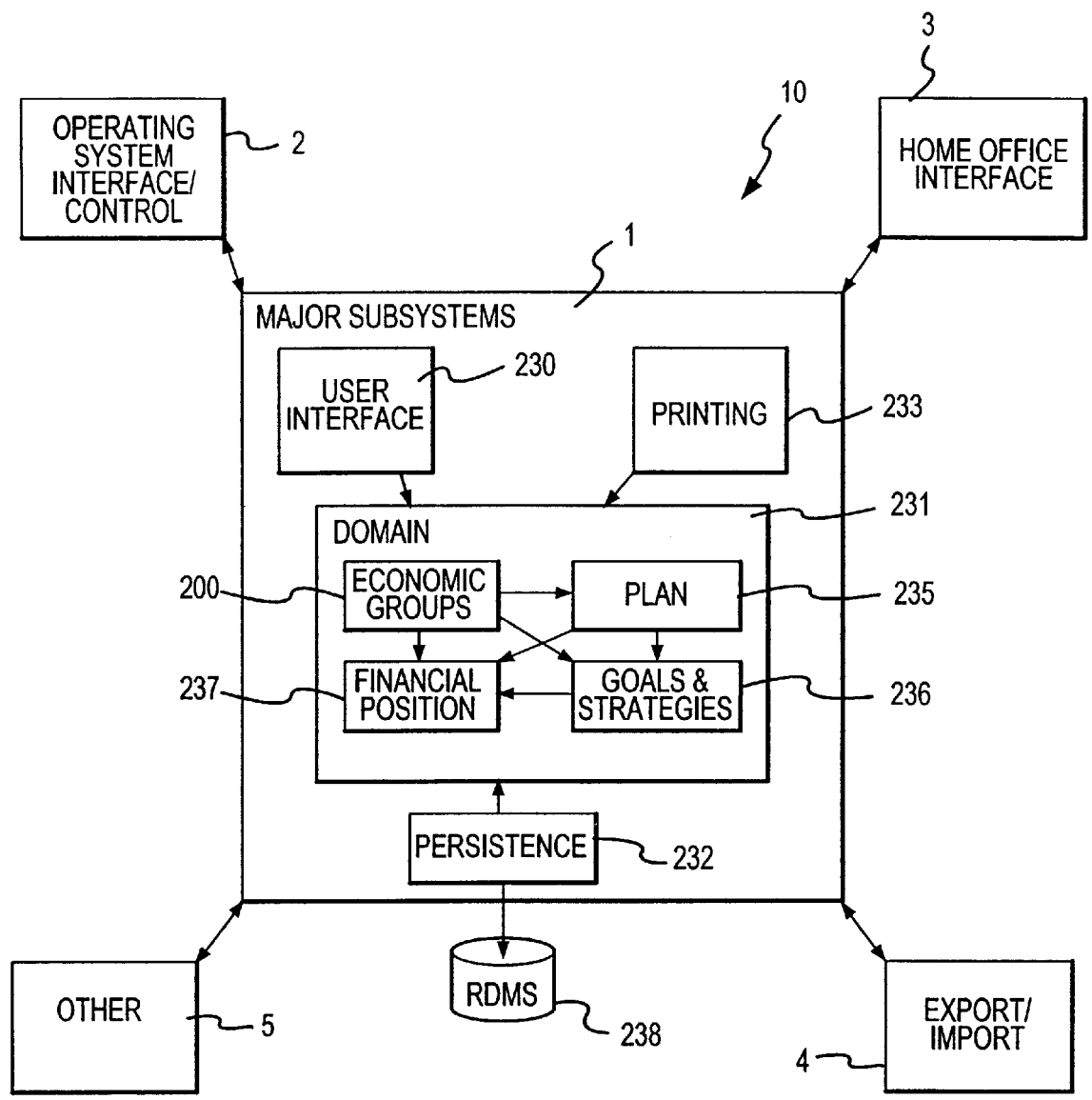
FIG. 1 is an exemplary block diagram showing the interactions of the various functional components of a preferred embodiment of the present invention.

With momentary reference to FIG. 1, Financial Advisory Service (FAS) 10, in general, preferably includes Major Subsytems 1, Operating System Interface/Control 2, Home Office interface 3, Export/Import interface 4, and Other 5 interfaces which allow FAS 10 to interact with vendor supplied programs including, but not limited to, ADOBE ACROBAT, SMALLTALK, SYBASE, and DOCUMENT CONSTRUCTOR. The majority of FAS 10 operations preferably occur within the Major Subsystems 1, which preferably include a User Interface subsystem 230, Printing subsystem 233, Domain subsystem 231, and Persistence subsystem 232. Additionally, the Persistence subsystem 232 preferably interfaces with a Relational Database Management System (RDMS) 238. The Domain subsystem 231 preferably includes an Economic Group subcategory 200, Plan subcategory 235, Goals & Strategies subcategory 236, and Financial Position subcategory 237.

Figure 2:
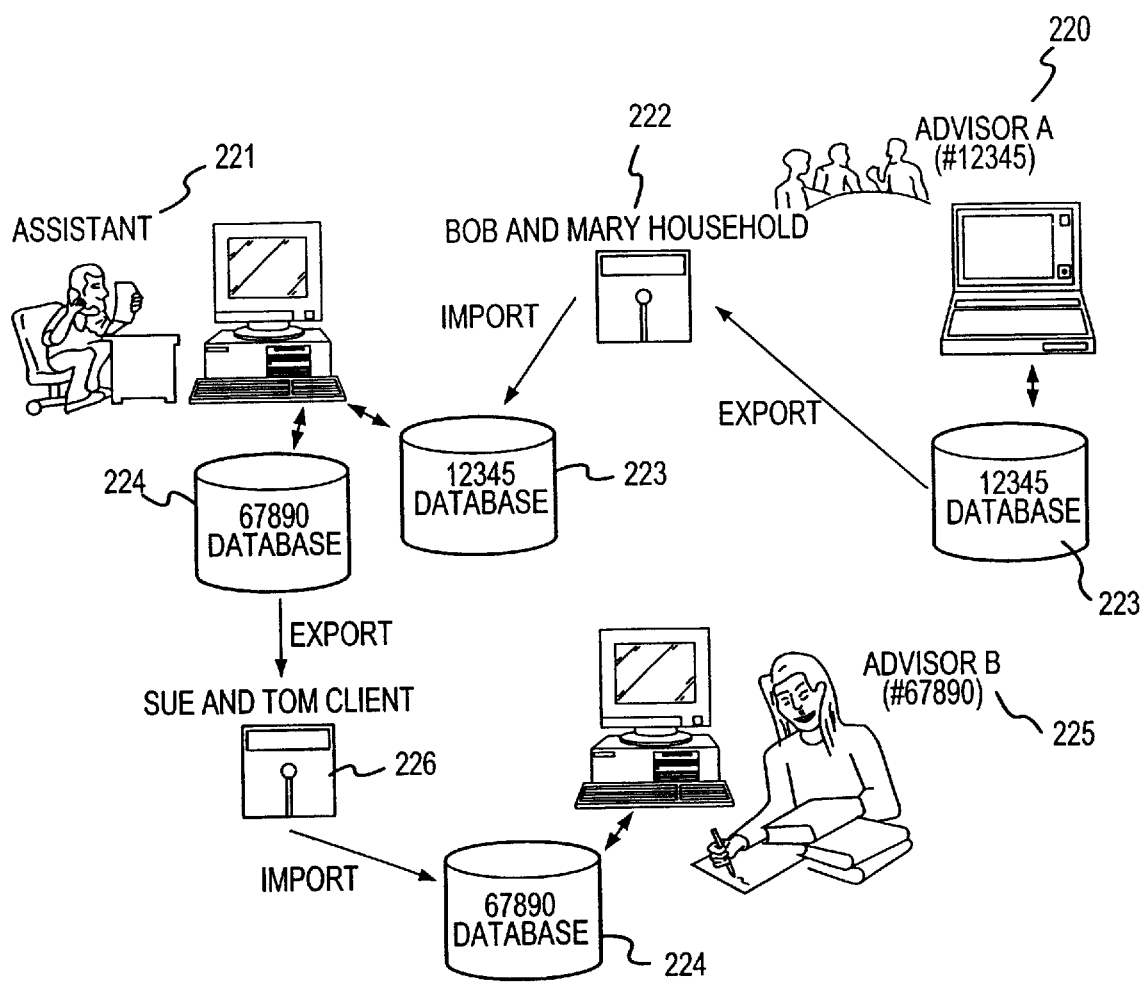
FIG. 2 is a graphical representation of the data sharing features present in a preferred embodiment of the present invention.

FAS 10 is preferably designed such that it may be used as a stand-alone Personal Computer (PC) application. However one skilled in the art will appreciate that any application of FAS 10 is included in the scope of the invention such as, for example, a kiosk system, internet, intranet and/or the like. As shown in FIG. 2 (a view of a typical office consisting of advisors and assistants), the users of FAS 10 are generally an advisor (the person primarily responsible for advising the client of financial options) and/or the advisor's assistant(s) (hereafter, for purposes of this discussion, "advisors" includes "assistants" and any similar individuals). Preferably, FAS 10 allows inter alia client data to be entered, goals analyzed, and financial plans printed, downloaded or viewed from a PC which preferably contains a version of FAS 10. When multiple advisors share a PC, the PC preferably contains a separate database for each advisor.

While multiple advisors may work on the same client's financial plan, FAS 10 data preferably is not shared real-time. However, alternative embodiments include real-time sharing. Instead, a first individual preferably works on a particular aspect of the client's financial plan and then exports their work product to a second person for additional work. Thus, by updating information and then exporting the data, via a disc or other suitable connection, advisors may suitably collaborate on a client's financial plan.

The exporting and importing of files between advisors is preferably accomplished by the exporting of a client as an "economic group" wherein the client includes all the data related to the client which has been entered into FAS 10 (the data which may be entered into FAS 10 for each client is described in greater detail below). The export subroutine is preferably a small subsystem within FAS 10 which substantially simulates the behavior of the Persistence subsystem 232. Persistence 232 suitably controls the flow of data to/from RDMS 238. FAS 10 preferably uses SYBASE SQLANYWHERE (SQL) as its RDMS 238 and utilizes OPEN DATABASE CONNECTIVITY (ODBC) to access SQL. As a result, the export file preferably may be read by Persistence 232 just as if it were reading or writing to RDMS 238. However, instead of actually writing to a database, FAS 10 preferably exports data in sets of four (4) ASCII files which have been compressed (using data compression algorithms such as Zip, PKZip, or the like) into a single export file. For ease of identification, the filename of the compressed file preferably contains a suffix of ".edb".

Before a file may be suitably exported or imported, the advisor preferably opens or initializes FAS 10. FAS 10 is suitably initialized by any known procedure, but preferably by either selecting a program icon or by using the START menu of Windows 95. However, before FAS 10 may be used, an FAS 10 advisor preferably enters the correct sign-on and password.

FAS 10 preferably controls access to data files by a suitable user certification process. To access a FAS 10 database (whether on a PC, desktop, or elsewhere), an advisor preferably enters a userID which corresponds to a previously established advisor ID. Preferably, advisor ID's are established, assigned, and controlled by the home office. For example, as shown in FIG. 2, if Advisor A 220 has an ID of 12345, in order for Assistant 221 to access an exported file 222 (Bob and Mary household) or the 12345 database 223, Assistant 221 preferably enters a suitable userID (e.g., r12345). Similarly, a distinct userID is preferably entered by Assistant 221 before access is allowed to the 67890database 224 associated with Advisor B 225.

User certification preferably includes a Windows 95 and Home Office certification. Windows 95 provides a userID which specifically identifies a user based upon a previously entered profile. Windows 95 certification is commonly known in the art, and is not discussed further. Home office certification preferably entails connecting to the home office and entering a specific userID and password the first time a user accesses FAS for a specific client or database. Suitable security programs then preferably perform security and user verification functions. In a preferred embodiment, ACF2 security software performs these security functions at the home office.

Figure 3:
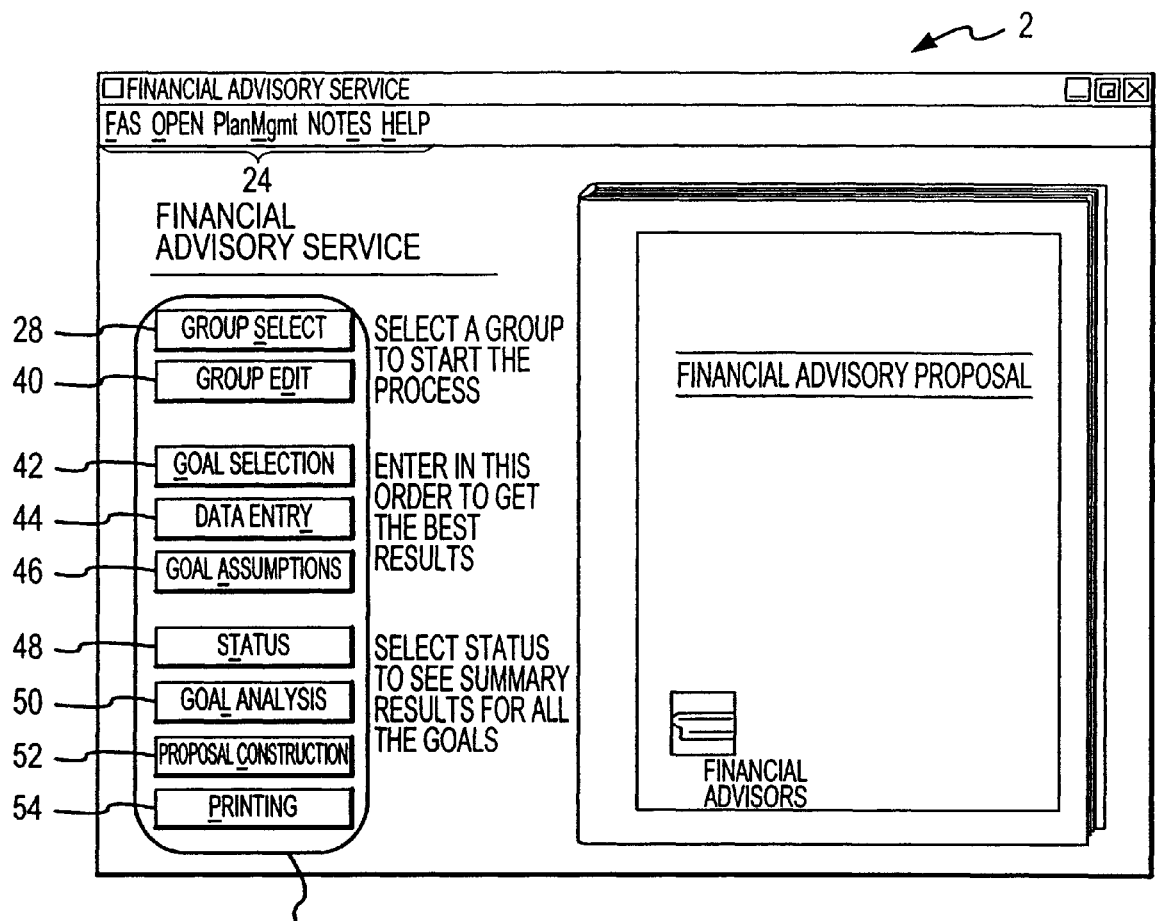
FIG. 3 is an exemplary screen shot of the Financial Advisory Service (FAS) window in a preferred embodiment of the present invention.

After the advisor's access has been verified, FAS 10 preferably displays the FAS Window 20, as shown in FIG. 3. The FAS Window 20 preferably contains a menu bar 24 which allows access to the features and settings of FAS 10. The menu bar 24 preferably "drops-down"; however, any suitable form of program menu access known in the art is within the scope of the present invention. The items within menu bar 24 suitably include those data entry and manipulation commands commonly known in the art. In a preferred embodiment, the FAS menu bar option preferably includes the following commands: Group Select; Group Edit; Create New Group; Print FAS Account Setup form; Print review sheets; Print latest client-version FAP; Import FAS Groups; Export FAS Groups; Open Advisor Information; and Quit. Similarly, the Open, Plan Mgmt; Notes, and Help menu bar options preferably contain those drop-down commands helpful in managing the operation of FAS 10. Commands and menu bar options may be suitably added or deleted as necessary to any window of FAS 10 without departing from the scope of the present invention. Although various windows are described herein as being accessed by a certain method, in a certain order, or from a specific screen, one skilled in the art will appreciate that the description is not so limiting because any known access methods or sequences are within the scope of the invention.

Referring again to FIGS. 2 and 3, an advisor preferably exports files by either suitably selecting the Export FAS Groups drop-down menu option (preferably located under the FAS menu bar option), entering a suitable keyboard <control> G, or by similarly known in the art techniques. After selecting the group(s) to be exported, FAS 10 exports the file to a designated destination by any known methods in the art, but preferable by the method below.

Figure 4:
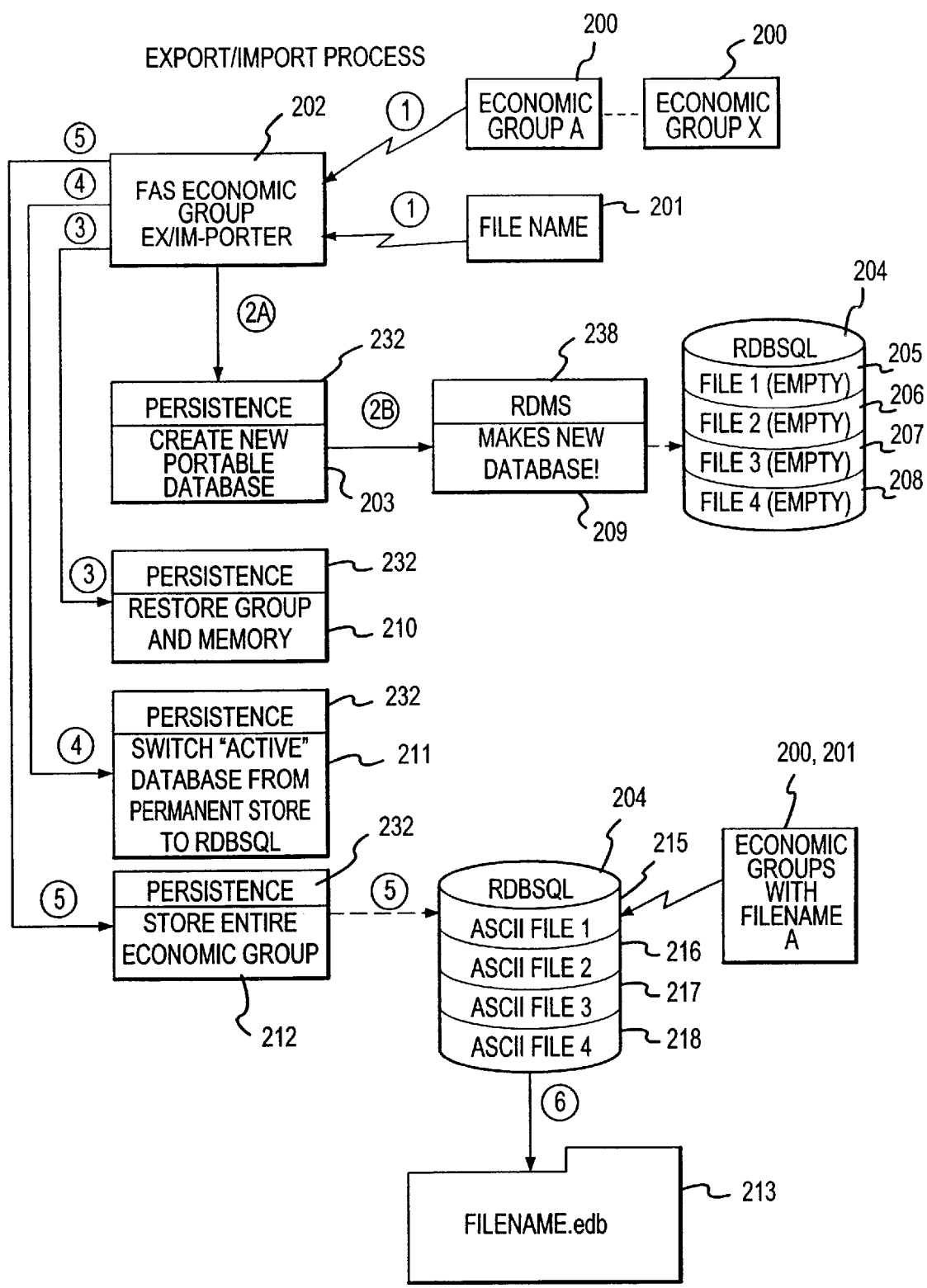
FIG. 4 is an exemplary block diagram of the operations which are preferably performed in exporting a file of the present invention.

As shown in FIG. 4 (wherein the circled numbers represent the step number), exporting files in FAS 10 preferably encompasses a six step process:

1̂ Selected economic groups 200 and a corresponding export filename 201 are transmitted to the FAS Economic Group Ex/Im-Porter ("Exporter") 202;

2̂A Exporter 202 requests Persistence 232 to create a new portable database 203;

2̂B Persistence 232 requests RDMS 238 to make a new export database 209, with a preferable designation of RDBSQL 204, wherein RDBSQL 204 preferably contains at least four data files 205, 206, 207, 208 (which are preferably empty at the time of their creation);

3̂ Exporter 202 requests (step 210) Persistence 232 to restore the entire economic group(s) (i.e., backup the groups), thereby ensuring recently edited data is saved prior to being written to an export file;

4̂ Exporter 202 requests (step 211) Persistence 232 to switch its "active" database from the permanent store, RDBMS database, to RDBSQL 204;

5̂ Exporter 202 requests (step 212) Persistence 232 to store entire economic group(s) 200 in RDBSQL 204; the economic group(s) 200 are preferably stored in four (4) ASCII files: Data description file 215, Index File 216, Data File 217, and Binary Data File 218 (preferably the four ASCII files (215–218) directly correspond to Files 1–5 (204–208);

6̂ The four ASCII files (215–218) are suitably compressed into a single file 213 preferable with an ".edb" suffix. Preferably, the process utilized to import files is essentially the reverse of the export process. However, before importing a group, the existing group is preferably deleted from the permanent database, thereby reducing data overlay problems.

Figures 5, 6:
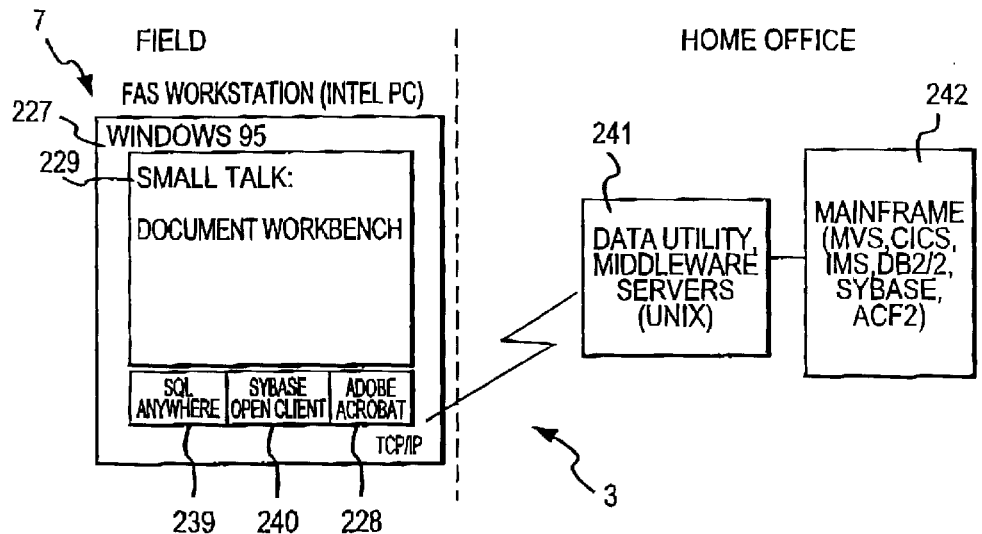
FIG. 5 is an exemplary screen shot of the Advisor Information window in a preferred embodiment of the present invention.
FIG. 6 is a graphical representation of the interconnections which may be suitably established between a personal computer and a home office in a preferred embodiment of the present invention.

Menu bar 24, under the FAS drop-down menu option, as shown in FIG. 3, also preferably allows an advisor to be identified by entering advisor specific information, including name, employee numbers, and the like. As shown in FIG. 5, the Advisors Information window 186 preferably contains an Advisors Information field 188, Work Information field 190, and Job Information field 192 which allow the advisor to input detailed information preferably used to complete the financial proposals, track performance, and the like. This information enables supervisors, home offices, and the like to monitor the activities and performance of the advisors.

In addition to accessing the home office for user certification and advisor identification, FAS 10 preferably requests that advisors connect with the home office for the following functions:

1. When creating or recovering a new database (the home office generates a unique data ID for each client in the database);

2. "Casper re-authorizing"; FAS 10 preferably re-authorizes uses on a periodic basis by verifying with the home office that the advisor has a valid userID and password; for the preferred embodiment, "Casper re-authorizing" occurs every 30 days;

3. Creation of a final "client" version of a proposal (discussed in greater detail below); and 4. Retrieval of a final "client" version of a proposal from archive.

FAS 10 preferably includes a Home Office interface 3 (as shown in FIGS. 1 and 6) which utilizes servers 241 to interface between PCs 7 and Mainframe computer systems 242. In a preferred embodiment, Unix servers are utilized.

While servers 241 are preferably utilized, as shown in FIG. 6, FAS 10 may be suitably configured to utilize any remote-home office connectivity software or hardware. Thus, any connectivity scheme or access software is considered within the scope of the present invention. In a preferred embodiment, however, FAS 10 utilizes a data utility system built on a system of remote procedure calls which are suitably routed through servers 241 connected to a mainframe system 242.

While each PC 7 preferably runs a single version of FAS 10, each advisor's client base is preferably represented by a different physical database stored in RDMS 238. An advisor preferably keeps all of his or her clients in that database, thus security at the client level is minimal. While client data is preferably stored in RDMS 238, FAS 10 preferably stores system data in the Windows 95 227 registry. FAS 10 preferably has several keys in the WINDOWS 95 227 registry in which application and user specific information is located. Since keys in WINDOWS 95 227 registries are known in the art, they are not further discussed herein.

While FAS 10 is primarily a simulation tool, the output of. its simulations can be critical to the success of the advisor's efforts. Since large financial plans commonly contain hundreds of pages, efficient and effective text and graphic packages are suitably utilized. In this respect, FAS 10 documents are preferably created using DOCUMENT WORKBENCH, a SMALLTALK 229 based tool, and then suitably output in ADOBE Portable Document Format (PDF) files. These PDF files may be suitably viewed or printed using ADOBE ACROBAT 228 or the like, and may be transferred by any suitable data transfer means including, but not limited to, the internet. A FAS 10 password preferably protects PDF files so that only FAS 10 can update them, thereby ensuring a "final" plan is not altered outside of FAS 10.

FAS 10 also suitably interconnects numerous programs, subroutines, and features to provide the desired financial planning and advising functions. Underlying these numerous subsystems and the like are several system level classifications which suitably provide the "environmental" instructions, data, and operations which enable FAS 10 to function in the Windows 95 227 environment. These environment classes preferably include: FAS CONfiguration (FASCON); FAS User (FASU); and FAS APPlication (FASAPP). One skilled in the art will appreciate that any known connectivity, routines, subroutines, subsystems can be incorporated into the present invention to suitably perform similar functions.

FASCON is preferably responsible for FAS 10 interactions within the local PC environment. These interactions include, for example, locating files, ensuring software products utilized by FAS 10 are installed, assigning temporary files with filenames, accessing the Windows 95 227 registry, and/or the like.

FASU is preferably utilized to identify the current user and answer any questions which may arise including userID, authorization, data source names, and the like.

FASAPP preferably initiates and terminates FAS 10. When FAS is initiated by an appropriate WINDOWS 95 227 Start menu, program icon and/or the like, FASAPP is the program module which preferably directs the Windows 95 227 environment to the location of program files, provides configuration instructions, and/or the like. FASAPP also preferably contains the initial list of client groups from which an advisor initially selects groups.

Figure 7A:
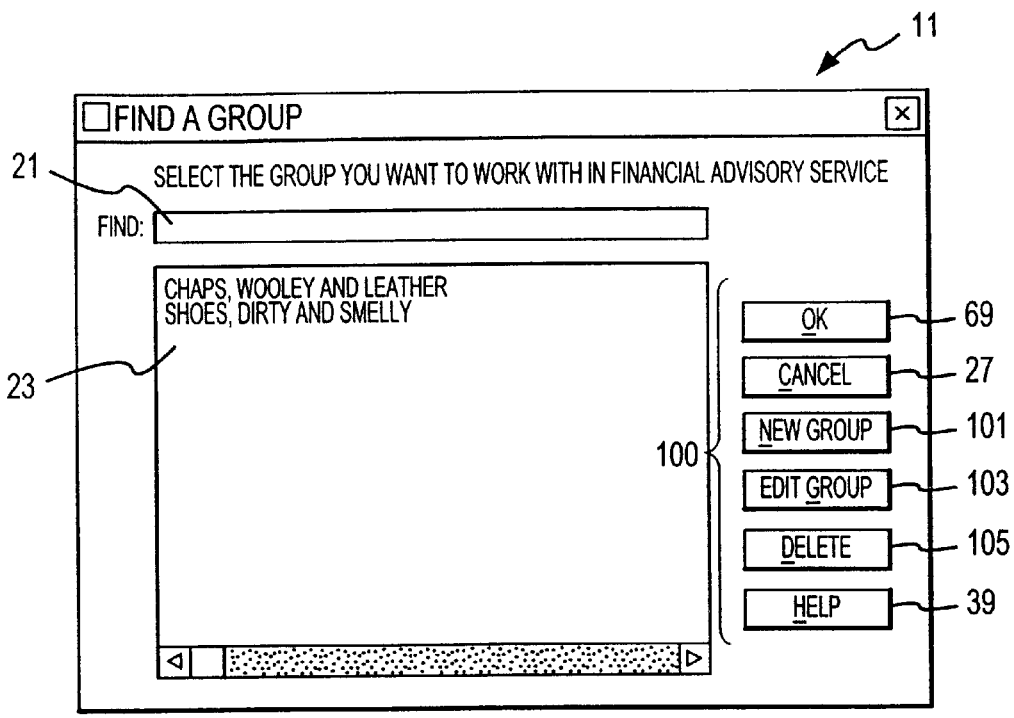
FIG. 7A is an exemplary screen shot of the Find a Group window in a preferred embodiment of the present invention.

With reference again to FIG. 3, FAS window 20 also preferably contains a series of "buttons" 26, which allow access to numerous unique features of FAS 10. Upon the initialization of FAS 10, the advisor preferably selects a group by selecting Group Select button 28. Upon selecting Group Select button 28, the Group Select window 11 (as shown in FIG. 7A) is preferably displayed and allows the advisor to select a preexisting group or create a new group.

Figure 7B:
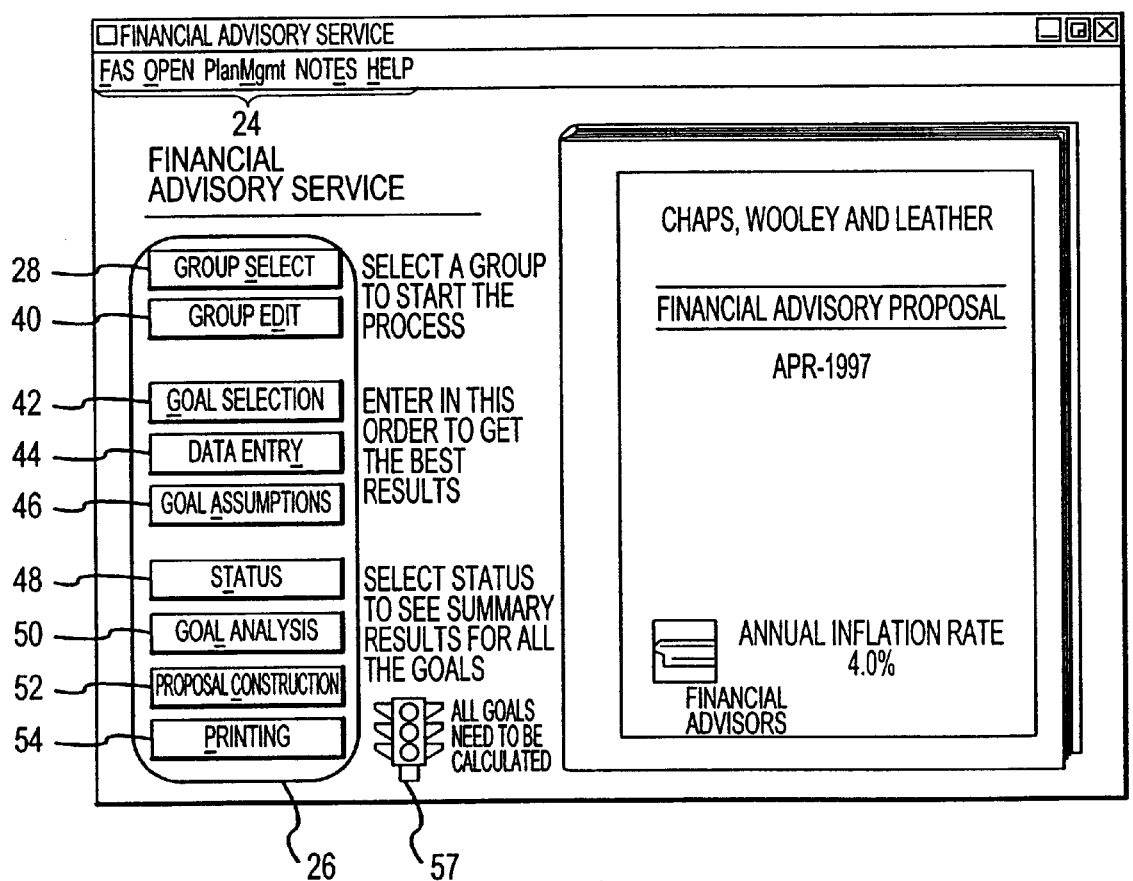
FIG. 7B is an exemplary screen shot of the FAS Home window in a preferred embodiment of the present invention.

The advisor may select a group by any known method, but preferably by typing the group name in the Find field 21. As each letter is typed, the name list field 23 displays group names in the database and preferably advances to those group names which match the typed letters. The Group Select window 11 also preferably contains a plurality of "buttons" 100 which allow the advisor to select a specific group (by selecting the "OK" button 69), Cancel 27 an entry, enter a New Group 101, Edit Group 103, Delete 105 a group, or seek Help 39 from an on-line help feature. After a group is selected, FAS 10 preferably displays the FAS Home window 22, as shown in FIG. 7B (please note, the difference between FIG. 3 and FIG. 7B, is that all the buttons 26 are preferably selectable in FIG. 7B whereas only the Group Select button 28 is preferably selectable in FIG. 3; additionally, the stoplight 57 appears in FIG. 7B and does not preferably appear in FIG. 3).

Fundamental to FAS 10 is the Model-View pattern which is the logic scheme FAS 10 preferably utilizes to control its various operations. In the Model-View pattern, two classes preferably exist: Domain View Manager and Domain Object. These classes are similar but not the same as the three classes commonly utilized in a Model-View-Controller (MVC) architecture, namely: Model, View, and Controller. In MVC, Model objects are generally domain objects (e.g., asset, person) which are usually concerned only with their own behavior and collaborating with other objects. View objects are generally graphical objects (e.g., a window frame, an entry field, a graphics pane). Controller objects are the glue which hold the application together, and are aware of both the model and view. In short, controller objects suitably transfer information from/to the Model(s) and instruct the View(s) on what to display.

In FAS 10, the Model View architecture combines the View and Controller functions commonly used in MVC. The Domain View Manager is a "controller like" object which may contain many sub-windows. Each of these sub-windows are "views" for which View Managers are preferably responsible for both the graphical display and managing the collaboration with the domain object(s).

In addition, FAS 10 utilizes a "dependency" or "observer" pattern. The dependency pattern preferably provides a mechanism for notifying other aspects of FAS 10 of a change in a domain object without requiring specific knowledge of that object. For example, if a person with an estate plan were to die suddenly, the estate plan preferably does not need to know the details of the death, however, it does need to know the date of death so that it can settle the estate as of the new date. In FAS 10, objects which need to be notified of a change in another object (i.e., the estate planning function needs to know the date of death), are preferably registered as "dependents" of the target object (i.e., the date of death field). Thus, when a change occurs in the target object, preferably all dependents are suitably notified.

Figure 8:
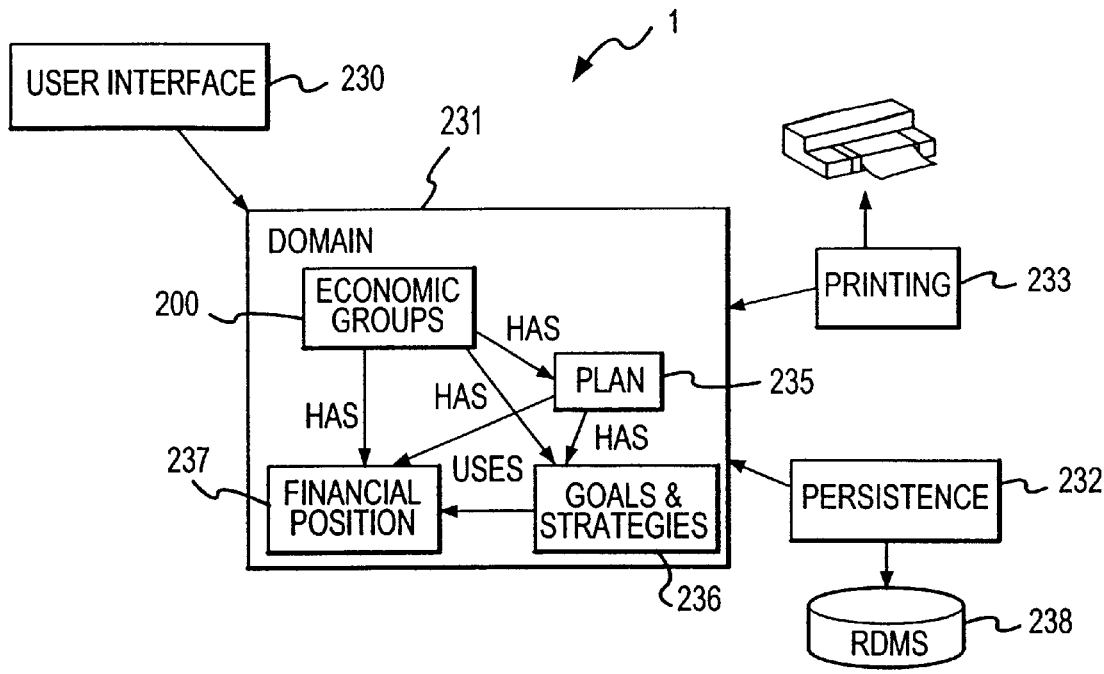
FIG. 8 is a blow-up of the block diagram of the Major subsystems previously identified in FIG. 1 in a preferred embodiment of the present invention.

Operating on top of these numerous environmental subsystems and the Model—View architecture are the major subsystems shown in FIGS. 1 and 8, including: the User Interface 230 (UI); Domain 231; Persistence 232; and Printing 233.

UI 230 is not a subsystem per se, instead it is preferably a collection of frames, class libraries, and custom classes which are suitably utilized to control the FAS 10 visual interface (i.e., the windows the advisor preferably sees and upon which enters data to select various FAS 10 features). As briefly described above, FAS 10 relies upon classes of view managers which preferably contain the window objects (i.e., what the advisor sees) and the controller objects (i.e., the inputs by the advisor whether mouse clicks, keyboard entries, or the like). Preferably the windows displayed by the view managers are a suitable representation of a domain object (for example, when the advisor selects a client group, preferably FAS 10 provides a window which displays the group members (i.e., the domain objects). Hence, under FAS 10 view managers preferably refer to domain objects while domain objects exist independent of the view managers. This scheme preferably isolates the domain objects from the view managers (which comprise the UI). Thus, FAS 10 preferably allows calculations, manipulations, and the like to be performed on domain objects independent of the window display while suitably allowing multiple window displays to remain updated and in synchronization.

FAS 10 suitably provides backup copies of domain objects such that data entries may be canceled or undone as is known in the art. FAS 10 preferably disables a window's functional aspects (i.e., "buttons") while processing is occurring, as is known in the art, thereby suitably preventing an impatient advisor from closing windows, triple clicking on buttons, and/or the like while processing is occurring. UI 230 preferably provides status messages such as "working," hour glass icons, or the like. In general, UI 230 preferably provides those data entry and display features commonly known in the art.

Referring once again to FIG. 8, the focal point of the majority of FAS 10 activities is the Domain subsystem 231. Domain 231 preferably comprises four sub-categories: Economic Groups 200, Goals & Strategies (G&S) 236, Financial Position (FP) 237, and Plan 235. In general, Economic Group 200 reflects the demographics of the group for which the planning is being done. These demographics preferably include the persons in the economic group, their relationships, and the like. FP 237 suitably simulates the economic group's financial environment. Included within FP 237 are Data Wrappers which contain the client's assets, liabilities, income, and expenses for a particular economic classification. Economic Groups 200 will commonly have numerous Data Wrappers. G&S 236 suitably models the client's financial goals. Plan 235 suitably reflects the output of the financial planning (i.e., a document). Thus, Plan 235 preferably constructs those text, table, and graphic outputs desired in a financial proposal. Each of these classes is described in greater detail below.

The Economic Groups 200 subsystem is preferably the portion of FAS 10 which represents the target of the advisor's financial planning activities, the economic group, and preferably includes data on all the members of the group, their relationship to the client(s), and important demographic information. FAS 10 is preferably designed such that a two-person communal economic group may exist, these two persons (husband—wife, or the like) are preferably identified in FAS 10 as client 1 and client 2. FAS 10 preferably assigns this composition of demographic data to the Domain Object called Economic Group (EG) 200, as shown in FIG. 9.

Figure 10:
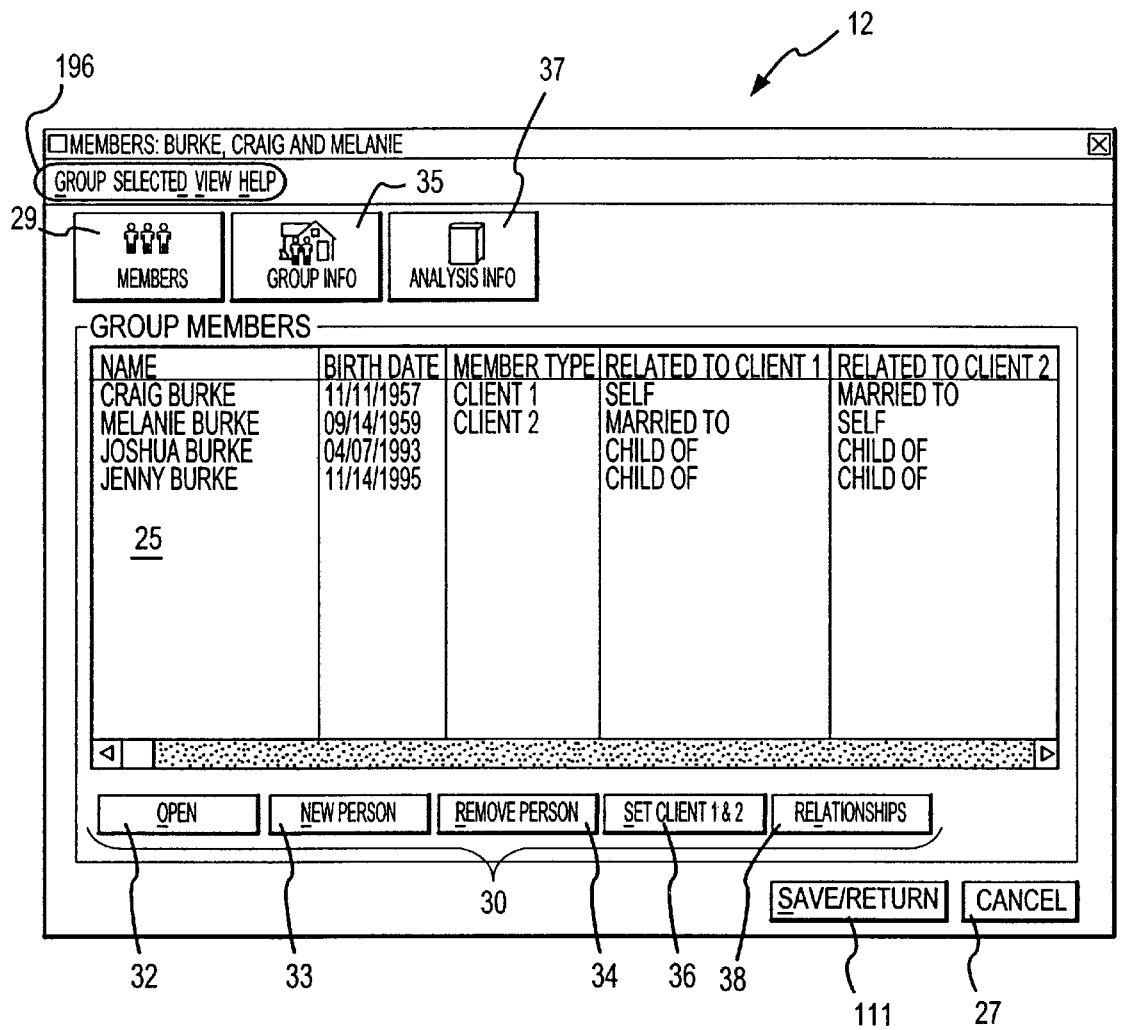
FIG. 10 is an exemplary screen shot of the Group Edit: Members window in a preferred embodiment of the present invention.
Figure 11A:
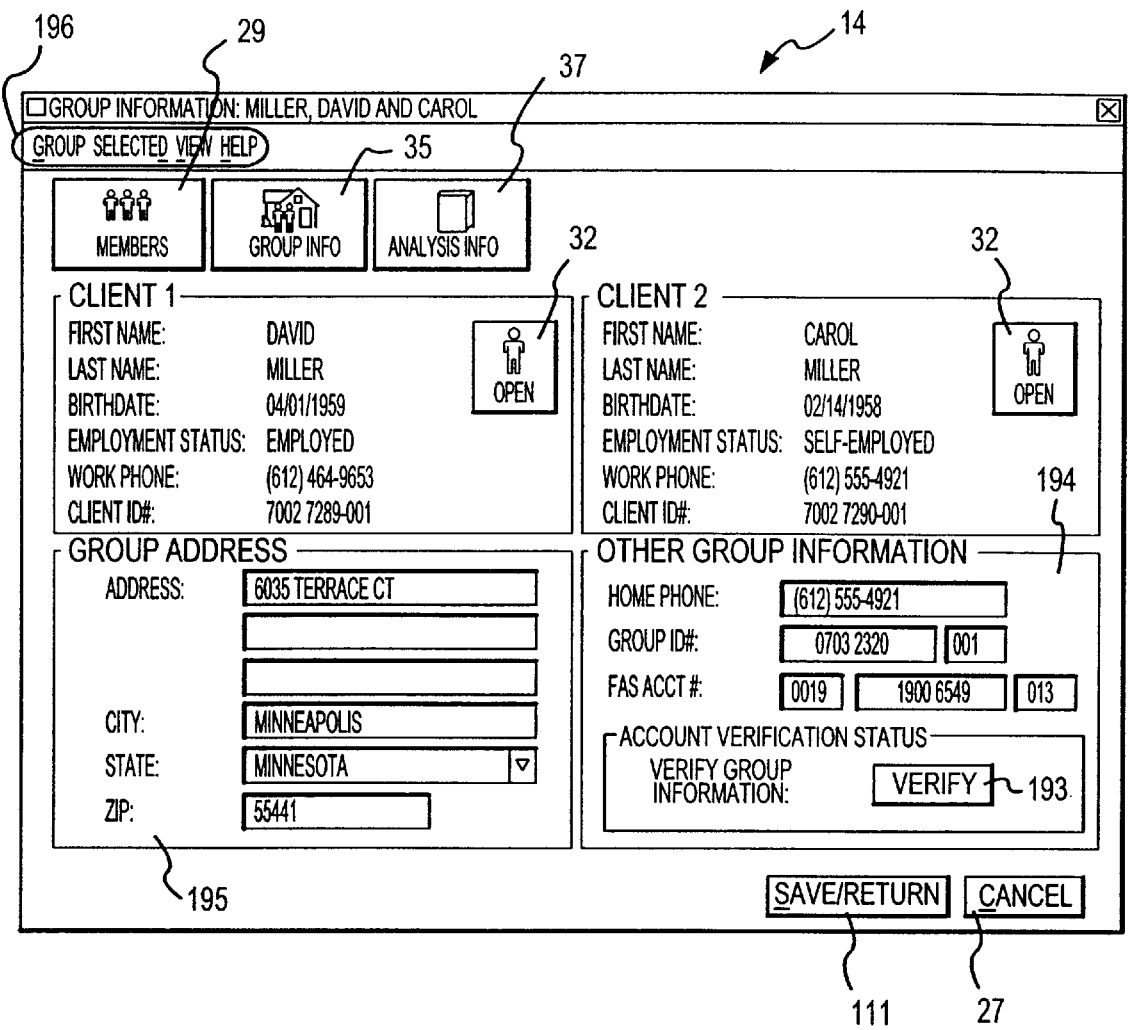
FIG. 11A is an exemplary screen shot of the Group Information window in a preferred embodiment of the present invention.
Figure 12:
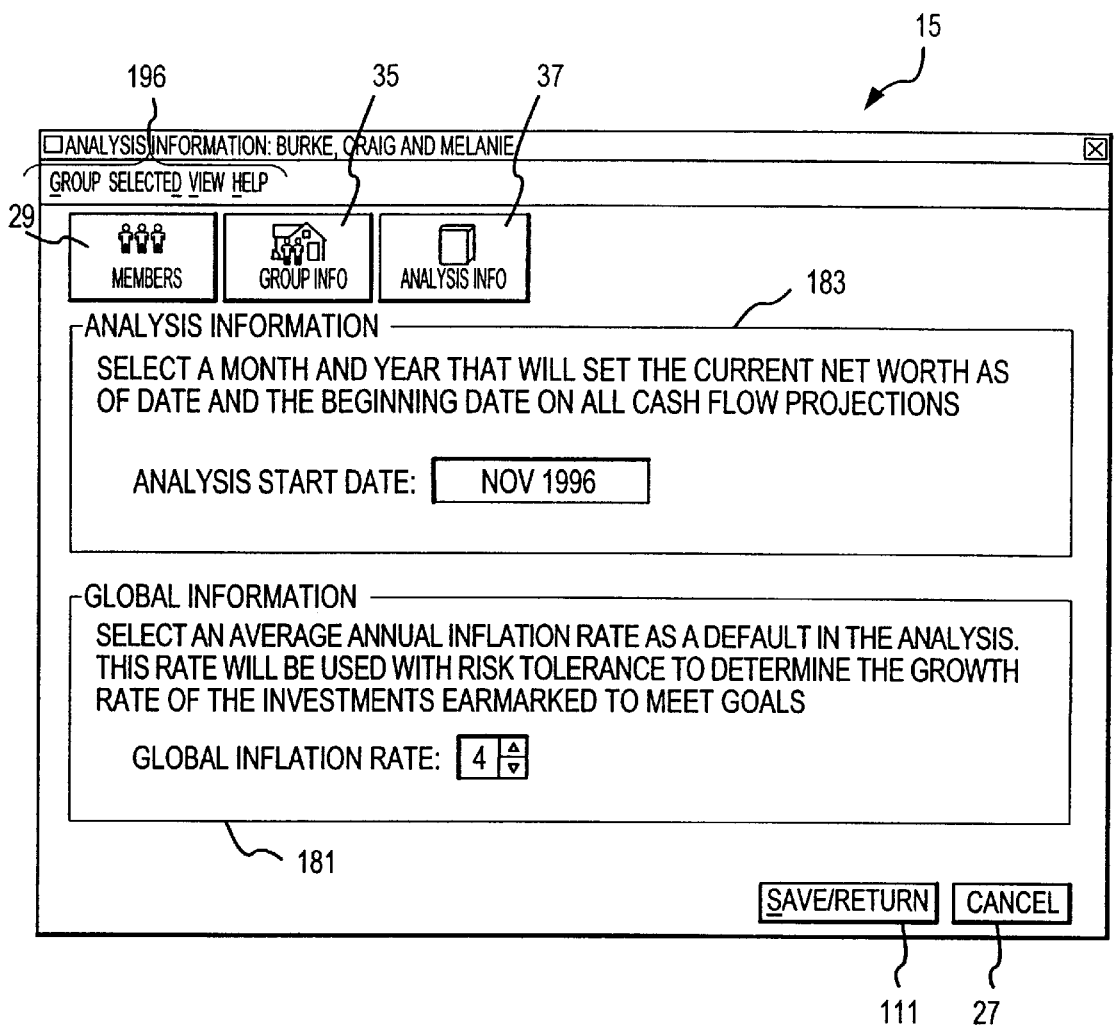
FIG. 12 is an exemplary screen shot of the Analysis Information window in a preferred embodiment of the present invention.

Referring again to FIG. 7B, the advisor preferably enters demographic data on an economic group by suitably selecting the Group Edit button 40, which preferably displays the Group Edit: Members window 12, as shown in FIG. 10. Any of the Group Edit windows shown in FIGS. 10, 11A, and 12 may be displayed by selecting the appropriate button or the appropriate menu bar 196 option (the Members button 29 displays the window, as shown in FIG. 10; the Group Info button 35 displays the Group Information window 14, as shown in FIG. 11A; and the Analysis Info button 37 displays the Group Analysis window 15, as shown in FIG. 12).

Figure 9:
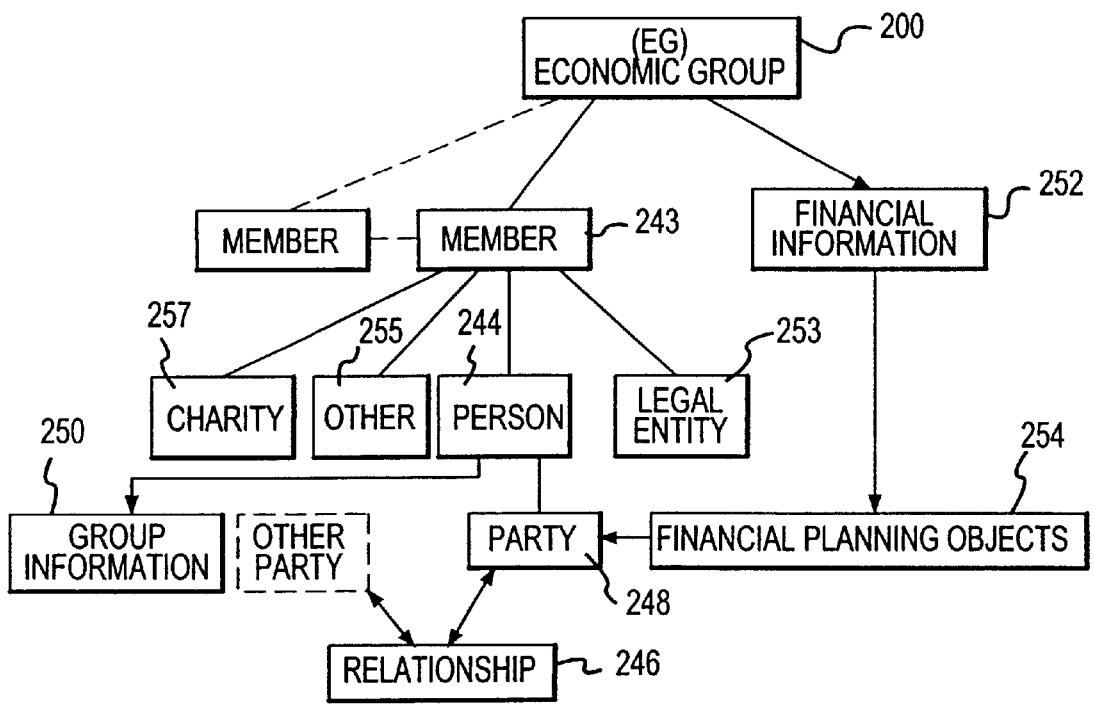
FIG. 9 is a data structure interrelationship diagram which depicts the interrelationships which exist between the various demographic data entered in a preferred embodiment of the present invention.

With reference to FIG. 10 and as shown in FIG. 9, an EG 200 (for example, "Burke, Craig and Melanie") is preferably the highest hierarchical level of demographic data. FAS 10 preferably further subdivides EG 200 ("Burke, Craig and Melanie") into demographically narrowing classifications. The first such classification preferably is Member 243, which identifies the members of an economic group (for example, and as shown if FIG. 10, the members of the economic group "Burke, Craig and Melanie" is preferably comprised of four Persons: Craig Burke, Melanie Burke, Joshua Burke, and Jenny Burke, as shown in the members list field 25). A member 243 may be further classified as being a person 244, legal entity 253, charity 257, or other 255. For the preferred embodiment, legal entity 253 encompasses "legal only" holders of financial instruments including trusts, marital trusts, or the like. The present invention, however, is not to be construed as only recognizing group members specified herein and is not limited to the hierarchical classification discussed above, any form of legal entity including partnerships, corporations, or the like may be suitably recognized by the present invention in any similar hierarchical scheme.

By selecting one of the group member data entry buttons 30, as shown in FIG. 10, information about each group member may be preferably opened, added, removed, modified, saved, or canceled as necessary. The group member data entry buttons 30 are preferably enabled by FAS 10 when logically needed. For example, and as shown in FIG. 10, the Open button 32 and the Remove Person button 34 are not enabled because the advisor has not highlighted a group member in the members list field 25. When a group member is highlighted, preferably FAS 10 enables the Open button 32 and the Remove Person button 34.

Figures 13, 14:
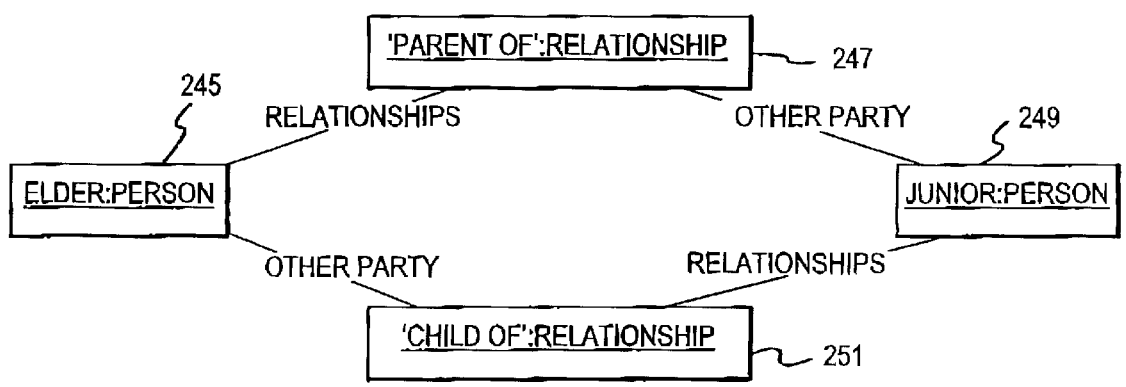
FIG. 13 is an exemplary screen shot of the New Person window in a preferred embodiment of the present invention.
FIG. 14 is a data structure interrelationship diagram which depicts the relationships which may exist between a set of persons in a preferred embodiment of the present invention.

FAS 10 preferably provides for group information 250 and other demographic data for each Person 244. As shown in FIG. 10, when New Person button 33 is selected or a group member listed in the members list field 25 is highlighted and Open 32 is selected, FAS 10 preferably displays the New Person Data Entry window 13, as shown in FIG. 13. The New Person Data Entry window 13 preferably contains a pre-set template wherein the advisor may modify or add data specific to each group member. Additionally, a plurality of buttons 107 allow the advisor to enter information in FAS 10 as needed. Data entered on the New Person Data Entry window 13 is preferably saved by selecting the Save/Return button 111 or the Save/Add Another button 197.

Referring momentarily to FIG. 10, group member data entry buttons 30 also preferably allow the advisor to identify specific members as clients by selecting Set Client 1 & 2 button 36. Clients in FAS 10 are those individuals who form the economic group for which the financial plan is being created. Commonly, an economic group is comprised of two persons (husband/wife, or the like) with each person being designated as a specific client. Currently FAS 10 contemplates only two clients per economic groups, however, as needs change FAS 10 is suitably modified to encompass larger communal relationships without departing from the scope of the present invention.

Figure 15:
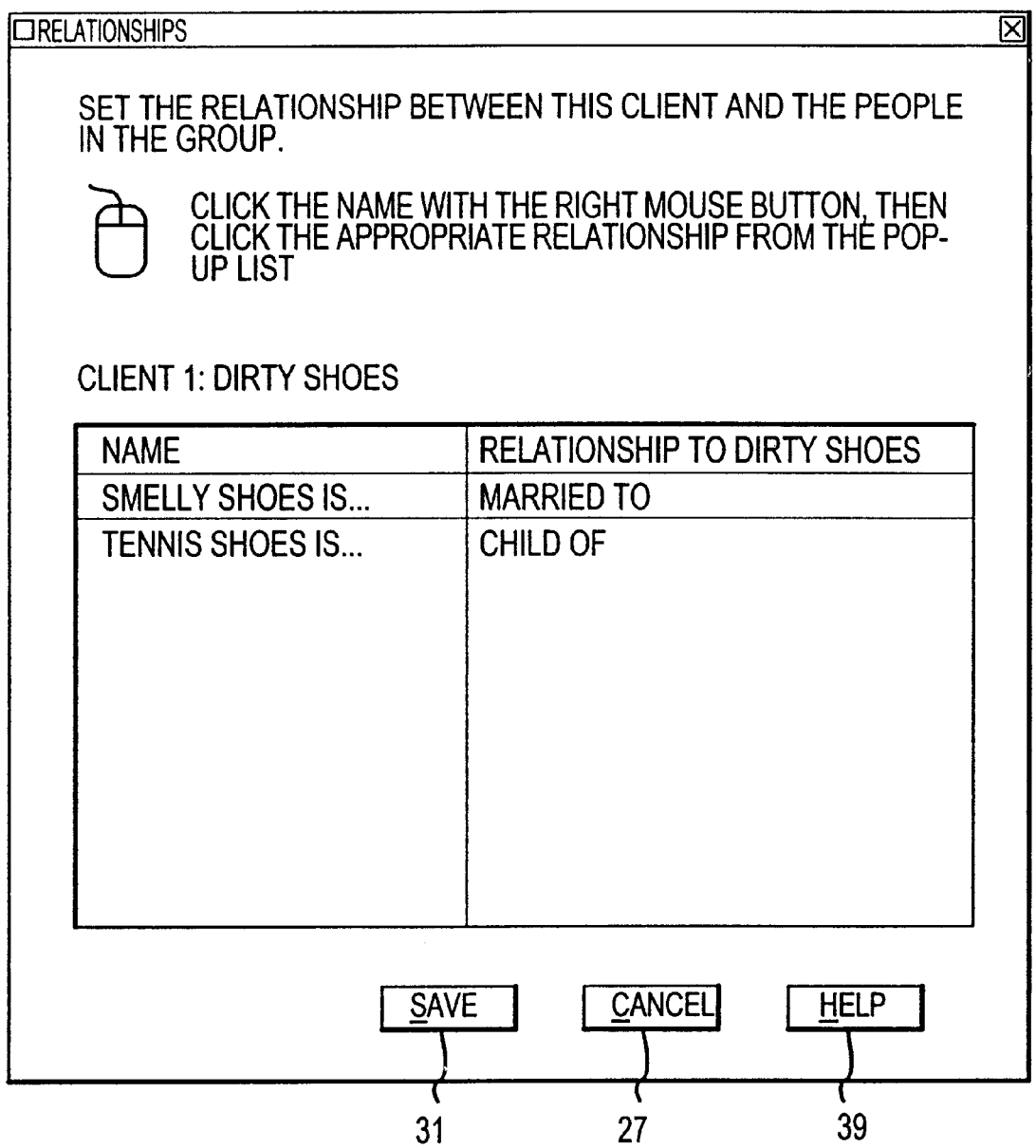
FIG. 15 is an exemplary screen shot of the Relationships window in a preferred embodiment of the present invention.

After the client(s) have been identified, FAS 10 identifies the relationship of one Person 244 to each client by suitably providing the Relationship 246 level of the hierarchy. As shown in FIGS. 9 and 14, a relationship preferably comprises a set of unitary associations between two parties 248. In the case of a parent to a child, two unitary relationships preferably exist (for example, an "Elder: Person" 245 has a "Parent of: Relationship" 247 with a "Junior: Person" 249 who in turn has a "Child of: Relationship" 251 with the "Elder: Person 234"). Upon the advisor highlighting either client 1 (Craig Burke) or client 2 (Melanie Burke), as shown in FIG. 10, FAS 10 preferably enables the Relationships button 38 for the advisor to select. Upon selecting the Relationships button 38 in FIG. 10, FAS 10 preferably displays Relationships screen 19, as shown in FIG. 15. FAS 10 preferably provides the advisor a selection of relationships which may exist between a person and the previously highlighted client (i.e., husband of client 2 (Melanie Burke), wife of client 1(Craig Burke), child of client, and the like). For example, as shown in FIG. 10, Craig Burke has been identified as Client 1 and has a relationship with client 2 (Melanie Burke) of "married to". Similarly, Joshua Burke is the "Child of" both client 1 (Craig Burke) and client 2 (Melanie Burke). FAS 10 preferably only identifies the relationships which exist between the client(s) and other person(s). Non-client relationships (i.e., the sibling relationship between Joshua and Jenny Burke) are preferably not identified, since the goal of FAS 10 is to provide financial planning for the EG 200 (i.e., household) and not for each person comprising the EG 200. However, FAS 10 may be suitably modified as needed to identify such relationships without departing from the scope of this invention.

Detailed information on each group member may preferably be entered, using known data entry techniques, in FAS 10 by selecting the Save/Return button 111. Also, menu bar 24 provides those data manipulation features, commonly known in the art, in addition to those features provided by the group member data entry buttons 30, needed to enter and manipulate data on group members.

As shown in FIG. 11A, FAS 10 also provides for the entry of information on the group. The Group Information window 14 preferably contains information on the client(s) comprising the group. By selecting the Open button 32, the advisor may preferably display the New Person window 13 as shown in FIG. 13 wherein the data entry fields contain previously entered data specific to a particular client. In the Group address field 195, (FIG. 11A)the advisor may preferably enter and update the group's address. In the Other group information field 194, account numbers and the like may be entered, updated, and verified.

Figure 11B:
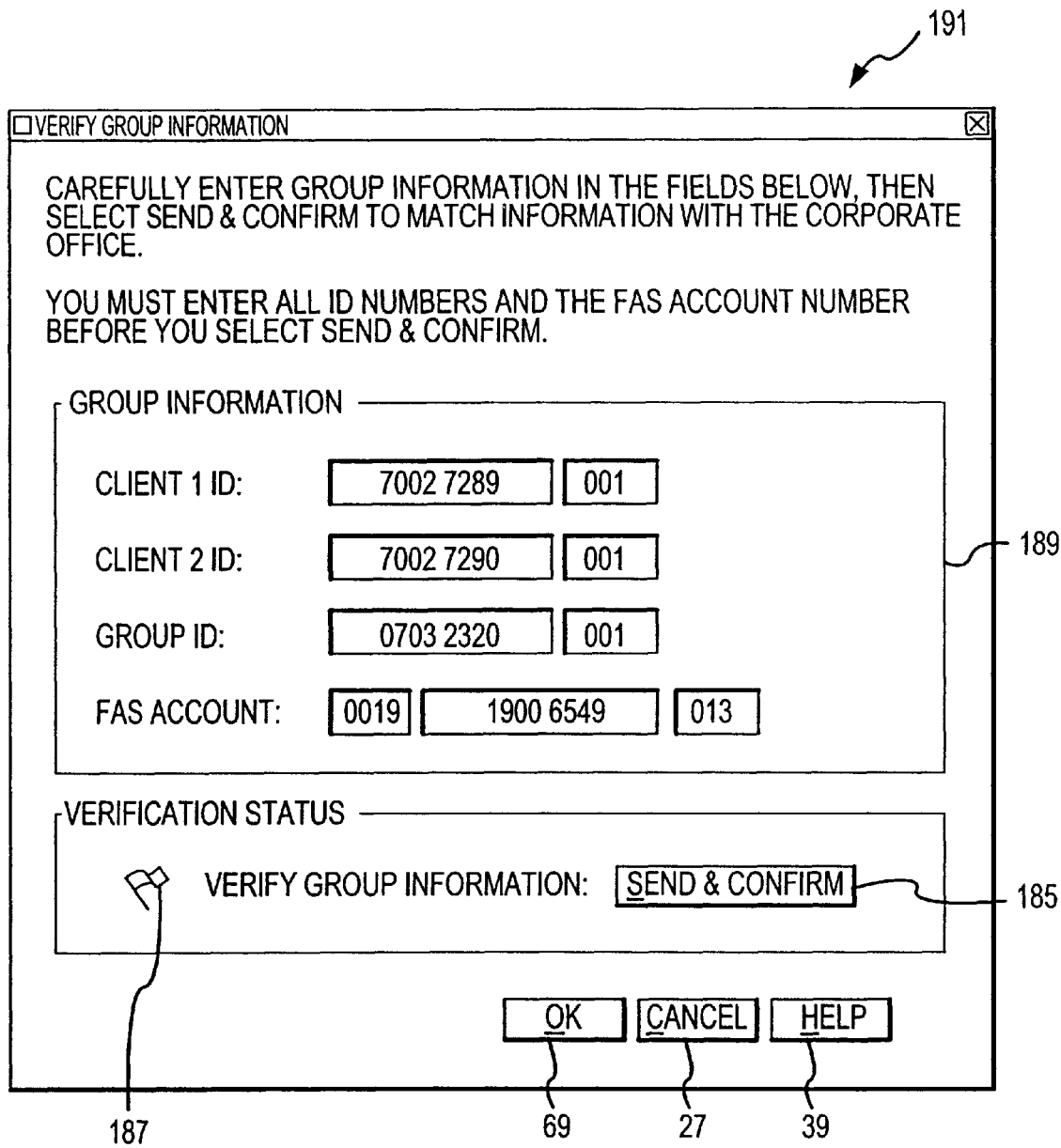
FIG. 11B is an exemplary screen shot of the Verify Group Information window in a preferred embodiment of the present invention.

Additionally, FAS 10 preferably provides for the verification of account numbers with the home office at any time. When the Verify button 193 is selected, FAS 10 preferably displays the Verify Group Information window 191 as shown in FIG. 11B. The Verify Group Information window 191 preferably contains a group information field 189 within which an advisor may suitably enter client and group identification numbers. Additionally, a status flag 187 is provided which provides a graphical representation as to whether the client and group identification numbers have been verified. In a preferred embodiment, a red and white checkered flag is suitably displayed when the identification numbers have not been verified with the home office. Similarly, a black and white checkered flag is suitably displayed when the identification numbers have been verified. An advisor preferably verifies the identification numbers by selecting the Send & Confirm button 185, which suitably connects FAS 10 with the home office and verifies the entered identification numbers against those preferably maintained at the home office.

FAS 10 also preferably allows an advisor to select the start date of the analysis 183 and the global inflation rate 181, as shown on the Analysis Information window 15 (FIG. 12). The analysis start date 183 may preferably be changed from the current month (of the time of the advisor's entry of data) to either three months into the future or one month into the past. This four month window preferably ensures the output of FAS 10 reflects the real world as closely as possible, and not an imaginary world based upon a non-current start date. Similarly, the global inflation rate is preferably set at a rate determined by financial experts at the home office. However, advisors may preferably change the global inflation rate to more accurately accommodate a client's optimism or pessimism of the future. Finally, as shown in FIGS. 10, 11A, and 12, data entries may be suitably saved or canceled at any time by selecting the Save/Return button 111 or the Cancel button 27. Upon selecting either button (31 or 27), FAS 10 preferably displays the FAS Home window 22, as shown in FIG. 7B.

Additionally, as shown in FIG. 9 and previously identified herein, FAS 10 preferably provides an abstract hierarchical class, Party 248. Party 248 further identifies a person by establishing a dependency object from which a relationship may extend or to which Financial Planning Objects 254 (such as bequests, wills, or the like) may refer. FAS 10 additionally provides an association between a person 244 and Client Information 250 (which may contain notes entered by the advisor). Similarly, FAS 10 preferably provides a relational structure between EG 200 and Financial Information 252, Financial Information 252 and Financial Planning Objects 254, and Financial Planning Objects 254 and Party 248. In this manner, FAS 10 preferably ensures the necessary EG 200 information is updated when a related EG 200 object is modified.

While FAS 10 prefers only one EG 200 exists per planning scenario, FAS 10 suitably provides for the generation of multiple financial plans per group. Thus, a FAS 10 database may preferably contain numerous versions of financial plans which represent a group and its members at any designated future point in time. As explained in greater detail below, the advisor preferably selects or creates a specific financial plan at the initiation of FAS 10.

Figure 16:
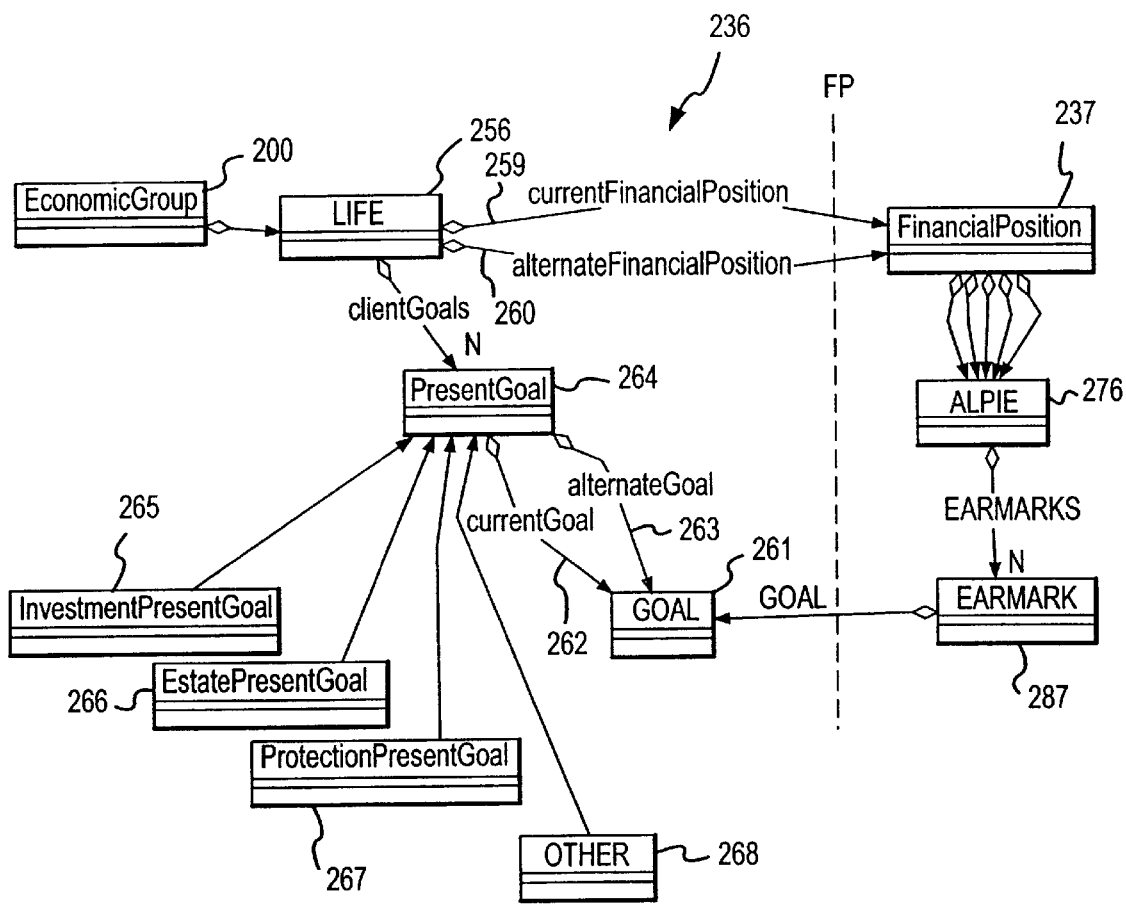
FIG. 16 is a data structure interrelationship diagram which depicts the structure of goals which may exist in a database utilized in a preferred embodiment of the present invention.

As group members change over time (due to death, marriage, job changes, or the like), FAS 10 is configured to suitably notify other FAS 10 program elements of the changes. For example, when a group member gets married, the member's change in marital status may lead to a change in the member's tax position and may necessitate an updating of the group's associated income tax goal. As shown in FIG. 16, FAS 10 preferably ensures these changes are accomplished by broadcasting the change in the Domain Object (the member's marital status) to the LifetimeSituation (LIFE) 256, and an associated FP 237. LIFE 256 and FP 237 are preferably updated to reflect these changes.

Figure 17:
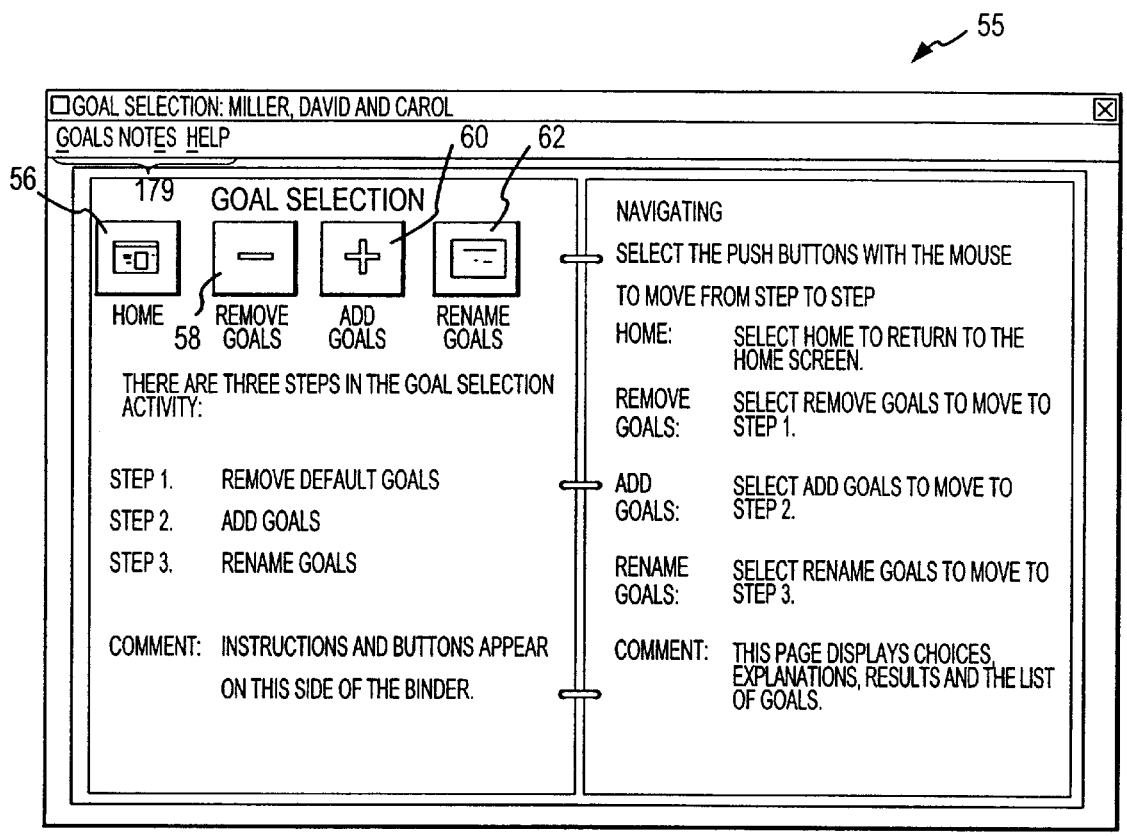
FIG. 17 is an exemplary screen shot of the Goal Selection Intro window in a preferred embodiment of the present invention.

Referring briefly to FIG. 8, another major sub-category in the Domain subsystem 231 is G&S 236, the hub of FAS 10. G&S 236 is preferably selected whenever the advisor desires to update or add new goals by selecting the Goal Selection button 42 (as shown in FIG. 7B) at which time FAS 10 preferably displays Goal Selection Intro window 55 as shown in FIG. 17. The advisor preferably then updates or enters the goals for the household or economic group. However, the present invention is not limited to using screen buttons to access the various program features; any method of selecting a program feature including keyboard entries, buttons, drop-down menus, voice commands, and/or the like is within the scope of the present invention.

FIG. 16 displays an exemplary high level diagram of a preferable G&S 236 architecture according to the present invention. One skilled in the art will appreciate that any suitable architecture is within the scope of the present inventions. FIG. 16 also displays the interactions which preferably occur between Economic Groups 200 and FP 237 with G&S 236. Preferably, at the top of G&S 236 hierarchy is LIFE 256, which provides the interfaces necessary between EG 200 and FP 237. FAS 10 preferably provides two scenarios, although other suitable scenarios are contemplated, for modeling the interactions between the various Domain subsystems, these are the Current View (CV) 259 and the Alternate View (AV) 260. CV 259 preferably reflects the EG's 200 current financial position and current goal assumptions. AV 260 preferably reflects the results in the group's financial plan if their financial position and/or goal assumptions are varied. Preferably, FAS 10 includes two FPs 237 to reflect CV 259 and AV 260. Similarly, preferably each goal has a set of current and alternate goal assumptions, based upon which FAS 10 suitably creates a current and alternate view of LIFE 256.

The next hierarchical layer below LIFE 256 in G&S 236 are preferably the goals. FAS 10 preferably sub-divides goals into two component parts Present Goal 264 and Goal 261. Generally, Present Goal 264 suitably provides the interface between LIFE 256 and Goal 261. Additionally, Present Goal 264 preferably knows the plan content. Each Present Goal 264 preferably has both a Current Goal 262 and an Alternate Goal 263, which are displayed in FIG. 16 as Goal 261. Goal 261 preferably knows the assumptions for a specific goal(current or alternate) and provides assistance in the simulation of a specific goal's achievement. FAS 10 may suitably be configured so as to simulate numerous goals (each with a current and alternate set of assumptions).

As shown in FIG. 17, Goal Selection Intro window 55 preferably provides for the adding, removing, and modifying of goals. An advisor may select (via the corresponding buttons) one of four options: to return to the FAS Home window 22 by selecting the Home button 56; the Remove Goals button 58; the Add Goals button 60; and, the Rename Goals button 62 (which preferably allows an advisor to name a client's specific goals in language the client prefers and/or understands (for example, a goal may be named, "provide for John's Harvard education").

FAS 10 preferably allows numerous goals to be entered, these include present investment goals 265, estate planning goals 266, protection goals 267, and other goals 268 (the operation of which, for simplicity sake, are modeled by Goal 261). The present invention, however, is not to be construed as being limited to those goals displayed or identified because any suitable financial planning or related goal is within the scope of the present invention.

Figure 18:
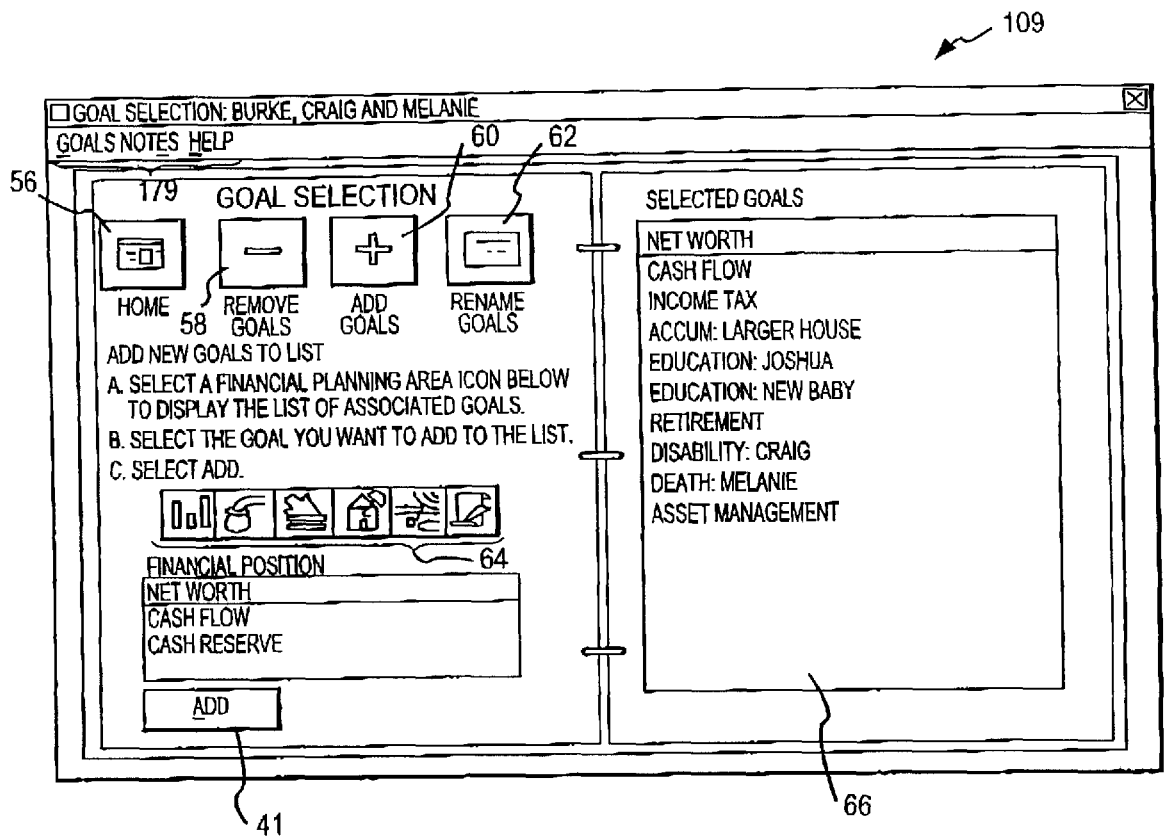
FIG. 18 is an exemplary screen shot of the Goal Selection window in a preferred embodiment of the present invention.

Upon selecting the Add goals button 60, FAS 10 preferably displays the Goal Selection window 109, as shown in FIG. 18.

As shown, a plurality of financial planning icons 64 are displayed and are available for arranging specific goals in groupings or categories (for example: education, net worth, accumulation, death, estate, or the like). These goals are preferably further identified in FAS 10 as either investment goals (education, retirement, new car, or similar investment requirements) or protection goals (death, disability, i.e., "interrupted" financial events). In the present invention, any number of icons or groupings may exist without departing from the spirit or scope thereof. After a financial planning icon 64 is selected and entered into FAS 10 by selecting Add button 41, the advisor may preferably identify the new goal by giving it a distinct name (for example: Education: Anne).

Figure 19A:
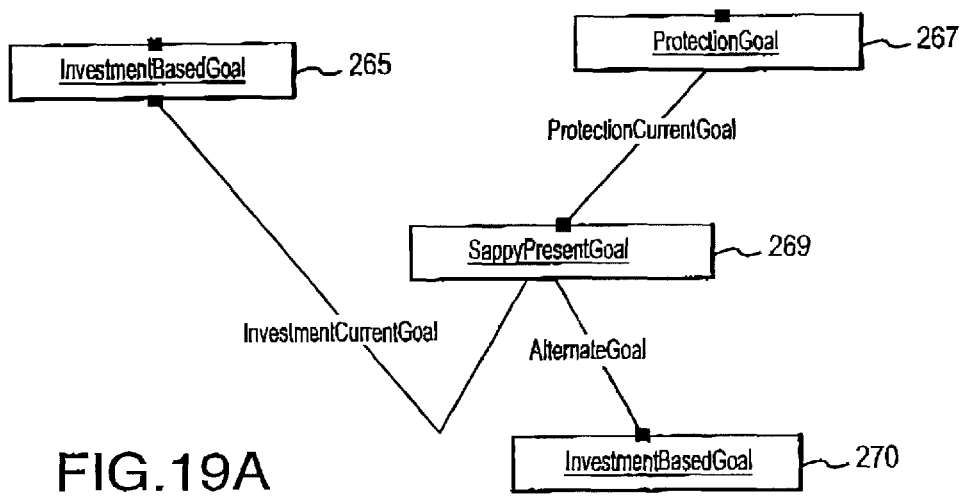
FIG. 19A is a data structure interrelationship diagram which depicts the relationships which may exist between an investment goal and a protection goal in a preferred embodiment of the present invention.

Additionally, FAS 10 preferably considers the effect of a protection event on the achievement of the investment goal(s). This consideration preferably occurs in an investment model entitled SappyPresentGoal ("Sappy") 269, as shown in FIG. 19A. Sappy 269 is preferably the modification of the assumptions related to the investment based goal 265 based upon the occurrence of the protection goal 267 (goal assumptions are discussed in greater detail below). This Sappy Investment Based Goal 270 replaces the investment based present goal 265 if the protection goal 267 arises. For example, in the event Craig Burke (a hypothetical client) unexpectedly dies, Craig Burke wants his son Joshua to go to Kansas State University instead of Harvard. Sending Joshua to Harvard represents Craig's Investment present goal 265. Sending Joshua to Kansas State University represents Craig's Sappy investment goal 270.

As changes within a group occur with the passing of time, the advisor may need to re-identify the goals previously entered. The present invention preferably allows the advisor to re-identify goals without necessarily having to reenter the underlying data. FAS 10 also preferably displays the selected goals field 66 (FIG. 18) so the advisor may readily verify the selected goals, and may delete, add, or rename goals, as desired.

Figure 19B:
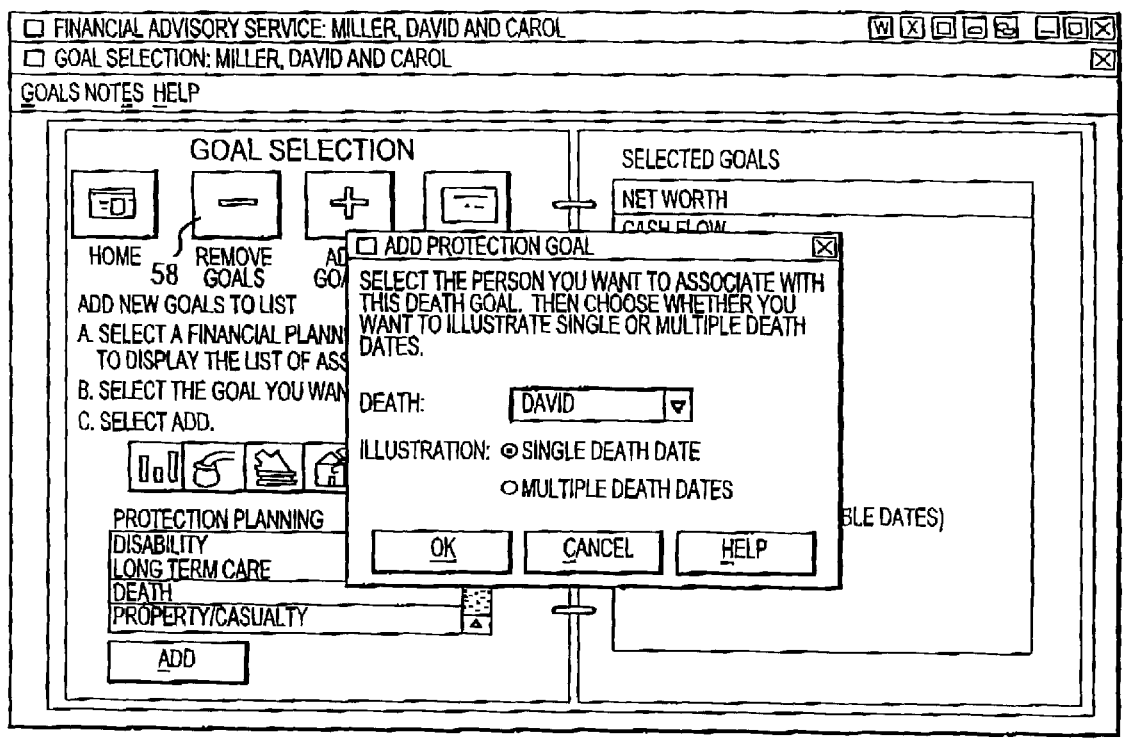
FIG. 19B is an exemplary screen shot of the Add Protection Goal window in a preferred embodiment of the present invention.

In addition to providing for a single death scenario protection goal (i.e., where the client dies on a predetermined date), FAS 10 suitably provides for the simulation of multiple dates of death. As shown in FIG. 19B, since an advisor normally cannot accurately predict a client's date of death, FAS 10 preferably provides protection goals of either single death or multiple deaths, (i.e., where the client's date of death is simulated to occur at different dates and the goal calculations are based upon these multiple dates of death).

After the advisor has preferably entered the demographic data on the group and the goals of the group, the advisor preferably selects the Data Entry button 44 as shown in FIG. 7B. While FAS 10 is preferably designed such that the entry of information for a group by an advisor follows a pre-defined sequence (i.e., demographic data—goals—Data Wrapper data—assumptions—alternate view), FAS 10 may be suitably modified to accommodate any data entry sequence without departing from the scope of the present invention. However, in a preferred embodiment, an advisor preferably enters data in sequential order (from the top to the bottom) as shown by layout of the buttons 26. in FIG. 7B.

Figure 20:
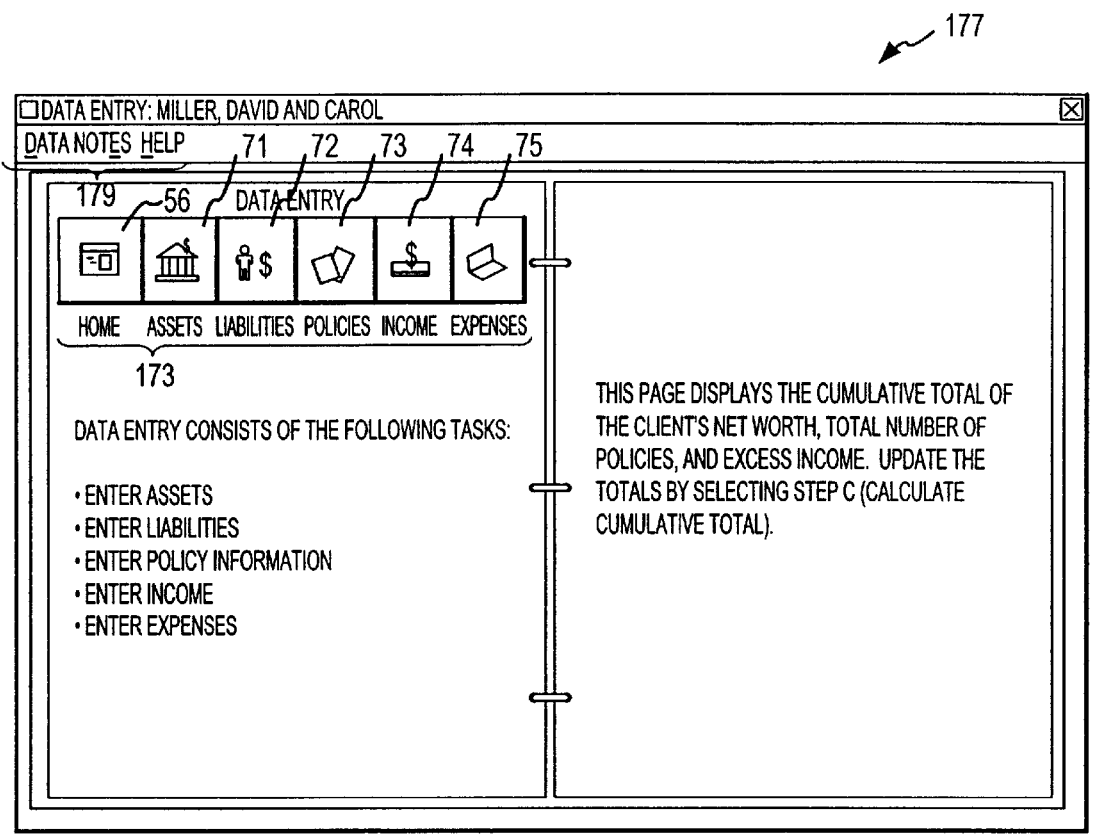
FIG. 20 is an exemplary screen shot of the Data Entry Intro window in a preferred embodiment of the present invention.
Figure 21:
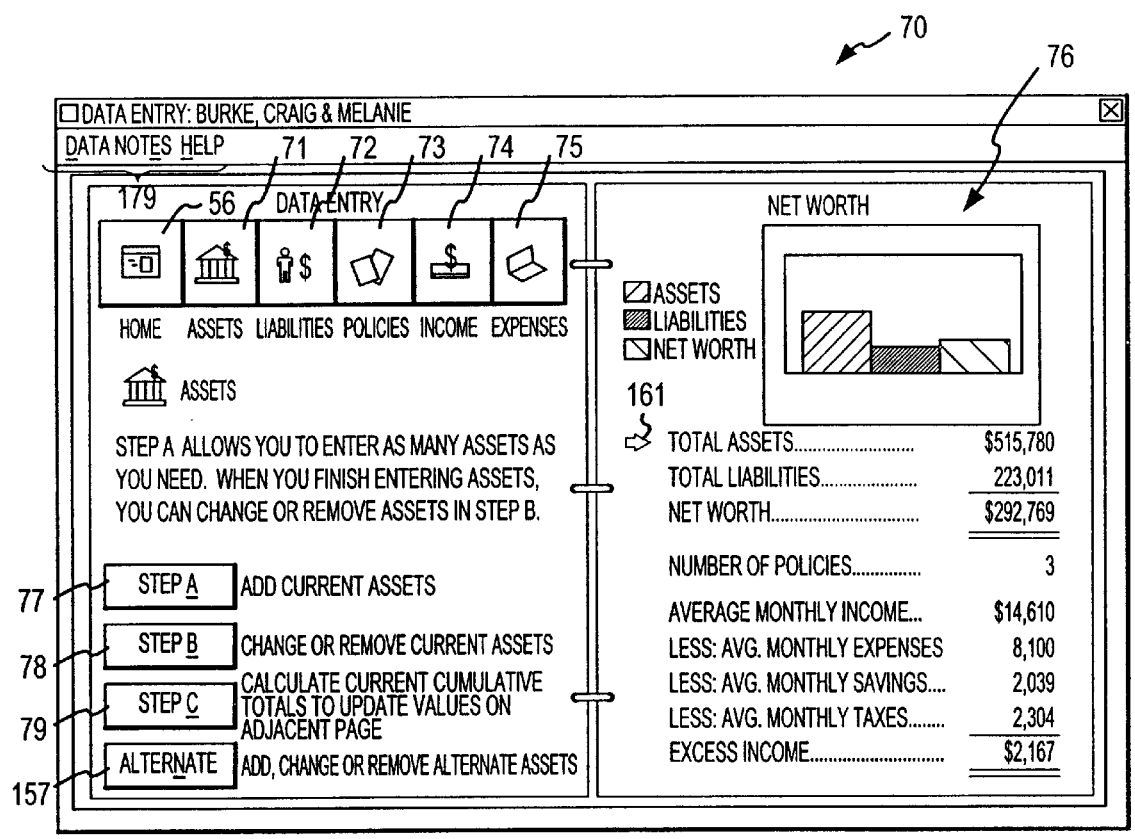
FIG. 21 is an exemplary screen shot of the Data Entry window in a preferred embodiment of the present invention.

When the Data Entry button 44 is selected, an advisor suitably accesses the FP 237 sub-category of the Domain subsystem 231 in FAS 10, at this time FAS 10 preferably displays the Data Entry Intro window 177 as shown in FIG. 20. As previously stated, FP 237 simulates the client's financial environment. Included within FP 237 are numerous Data Wrappers which contain the client's Assets, Liabilities, Policies, Income, and Expenses (ALPIE) 276—the various balance sheet and income statement items which reflect a client's financial world. A typical client will often have numerous ALPIE objects in each Data Wrapper, with the numerous Data Wrappers determining the group's financial position. To simplify the entry of ALPIE data objects, FAS 10 suitably provides a series of buttons 173 which allow an advisor to enter data for a specific ALPIE category. Home button 56 preferably returns the display to the FAS Home window 22. Assets button 71 preferably displays the Data Entry Net Worth window 70 as shown in FIG. 21 with the arrow 161 preferably indicating the assets line in the net worth field 76, while also preferably allowing access to suitable asset templates. Similar, functionality and placement of the arrow in the net worth field 76 is provided by the Liabilities button 72, Policies button 73, Income button 74, and Expenses button 75. Additionally, the Data Entry Intro window 177 preferably includes a menu bar 175 which provides suitable access to FP 237 features.

FAS 10 preferably allows an advisor to manage ALPIE 276 data as necessary by entering, displaying, graphing, adding, removing, calculating, and performing many other operations and activities with the data in each category, while also displaying summary information, such as that displayed in the Net Worth Field 76, as shown in FIG. 21. When Assets button 71 is selected, FAS 10 preferably enables access to the asset classifications and data entry windows. An advisor may add assets by selecting the Step A button 77, change or remove assets by selecting the Step B button 78, or calculate the cumulative total of the assets by selecting the Step C button 79. FAS 10 preferably provides the Step A, B, and C buttons (77, 78, and 79) for the remaining ALPIE 276 categories with similar features as discussed here in the context of the assets classification. Additionally, an alternate view of the client's ALPIE 276 data may be suitably entered into FAS 10 by selecting the Alternate button 159 (the alternate view is discussed in greater detail below).

Figure 22:
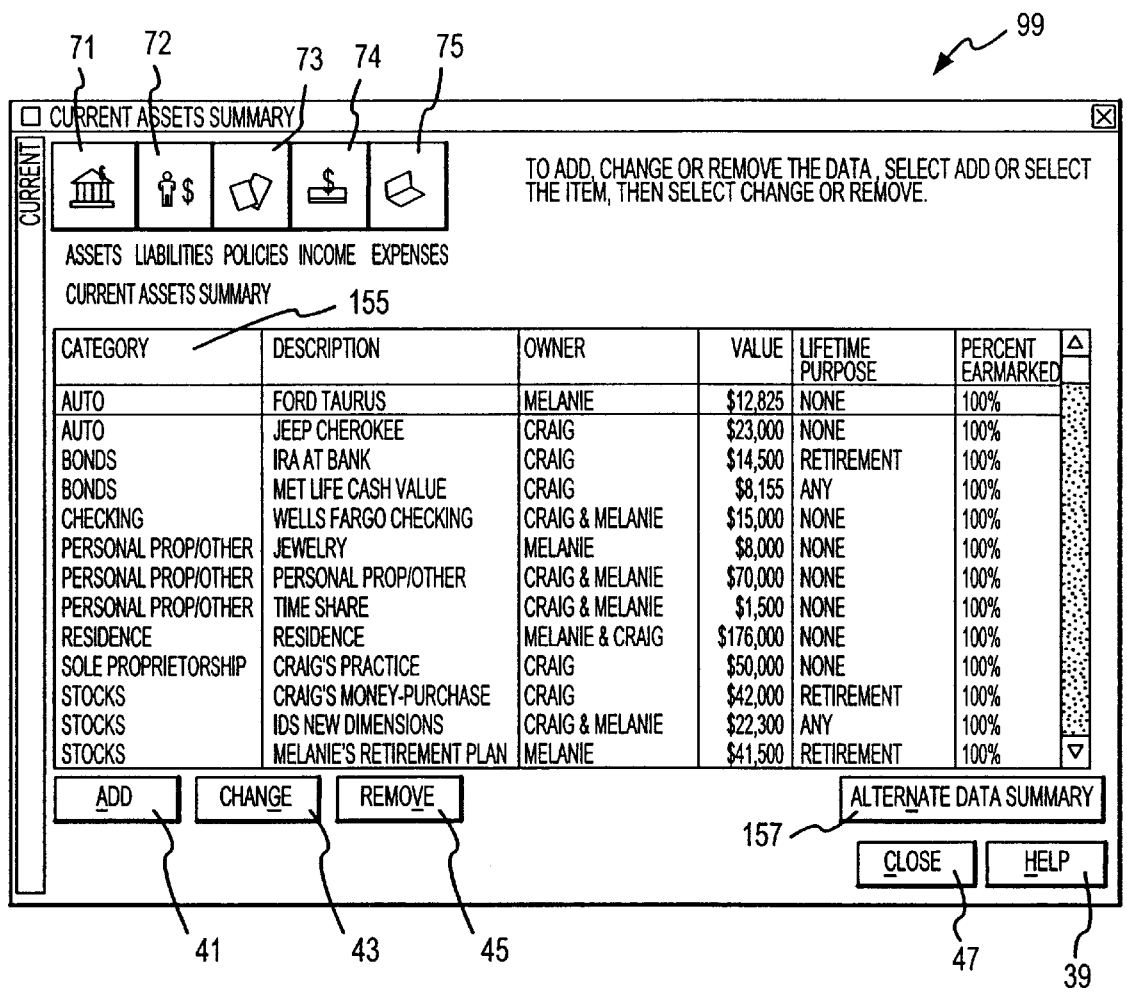
FIG. 22 is an exemplary screen shot of the Current Assets Summary window in a preferred embodiment of the present invention.

When an advisor selects Step B button 78, FAS 10 preferably displays the previous entries in that ALPIE 276 category, for example the Assets category, as shown in FIG. 22. A similar display is preferably displayed for the other ALPIE 276 categories whenever the Step B button 78 is selected. The Close button 47 preferably returns FAS 10 to the previous data entry window, in this case the Data Entry: Assets window 70, as shown in FIG. 21. The Alternate Data Summary . . . button 157 preferably displays the alternate ALPIE 276 data (discussed in greater detail below). By selecting the Add button 41, or by suitably highlighting previously entered data in the data summary field 155(as shown in FIG. 22, the line for "Auto" has been highlighted) and selecting the Change button 43 an advisor may add or change ALPIE 276 data entries. Upon selecting either the Add button 41 or the Change button 43, FAS 10 preferably displays a template which contains predetermined fields for entering and/or editing information preferably used to describe the particular ALPIE 276 data. For example, FIGS. 23–27 show the FP 237 templates for each ALPIE 276 category, respectively. Additionally, an advisor may remove a previously entered ALPIE data object by suitably highlighting in the data summary field 155 the previously entered ALPIE data object and selecting the Remove button 45.

Figure 23:
FIG. 23 is an exemplary screen shot of the Assets Template window in a preferred embodiment of the present invention.

Referring now to FIG. 23, Assets template window 299, FAS 10 preferably provides data entry fields for a plurality of asset related facts. For example, FAS 10 preferably provides entry fields for the following information (wherein, in a preferred embodiment, the "*" designates those fields in which data is required):

a. Category 300 (stocks, savings accounts, mutual funds, or the like);
b. Description 301 (provides textual information as to origin, company, or the like);
c. Owner 302 (the owners are preferably either client 1, client 2, or both);
d. Current value 303;
e. Tax status 304;
f. Lifetime purpose 305 (preferably allows an advisor to specifically designate a particular asset toward the achievement of a specific goal (for example a mutual fund may be specifically designated toward retirement), designating the lifetime purpose as "any" preferably allows FAS 10 to earmark the asset to any goal (earmarking is described in greater detail below);
g. Percent earmarked 306;
h. Related Liability 307 (often an asset, such as a home or car will also have a mortgage or loan attached to it, FAS 10 preferably takes into consideration such relationships in simulating a clients financial plan);
i. Add Liability button 298 (preferably FAS 10 displays the Liability Template window 171 as shown in FIG. 24);
j. Asset allocation 308 (preferably FAS 10 allows an advisor to specify how a group of assets (for example, an investment portfolio) is allocated;
k. Percent yield 309;
l. Maturity date 310 (preferably used for information purposes only);
m. Cost basis 311;
n. Legal title 312 (preferably FAS 10 recognizes the various legal ownership titles which may exist in any location and simulates the financial plan based thereon);
o. Specify Beneficiaries button 313 (allows an advisor to designate the beneficiary of an asset upon the death of the owner 302);
p. Liquid at death of 314 (allows an advisor to preferably designate whether an asset is liquid at the death of the Owner 302); and
q. "Community prop" 315 (allows an advisor to suitably designate whether a specific asset is community property, when applicable).

Similarly, in FIG. 24, Liabilities Template window 171, FAS 10 preferably provides data entry fields for a plurality of liability related facts, such as, for example: Category 316, Description 317, and Related asset 318; Add Asset button 319 (when selected, FAS 10 preferably displays the Assets Template window 299, as shown in FIG. 23); Payment type 321 and Calculation method 322; Terms of the liability 323 including interest rate, balance, and the like; Solve For button 324 (FAS preferably includes a financial calculator capable of determining a loan term based upon the entry of the remaining loan terms); and Paid at death of 325 (which provides for the designation of whether a liability continues into probate or intestacy asset distribution considerations).

Figure 25:
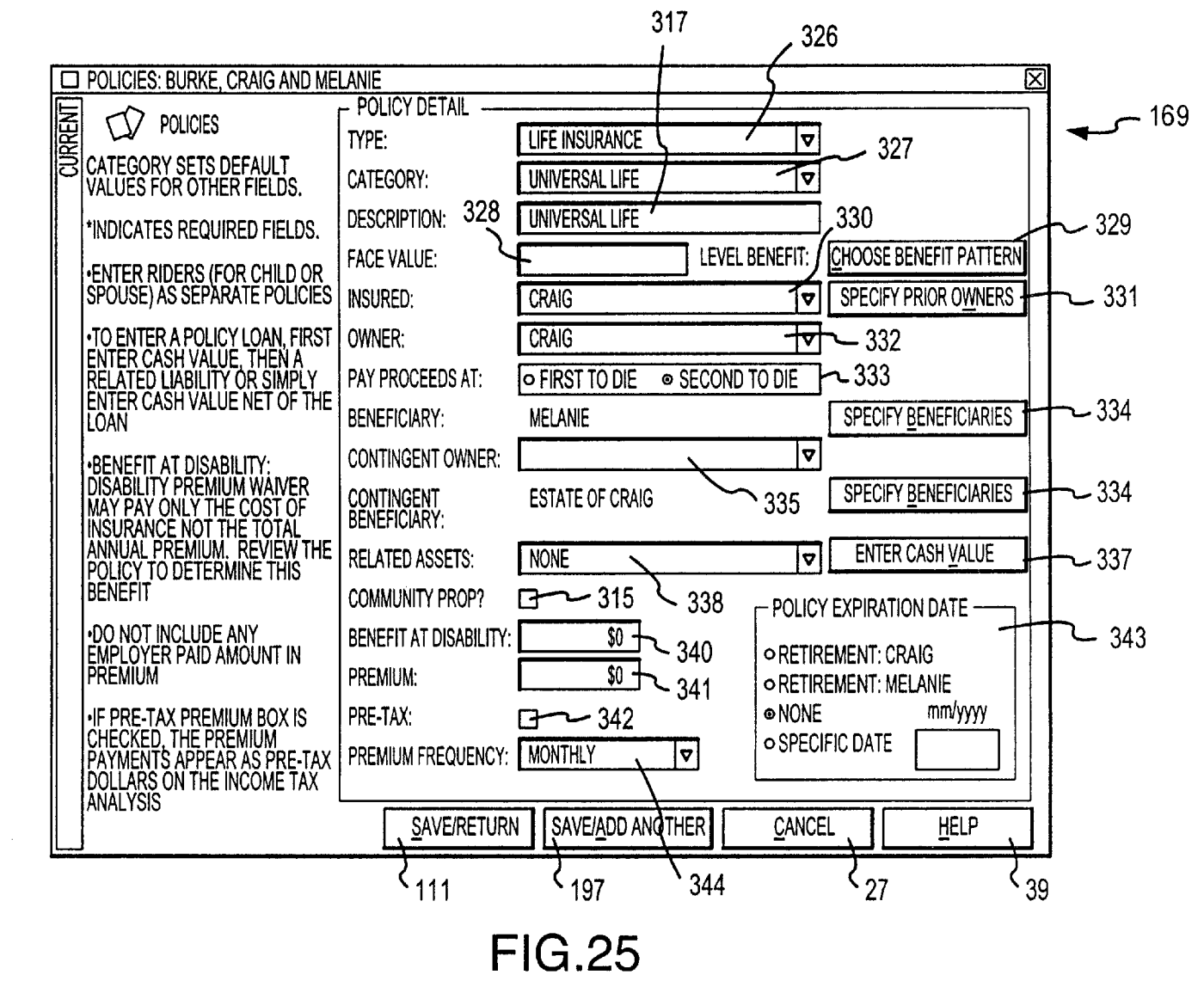

Similarly, with reference to FIG. 25, in Policies Template window 169, FAS 10 preferably provides data entry fields for a plurality of policy related facts, including but not limited to: Type 326, Category 327, Description 317, and Face value 328; Choose Benefit Pattern button 329 (preferably FAS 10 allows an advisor to choose the numerous benefit patterns available to holders of financial policies); Insured 330, Owner 332, and Specify Prior Owner button 331 (preferably FAS 10 allows an advisor to designate prior owners such that a chain of title may be suitably simulated); Pay proceeds at 333; specifying both the primary and contingent beneficiaries by selecting the Specify Beneficiaries button 334; Related asset 338 and the cash value of the asset by selecting the Enter Cash Value button 337; Community property 315; Benefit at disability 340; Premium 341; Premium frequency 344; and the Policy expiration date 343.

Figure 26:
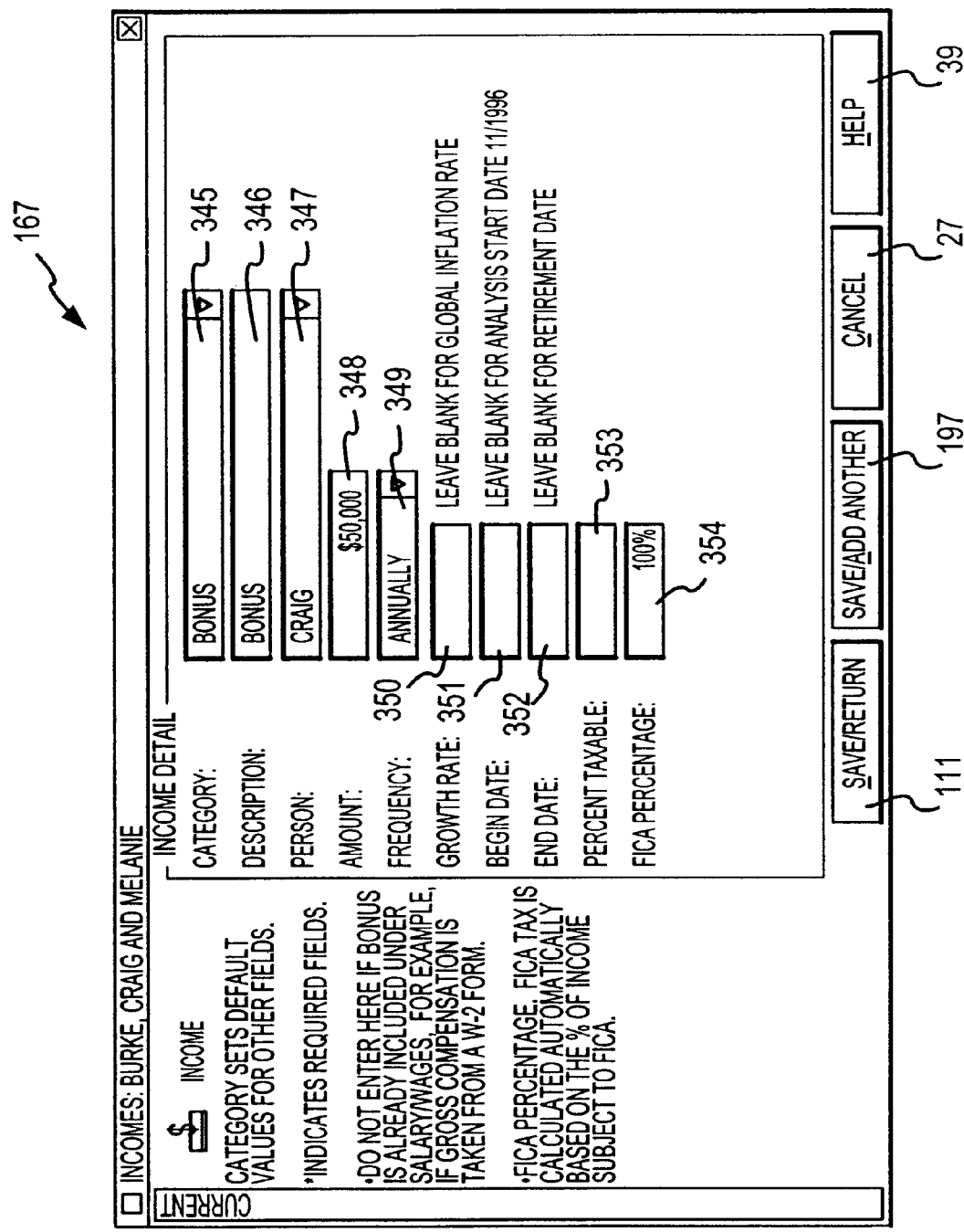
FIG. 26 is an exemplary screen shot of the Incomes Template window in a preferred embodiment of the present invention.

Similarly, with reference to FIG. 26, in Income Template window 167, FAS 10 preferably provides data entry fields for a plurality of income related facts, including but not limited to: Category 345; Description 346; Person 347 (preferably one of the members of the household previously identified); Amount 348; Frequency 349; Growth rate 350; Begin date 351; End date 352; Percent taxable 353; and FICA percentage 354.

Figure 27:
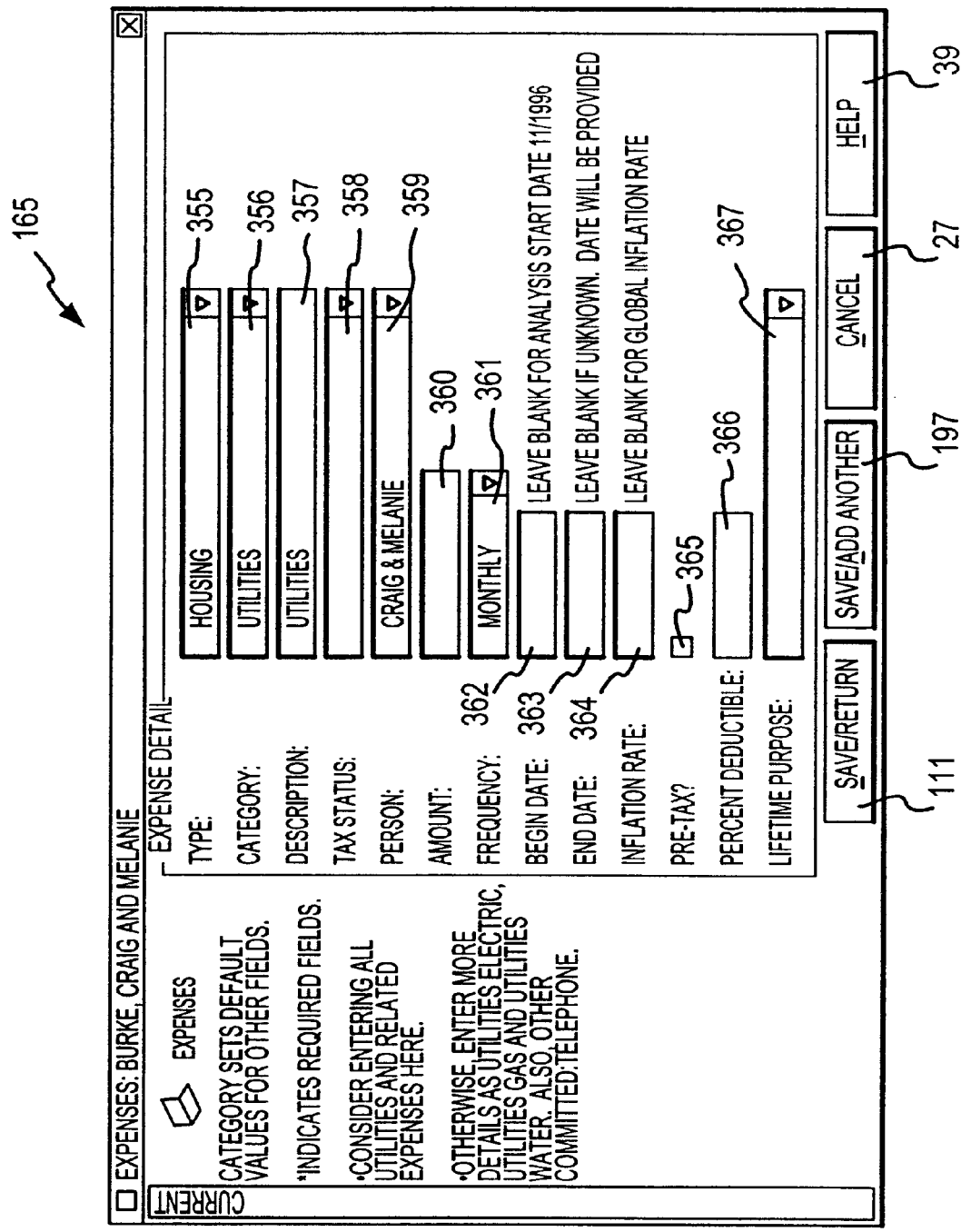
FIG. 27 is an exemplary screen shot the Expenses Template window in a preferred embodiment of the present invention.

Similarly, with respect to FIG. 27, in Expense Template window 165, FAS 10 preferably provides data entry fields for a plurality of expense related facts, including but not limited to: Type 355; Category 356; Description 357; Tax status 358; Person 359 (i.e., which client(s) is responsible for paying the expense); Amount 360; Frequency 361; Begin date 362; End date 363; Inflation rate 364; Pre-tax? 365; Percent deductible 366; and Lifetime purpose 367.

In addition to the numerous data fields shown in FIGS. 23–27, FAS 10 may be suitably modified with numerous other variables which may be added or subtracted from the present invention without departing from the scope of the present invention. Additionally, FAS 10 preferably provides on-screen instructions for each ALPIE template window shown in FIGS. 23–27, which enable an advisor to complete the necessary information on each window. FAS 10 preferably also enables specific data fields only when the data requested is needed or relevant (for example, as shown in FIG. 27, when an advisor enters utility related expenses the lifetime purpose field 367 is disabled). As shown in FIGS. 23–27, FAS 10 preferably allows the advisor to Save/Return 111, Save/Add Another 197, or Cancel 27 a data entry by selecting the corresponding "button". Additionally, on-line help is provided via the Help button 39. The ALPIE data entry templates utilize known in the art data entry techniques including up & down arrows, buttons, check boxes, and the like; however, any known in the art data entry technique is within the scope of the present invention.

Lastly, the data entry categories shown in FIGS. 23–27 are not to be construed as the only categories of data which FP 237 may utilize. FP 237 may be suitably modified to account for additional or different information without departing from the spirit or scope of the present invention.

Figure 28:
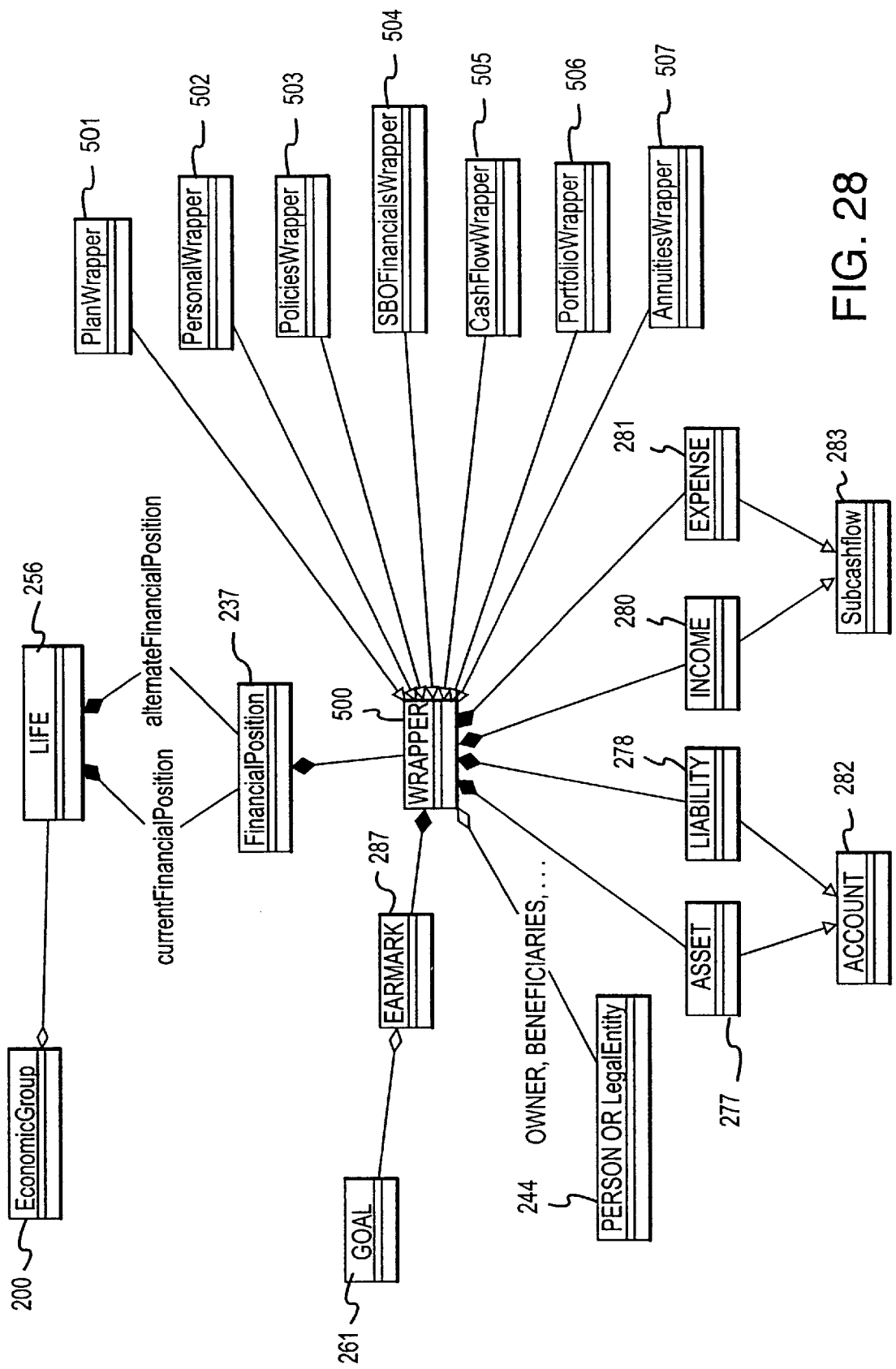
FIG. 28 is a data structure interrelationship diagram which depicts the relationships which may exist between various financial position categories in a preferred embodiment of the present invention.

Referring now to FIG. 28, upon entry of the ALPIE 276 financial information, FP 237 preferably combines relevant ALPIE 276 data (Assets 277, Liabilities 278, Income 280, and Expenses 281) to create two classifications of data: Account 282, and Sub Cash Flow 283. Account 282 is preferably one of numerous subclassifications of data including, but not limited to: asset classifications (further including: general partnership, checking, rental real estate, tax exempt bonds, etc.); liability classifications (further including: first residence liability, charge account liability, auto loans, etc.); and the like. The Sub Cash Flow 283 classification similarly includes numerous subclassifications such as: wages, tips, living expenses, utility expenses, and the like. Each of these Accounts and ALPIE data objects are combined under a Data Wrapper 500. For example, Data Wrapper 500 may exist for a Plan Wrapper 501 (items such as savings accounts and the like), a Personal Wrapper 502, a Policies Wrapper 503 and the like. For example, a House (an asset) often has a mortgage (an associated liability account identified in FIG. 28 as a Liability 278). As mortgage payments are paid, often the equity in the house will increase. Thus, FP 237 suitably configured to model such payments.

Also, as shown in FIG. 28, each Account 282 and Sub Cash Flow 283 is preferably identified in FP 237 with a specific domain component 285. As the Account 282 or Sub Cash Flow 283 subcategories vary, the domain component 285 preferably ensures other program elements ("observers") in FAS 10 are suitably updated.

FP 237 also provides suitable interfaces with the EG 200 to allow Data Wrappers 500 to be related to demographic classifications previously entered such as "Person . . . Legal Entity" 244. These interfaces preferably enable FAS 10 to suitably simulate events such as death, during which changes in cash flow, assets, and/or the like may occur.

Figure 29:
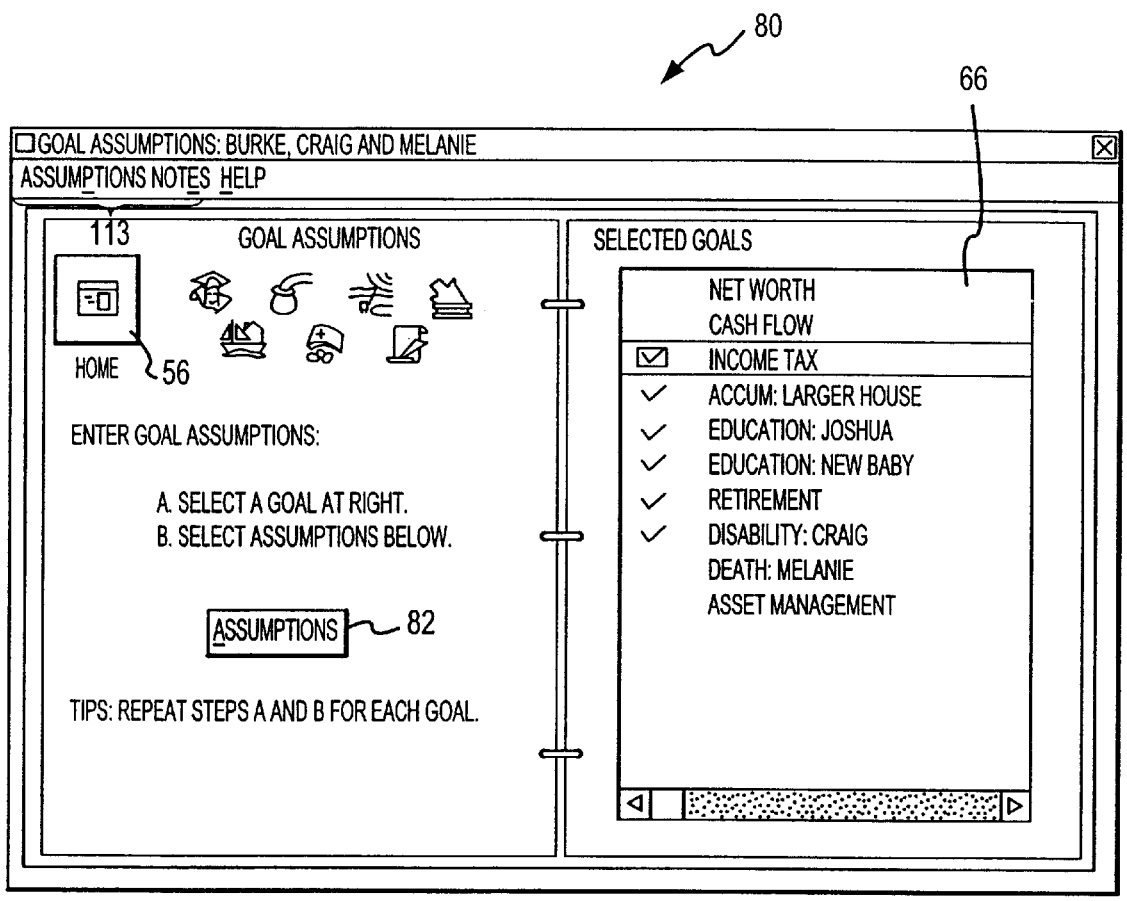
FIG. 29 is an exemplary screen shot of the Goal Assumption Intro window in a preferred embodiment of the present invention.

After the Data Wrapper 500 and ALPIE 276 data has been entered into FAS 10, an advisor is preferably returned to the FAS Home window 22, as shown in FIG. 7B. The next button an advisor preferably selects is Goal Assumptions 46, which upon selection FAS 10 preferably displays the Goal Assumptions Intro window 80, as shown in FIG. 29. Goal Assumptions Intro window 80 displays the selected goals 66 and allows the advisor to select a particular goal and modify the parameters associated with the particular goal by selecting Assumptions button 82, at which point goal specific variables are modified as needed. Any method known in the art for selecting an entry on a screen is within the scope of the present invention for any screen, including: highlighting, touch sensitive screens, keyboard entry, voice commands, mouse "clicking," or the like.

Figure 30:
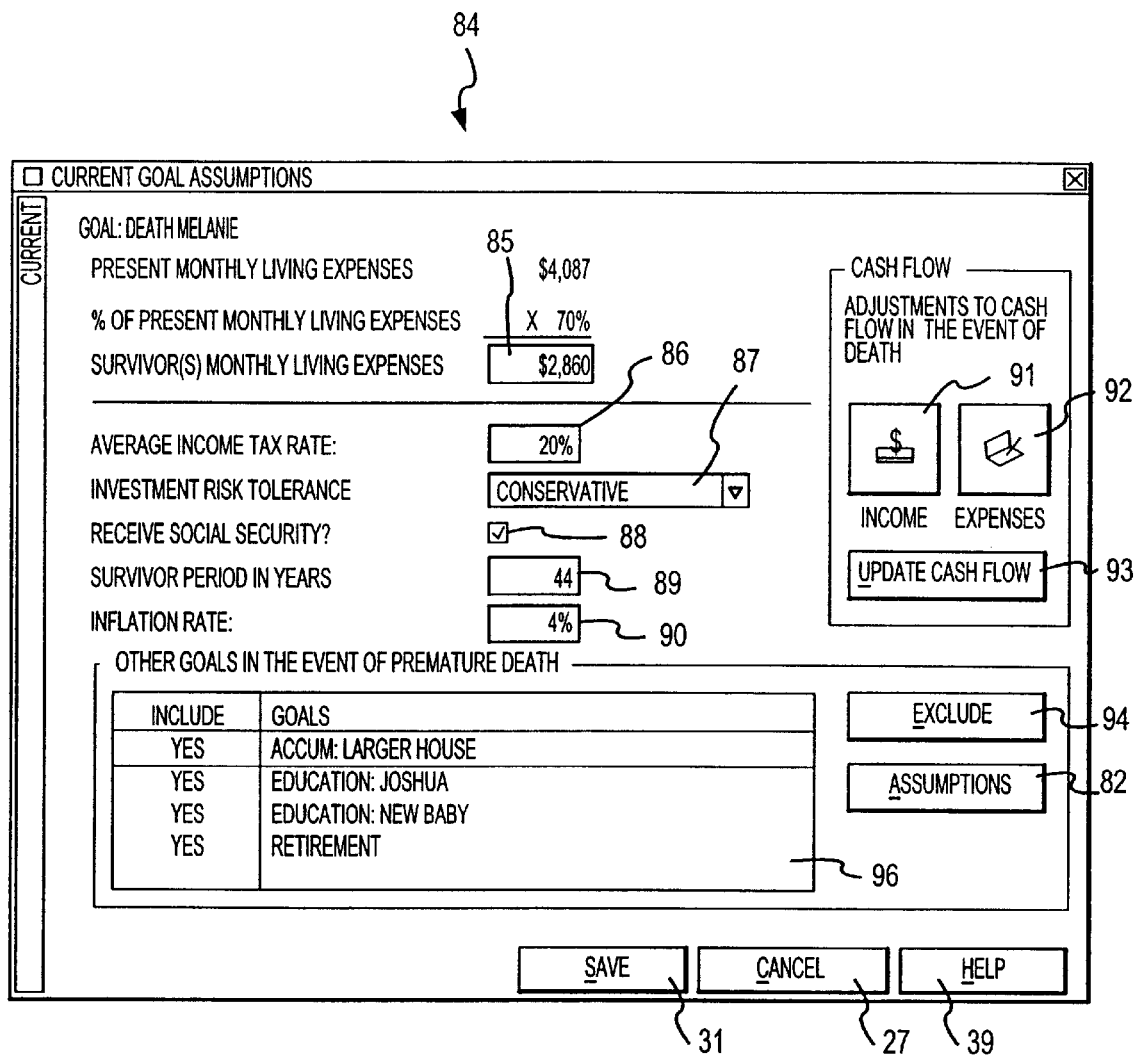
FIG. 30 is an exemplary screen shot of the Current Goal Assumptions window in a preferred embodiment of the present invention.

FIG. 30 shows a Current Goal Assumptions window 84 which is preferably displayed when the advisor desires to display, enter, or modify data relating to a particular event (for example, the death of a person named Melanie). More particularly, Current Goal Assumptions window 84 preferably allows an advisor to modify variables and assumptions which would be relevant in calculating the proceeds which support beneficiaries upon the death of a client named Melanie. These variables preferably include, for example: the survivor(s) monthly living expenses 85; income tax rates 86; investment risk tolerance 87; whether the survivor will receive social security 88; how long the survivor will live after Melanie dies 89; and the inflation rate 90. Additionally, FAS 10 suitably enables the advisor to enter anticipated adjustments to the household's income 91, expenses 92 and update the cash flow 93 which would likely occur upon Melanie's death. FAS 10 also enables an advisor to exclude other goals a household may have prior to Melanie's death. These goals are preferably listed in the other goals field 96. An advisor may preferably Exclude 94 or change the Assumptions 82 of these other goals. Each goal assumptions page may preferably be specifically tailored to identify specific assumptions related to each goal without departing from the scope of the present invention.

Preferably, a distinct goal assumptions window exists for each financial planning icon 64 shown in FIG. 18, and each goal assumption may be individually modified and saved by selecting the corresponding Save button 31. When the advisor has completed modifying the assumptions for the selected goals, FAS 10 preferably returns to FAS Home window 22, as shown in FIG. 7B, upon the selection of Home button 56.

As shown in FIGS. 9, 16, and 28, the information specifically entered by an advisor into a Domain subcategory (Client 234, G&S 236, and FP 237) may depend upon and utilize data entered in other subcategories. As shown, many data objects need to "know" about other data objects, and/or depend on the state of existence of other data objects. Thus, FAS 10 preferably incorporates the Model-View architecture and the "observer" pattern to simulate a client's financial position. One example of this inter-dependency between various FAS 10 categories is Earmarking 287. FAS 10 preferably provides a suitable mechanism for identifying (Earmarking) specific ALPIE 276 data entries to specific Goals 261. ALPIE 276 data entries are preferably earmarked after the demographic data, goals, ALPIE 276 data, and assumption have been entered by an advisor into FAS 10. However, earmarking objects at anytime is within the scope of the present invention. In this manner, FAS 10 preferably characterizes, identifies, and assigns relational identifiers to the various data, goals, and assumptions entered by an advisor (i.e., a model of the client's complete financial world as it exists at the time of preparation of the financial plan).

Since each goal is preferably measured against the appropriate assumptions and the group's financial position (described in greater detail below), FAS 10 preferably provides an advisor with an analysis of the group's current financial position in relation to the group's preselected goals. By selecting the Status button 48, as shown in FIG. 7B, FAS 10 preferably displays the Analysis Status window 68, as shown in FIG. 31.

In FAS 10, an advisor may preferably determine the status of any text associated with a particular goal by selecting the Open Text Status button 61. Also, an advisor may suitably determine the status of Earmarked Assets to a specific goal by preferably highlighting a goal(s) (listed in the goal fields 65 and 67) and selecting the Open Earmark Status button 63. By selecting the Close button 47, an advisor may preferably return FAS 10 to the FAS Home window 22, as shown in FIG. 7B.

Generally, goals within FAS 10 are achieved by either having specific assets earmarked to them (i.e., a specific asset is identified as having a Lifetime purpose 305 (FIG. 23) of a specific goal) or using assets having a Lifetime purpose 305 of "any". Preferably, FAS 10 solves all goals independently, however, FAS 10 is configured to incorporate the fact that some goals (such as retirement) require other goals to be solved first (such as accumulation). Thus, FAS 10 suitably solves goals in an efficient order based upon the dependency of future goals upon prior goals.

Commonly, when a household's demographics, goals, ALPIE 276 data, and assumptions are initially entered into FAS 10, all the goals will probably need to be solved. Since solving goals is an intensive activity, FAS 10 preferably tracks the status of each goal and separates goals into two categories: optional goals 67, and required goals 65 (required goals are those goals typically required by law to be present in a financial plan), as shown in FIG. 31.

FAS 10 preferably displays a stoplight 57 which preferably indicates the status of goal calculations, wherein a red light preferably indicates all goals need to be calculated, a yellow light preferably indicates some goals remain to be calculated, and a green light preferably indicates all goals have been calculated. FAS 10 preferably provides estimated times to calculate all goals 97. Additionally, an advisor may preferably select specific goals for calculation by suitably highlighting the goal(s) in fields 65 and 67. When at least one goal is highlighted, FAS 10 preferably activates the Calculate Selected button 53 and displays the estimated time to calculate the selected goals 98. In determining these calculation estimates, FAS 10 suitably adapts these times based on the platform upon which FAS 10 has been installed.

Preferably when an advisor selects the Calculated Selected button 53 or the Calculate All button 59, FAS 10 suitably calculates the current financial position of the group. To perform these calculations, FAS 10 preferably includes a Simulator which suitably predicts how each goal will or will not be achieved within the time frames specified by an advisor.

Figure 32:
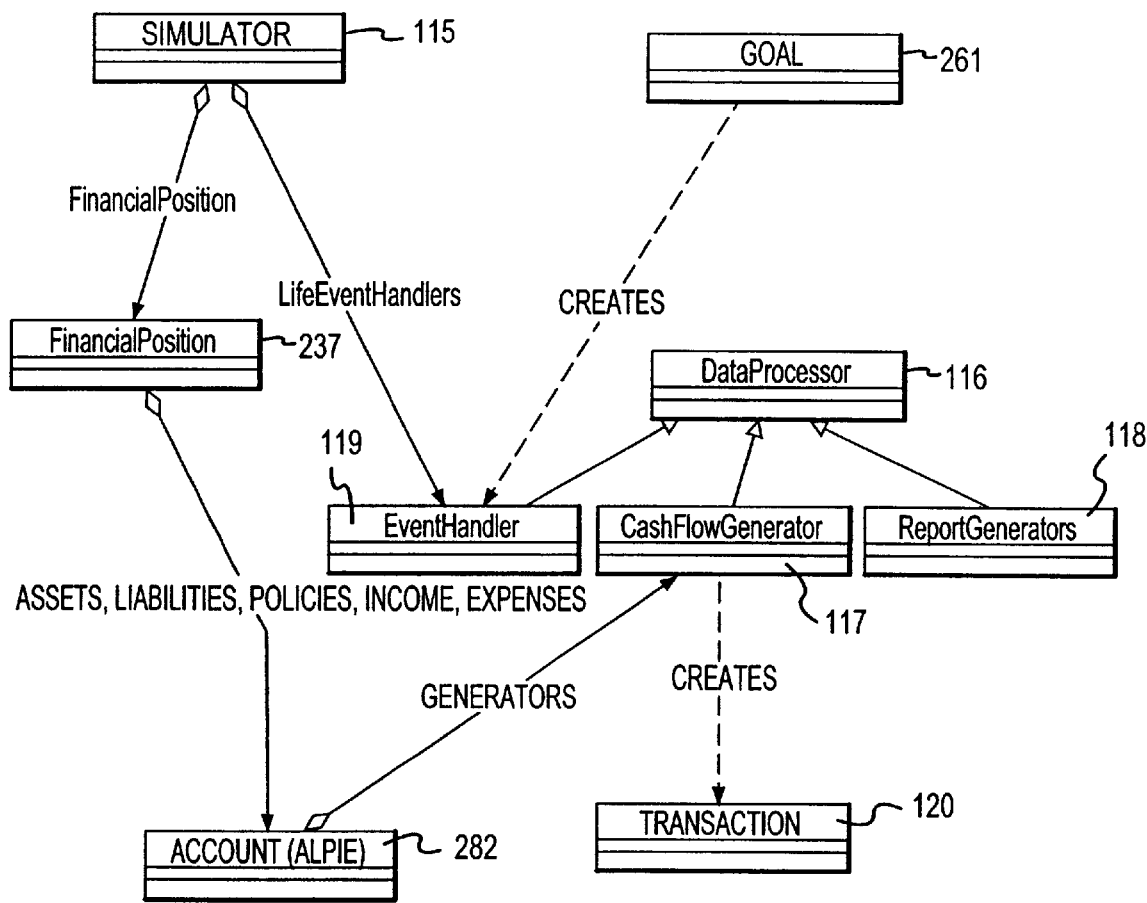
FIG. 32 is a data structure interrelationship diagram which depicts the relationships and data structures which may occur in a simulation in a preferred embodiment of the present invention.

When calculating goals, FAS 10 preferably utilizes an exemplary software architecture as shown in FIG. 32. The simulation architecture preferably encompasses several classifications of modules. The first of theses classes is the Simulator 115. The Simulator 115 is preferably the master of the simulation process, wherein its role is preferably to simulate the passage of time. The Simulator 115 preferably iterates through time while prompting other objects to simulate their evolution since the last time the object was notified. For example, as the Simulator 115 steps through the months, it occasionally prompts an income object, such as payroll, to simulate the receipt by the household of a payroll check (i.e., the depositing of funds in a checking account or the like). Preferably Simulator 115 contains a copy of the group's FP 237 (comprised of the Data Wrappers 500) from which it generates a Date Processor (DP) 116 for each event which effects the FP 237 (for example, the receipt of a paycheck is preferably a DP 116).

Each DP 116 is preferable periodically polled by Simulator 115 to determine the next simulated date they need to make adjustments to FP 237. When the simulated adjustment date occurs, DP 116 preferably records the necessary changes in the group's FP 237 and related Account 282. Three types of DPs 116 preferably exist, including: Cash Flow Generators (CFG) 117, Report Generators (RG) 118, and the Event Handler 119. One skilled in the art will appreciate that others DPs can exist.

CFG 117 are the simulation classes responsible for the regular events in an object's life. For example, a savings account (an object) might create an "interest generator" which simulates the accumulation of interest on the savings account for the simulated period. A CFG 117 preferably creates a Transaction 120 every time a simulated object changes or needs updating. Upon generation, the Transaction 120 suitably modifies the ALPIE Account 282 by adding or subtracting from the related object(s) balance. Revisiting the previous paycheck disbursement example, when FAS 10 simulates the disbursement of a paycheck, CFG 117 preferably creates Transaction(s) 120 which suitably add or subtract from specific ALPIE objects (such as checking, FICA taxes, home mortgage payments, utility bill balances, or any category identified as being paid by the disbursement).

RG 118 are preferably created by the Simulator 115 and are responsible for capturing the changes which occur in an ALPIE object over the course of the simulation. For example, a report may be desired which tracts the household's savings account balance over the lifetime on a monthly basis. This tracking is preferably performed by RGs 118, which the Simulator 115 preferably instructs the Data Processor 116 to generate every month.

As previously stated, a simulation is preferably "run" to solve each Goal 261, thus Goal 261 is the driver of the simulation. To handle complex goals, such as an estate after a client's death, Goal 261 preferably creates Event Handler 119. Event Handler 119 preferably instructs the simulator to make those changes necessary to reflect the occurrence of an event (such as death). Preferably, Simulator 115 polls each Event Handler 119 during each simulation period. When a specific event occurs, Event Handler 119 suitably changes the FP 237 to reflect the effects of the event.

Figure 33:
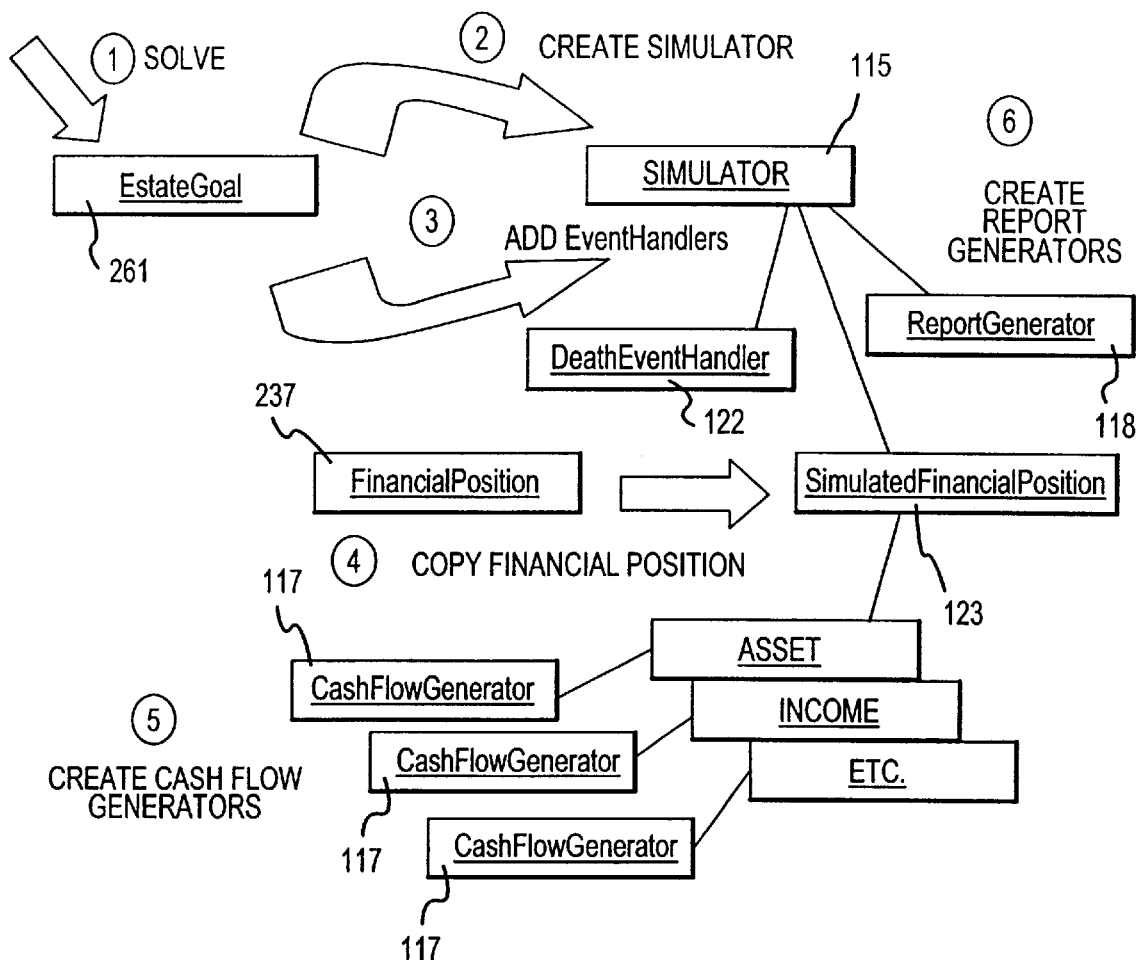
FIG. 33 is a graphical representation of the steps which occur in building a simulation in a preferred embodiment of the present invention.

As shown in FIG. 33, the simulation process begins when an advisor selects a Goal 261 to be solved on the Analysis Status window 68 (FIG. 31), as shown in FIG. 33 by the circled number 1, designating step 1. Upon selecting a goal 261 (in this example an estate goal) to be solved, FAS 10 suitably creates Simulator 115 (step 2) which is subsequently populated with the Death Event Handler 122 (step 3). The Death Event Handler 122 is preferably generated by the Goal 261. Next, FP 237 is copied into a Simulated FP 123 (step 4). Simulated FP 123 receives from the ALPIE account CFGs 117 (step 5) which will preferably generate transactions during the simulation. The Simulated FP 123 and CFGs 117 all being suitably provided to the Simulator 115. Last, Simulator 115 creates RGs 118 which will preferably capture key data during the simulation.

Figure 34:
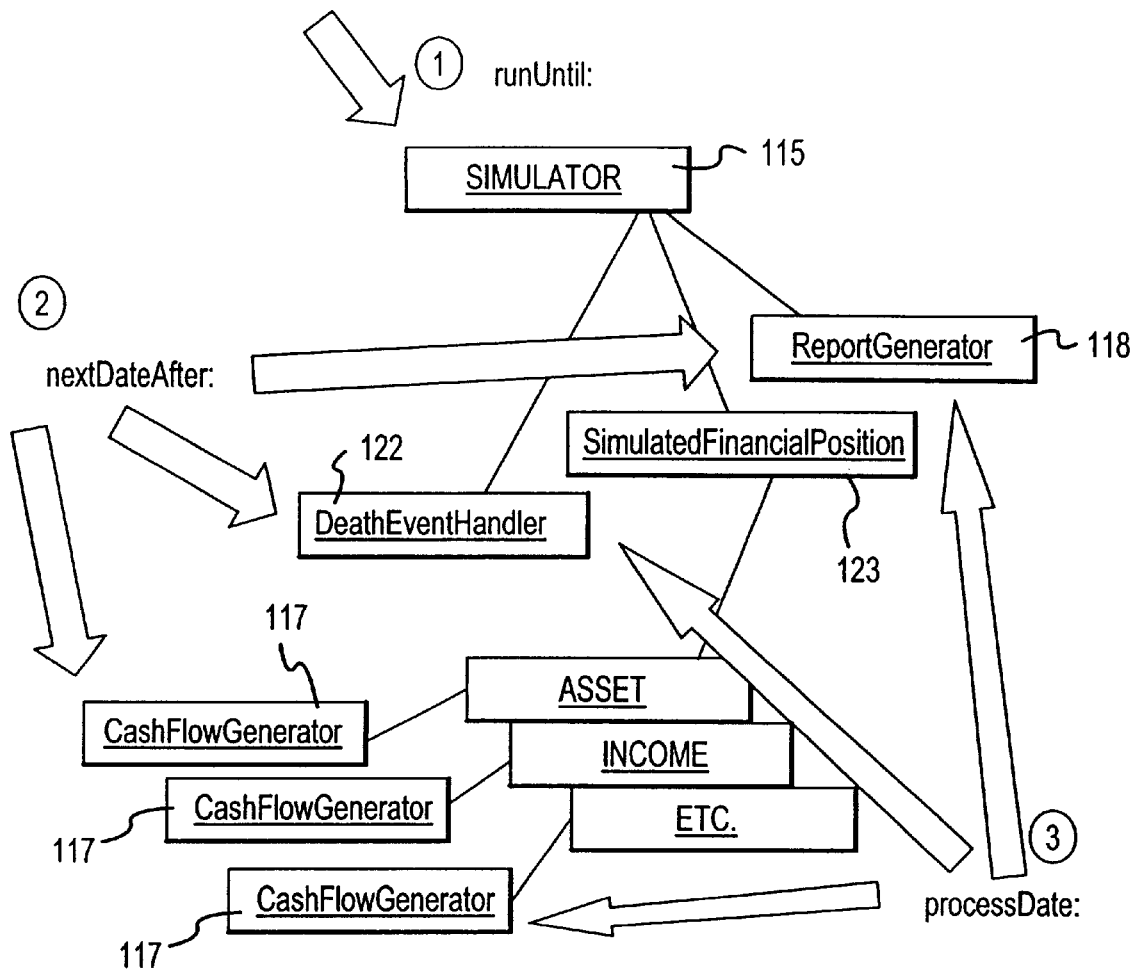
FIG. 34 is a graphical representation of the steps which occur in a simulation in a preferred embodiment of the present invention.

At this point, Simulator 115 is suitably configured to begin the simulation. As shown in FIG. 34, Simulator 115 begins the simulation and continues until the end date arrives. Since a simulation may encompass many months and years of processing, Simulator 115 preferably requests from the Date Processors 116 when the next date is which it must process. Simulator 115 then preferably skips those days on which no events occur and preferably updates the simulation as appropriate to reflect the date immediately prior to that on which an event is simulated to occur, as designated by the Date Processors 116 (step 2). For example, in a routine month, significant events (death, college, or the like) do not normally occur. Instead of calculating every non-eventful day, Simulator preferably skips to the day before the next event (such as payday, or the like). While FAS 10 preferably skips non-event days in order to accelerate the simulation, FAS 10 may be appropriately modified to simulate any period, including every day, without departing from the scope of this invention.

When a date arrives on which an event is simulated to occur, Simulator 115 suitably notifies all Date Processors 116 of the date. Date Processors 116 then preferably generate CFGs 117 which result in changes to the Simulated FP 123, and the generation of RGs 118. FAS 10 continues to perform these simulations until the designated end date arrives.

The full simulation capabilities of the present invention are more fully appreciated in the context of simulating an actual goal such as the probating of an estate after the death of a client. For example, preferable FAS 10 provides an Event Handler 119, named Virtual Executor 121, as shown in FIG. 35, which preferably simulates the changes in a group's FP 237 which occur upon the death of the client(s).

Generally, Virtual Executor 121 preferably simulates the steps required to settle a person's estate, and more particularly, Virtual Executor 121 preferably simulates all steps from the moment of death until all property, net of costs and taxes, is suitably distributed to survivors (i.e., surviving family members, etc.). Moreover, Virtual Executor 121 suitably determines the legal survivors of the decedent and suitably transfers to Simulator 115 the net amounts passing to the survivors. Simulator 115 not only simulates the results of Virtual Executor's 121 simulated disbursement, but it also, in a preferred embodiment, simulates the combination of the disbursements and the resources already belonging to the survivors before the death occurred. In other words, Virtual Executor 121 simulates the distributions that would occur if a death occurred. Simulator 115 preferably requests information, including, for example: Goals 261, Accounts 282 (i.e., ALPIE data), state and federal tax laws (FAS 10 preferably provides additional data, such as tax laws, which are updated as necessary to create a financial plan), and other data as needed.

Figure 35:
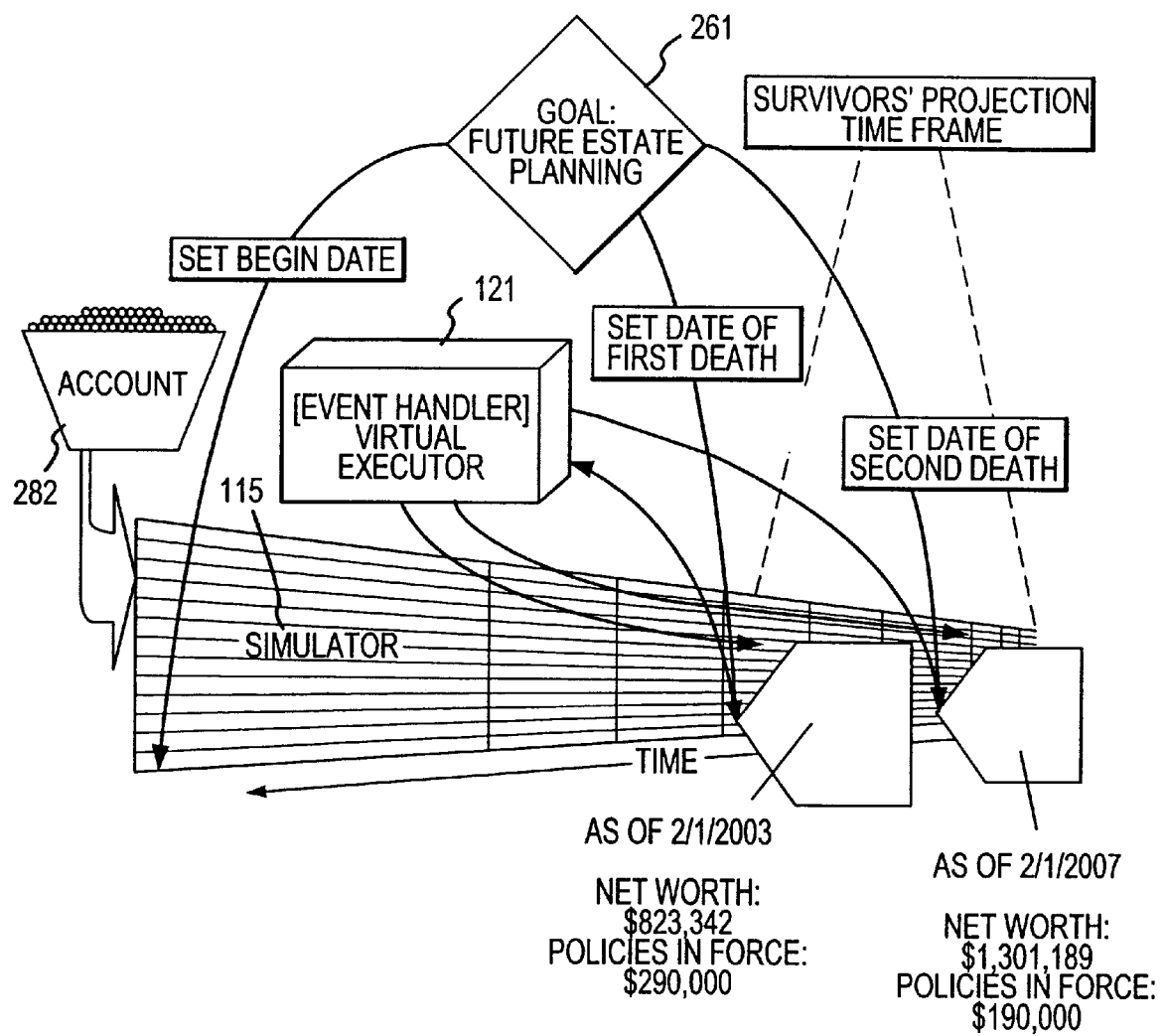
FIG. 35 is an exemplary flow diagram of the interactions between the Virtual Executor, Simulator, and Account, in calculating a specific Goal in a preferred embodiment of the present invention.

FIG. 35 is an illustration of the interactions which occur between the various FAS 10 elements in making the calculations for assessing an estate planning goal. One skilled in the art will appreciate that FIG. 35 is merely exemplary in that any combination of features, elements, and sequences which include a similar result are within the scope of the present invention.

In a preferred embodiment, using the extensive database of financial data for each client, Virtual Executor 121 suitably simulates the functions of an executor from the moment of death until the estate is settled. The specific executor functions simulated by Virtual Executor 121 preferably include, inter alia:

1. compiling all assets and policies included in the gross estate;
2. assigning values to includable assets;
3. determining the value of life insurance policies that have the decedent as the insured, then "cashing in" (assigning the value to the survivors) the life insurance policies;
4. depositing policy proceeds in an estate checking account, on behalf of the named beneficiary;
5. probating the estate property based on the terms of the decedent's will (which are part of the client's Policies). If there is no will, the intestacy law of the decedent's last state of residence, or physical location of realty, is used. Community or Marital property laws of certain states are also considered in the probate process. In addition, the applicable inheritance taxes are calculated;
6. completing federal and state estate tax and inheritance tax returns (FAS 10 preferably includes information on all state tax forms and laws and may be updated as needed to comply with current tax laws);
7. selling non-cash estate assets as needed to pay off liabilities and funeral & administrative costs;
8. distributing all remaining property (as well as outstanding debts secured by the property) to heirs and charities (either intact, or partially or fully liquidated) based on terms of the will, trust documents and/or named beneficiaries;
9. distributing a virtual memo to beneficiaries responsible for any state inheritance taxes on the inheritance they received. The memo preferably indicates the value of the property they received and the amount of state inheritance tax they owe;
10. distributing a virtual memo to trustees of trusts established by the will, indicating the amount of net property being deposited in trust on behalf of named beneficiaries (who are usually insiders who will receive trust funds) according to terms of the trust recorded in Policies. The amount that needs to be deposited in trust is suitably calculated by Simulator 115 because it suitably determines the amount of distributions made during the ensuing survivor period, which is normally regulated by the terms of the trust.

In general, with reference to FIG. 35, Account (ALPIE) 282 supplies present facts while Goal 261 provides the goals and assumptions of the simulation to Simulator 115. The Goal 261 preferably requests a simulation, and communicates the proper parameters to Simulator 115. These parameters preferably include, for example: economic parameters such as inflation, taxes, and rates of return; time parameters such as start date, end date, dates of death; and other parameters as needed. These parameters are preferably combined into an Event Handler, such as Virtual Executor 121.

Accordingly, Virtual Executor 121 receives pertinent financial data from Simulator 115 as of the date of death predetermined by Goal 261. Virtual Executor 121 also receives the assumptions associated with each goal. After Virtual Executor 121 performs the aforementioned functions, Virtual Executor 121 communicates settlement information (i.e., probate distribution results) to Goal 261 and Simulator 115. Simulator 115 preferably receives the settlement information and simulates future time, now in a post-estate mode (i.e., new assets, liabilities, inflows, outflows and/or the like) until Simulator's 115 next event or the end, whichever comes first. At the next death event, the previous steps are preferably repeated.

More particularly, Virtual Executor 121 suitably calculates and displays probate, compiles probate assets, probates the estate, enters the data for the state inheritance forms and federal and state tax returns, allocates the taxes out of the assets in a prioritized order based on liquidity, and transfers net assets to beneficiaries after removing inheritance taxes. When the advisor selects a specific state, if the state has inheritance taxes, FAS 10 preferably tests the previously-inputted state of residence information to determine if the state-specific inheritance and estate tax laws are incorporated into the calculations by FAS 10. Therefore, each individual policy, asset and liability is suitably calculated, based on the facts associated with the particular factor.

The compilation and distribution of assets often requires knowledge of relationships among the group members. All of the relationships that are established in EG 240, are also preferably incorporated into Virtual Executor 121, thereby allowing Virtual Executor 121 to establish a blood relation table based on numerous factors. For example, in Iowa, Virtual Executor 121 preferably incorporates different calculations for a cousin, than for a brother-in-law. Virtual Executor 121 also preferably incorporates into its calculations, assets with named beneficiaries such as charities (including tax deductible benefits for federal and state tax purposes). Moreover, Virtual Executor 121 suitably determines whether a particular asset, liability and/or policy should be distributed in the probate/executor process. These calculations involve suitably accounting for relationships to determine estate tax implications, while also compensating for community property law allocations or deductions.

In addition to its own functions, Virtual Executor 121 preferably operates in conjunction with Simulator 115. For example, if a client dies today, Virtual Executor 121 suitably settles the estate and assigns a specific amount of money to the survivors. As time passes (the survivor period), the wife and children begin to work, accumulate retirement plans, spend money, make money, pay for education, etc. If the wife dies five years later, Virtual Executor 121 suitably recalculates the status of her estate based on a simulation conducted from the time the client died to the time the wife died. As of the time of death, Simulator 115 preferably recalculates net worth, with consideration for any policies in effect at that time and any excess or deficit cash flow because of the policies' and cash flow's impact on the client's future net worth (the increase or decrease in clients' net worth in that time period). This recalculation feature is advantageous for the elderly because many of their estate problems often evolve from their unnecessary accumulation of money. For example, with this information, the advisor suggests gifting strategies which will preferably decrease the client's taxable estate by the statutory $10,000 gift exclusion per person. This strategy allows for the addition of virtual gifts, such that, if the client dies in five years, the client's estate taxes will have been reduced by a significant amount because he employed this gifting strategy. If a client drafts wills or employs life insurance transfer techniques which put the money into an irrevocable life insurance trust, Simulator 115 suitably reassimilates those transactions.

Once Virtual Executor 121 settles an estate, Simulator 115 (as more fully explained below) uses the information from Virtual Executor 121 to suitably simulate cash flow and events for the number of months during the survivor period and until the next death event. Similarly, Virtual Executor 121 suitably settles the estate of the second person to die, based on the financial state of the second decedent at the time of death. The second person's estate will most likely have been impacted by all of the changes occurring over time, including, inter alia, asset value changes and acquisitions due to purchases and investments, debt pay-downs, excess income deposits and asset depletion due to income shortages or a "planned giving" program. Some of these changes are preferably the result of invoking Strategizer 400 (as more fully explained below).

As stated earlier, after Virtual Executor 121 suitably distributes substantially all property to the survivors, Virtual Executor 121 preferably transfers the data to Simulator 115.

Simulator 115 next suitably records the results of each simulated period and any quantified remedies needed to solve detected problems (i.e., bankruptcy, sickness, etc.) that occurred during the period. Simulator 115 then posts all results to an appropriate location within the FAS 10. Finally, after the simulation has transpired, Simulator 115 transmits to and displays the results on the Goal Analysis window 114 (as shown in FIG. 36). For every additional simulation or question requested by the advisor, the foregoing steps are preferably repeated.

More particularly, Simulator 115 suitably processes a group's financial position over a specified number of periods. The financial position is preferably comprised of net worth, policy, cash flow and legal-document information (i.e., present facts). The number of simulation periods is preferably regulated by the "situation" that the group wishes to analyze. Situations start out as normal lifetime situations (birth, automobile, college, etc.), but can change to disability, long-term care, divorce or death situations if such an event is registered with Simulator 115. After the advisor enters a hypothetical situation into FAS 10, Simulator 115 suitably processes the transactions by incorporating a set of previously input parameters. These parameters preferably include, for example, start date, end date, events that take place on specific dates falling between the start and end dates, and economic assumptions affected by time (such as inflation and investment rates of return). The events preferably include birth, education, acquisition, disposition, marriage, divorce, injury, casualty, disability, retirement, liquidation, placement in a nursing home, and death.

Alternatively, contributing factors considered by Simulator 115 include, for example:

1. information from Earmarker 287 (a FAS 10 feature which preferably assigns known current and future assets to fulfilling particular goals, and is explained in detail below) regarding the resources which are preferably available to fund future expenditures;
2. current and projected state and federal tax and entitlement laws in effect during any given period; and
3. the present composition of group members based on the data contained in EG 200 (i.e., birth dates, relations, marital status, residence).

Simulator 115 suitably generates results, but preferably generates two sets of results. First, a periodic summary of simulated projections, preferably grouped into fiscal years between the start and end dates. Second, a summary of numerical remedies that the simulator has suitably determined will substantially eliminate future resource needs or unnecessary surpluses. Furthermore, Simulator 115 preferably includes time value calculators for converting future results into one common point-in-time result, generally a present-day value.

When performing its analysis, Simulator 115 suitably processes hypothetical cash flow transactions over a predetermined number of months. The cash flow transactions are preferably regulated by a predetermined goal which contains simulation parameters. The simulation parameters preferably include the future events and their transpiration dates, economic assumptions, and information provided by Earmarker 287. Exemplary simulation parameters include, for a particular time frame, resources allocated to that particular Goal 261 and other facts about a particular group including the members, the demographics, the principal parties, the relationships, birth dates, and mortalities.

In a preferred embodiment, the aforementioned simulation factors are suitably incorporated into Simulator 115, such that Simulator 115 includes facts and assumptions related to time parameters. The facts that Simulator 115 preferably incorporates include the ALPIE 276 data previously entered into FAS 10. Additional documents or data may also be preferably incorporated as necessary. The assumptions preferably include events that have certain occurrence dates. A subset of assumptions preferably contains economic assumptions which include, for example, inflation rate, investment rates of return, and distribution methods for qualified assets.

Figure 37:
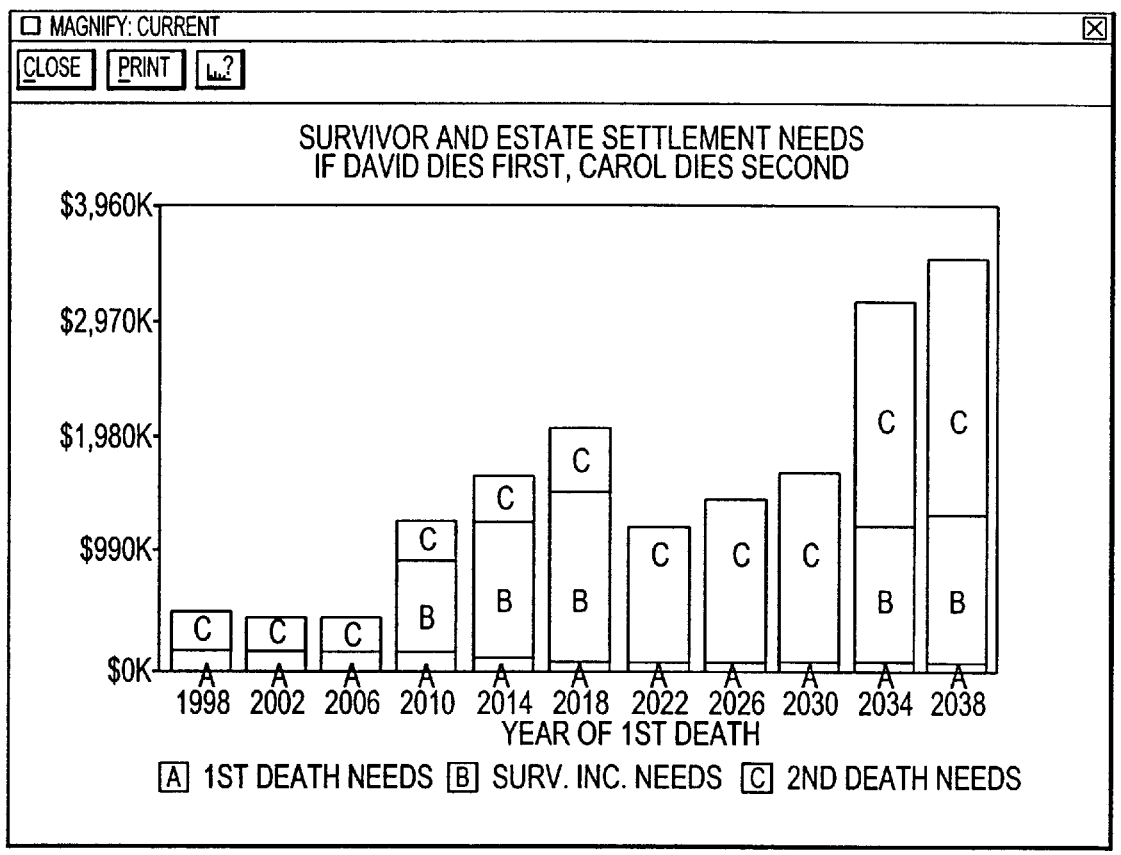

In a preferred embodiment, a multiple death feature of Simulator 115 conducts multiple simulations, including the elimination of a client's goal, for a client dying on different hypothetical dates. Once the client dies, the survivors acquire the client's assets at different points in time throughout their lifetime. Simulator 115 preferably performs the first simulation as if the client died today, i.e., an event. Next, Simulator 115 preferably plots the results on a graph, whereby suitable analysis of the graph (as shown in FIG. 37) demonstrates a permanent life insurance need with a changing term need based on a normal lifetime for the group.

For example, upon the death of a client, the survivors normally apply for social security benefits, eventually the spouse retires and the children obtain an education. Simulator 115 suitably simulates all of these events and calculates the results for the client and the impact of the results on the client's insurance policies.

If a client and spouse are healthy and live for five years, then the client dies, Simulator 115 preferably processes their lifetime as a normal lifetime. Simulator 115 suitably analyzes the stated Goals 261 at the moment of death (i.e., are any of the children in college, did the spouse retire yet, has that retirement event already occurred for the spouse, prior to the client's death). Simulator 115 preferably allows retirement to be a revocable decision because, if the spouse is already retired, she can go back to work. Furthermore, if the client dies, and the spouse has not yet retired, the spouse may want to delay retirement.

In the fifth year of retirement, if the client starts running out of money, Simulator 115 suitably analyzes each shortage. For each month that a shortage occurs, the client needs to save money, between now and retirement, to make up for that predicted shortage. A subset of Simulator 115 preferably includes a Time Value Calculator. For a future shortage at a given future rate, the Time Value Calculator suitably calculates a savings amount to cover the shortage. As a result, given the sets of facts and assumptions that the simulator has combined to produce these results, Simulator 115 preferably provides indications that the client shall start saving or increase savings by a specific amount per month.

If the event is the death of a client, Goal 261 provides for survivors in the event of the death. Providing for survivors preferably includes education, real estate, personal property, travel, cash reserves, long-term care, and/or the like. Other events preferably include entering a nursing home, becoming disabled, retirement, property and casualty, an accident, or health care. In a preferred embodiment, all of these events are suitably incorporated into the same framework on Simulator 115.

If Simulator 115 isolated only one unknown factor, the advisor may be given worse advice because the advisor may be ignoring inevitable events. Therefore, if the client's first major retirement decision has been made, Simulator 115 preferably blends multiple events into one particular simulation of time. Although Simulator 115 suitably runs parallel "universes," Simulator 115 preferably simulates only one "universe" at a time. Moreover, to accurately image reality, Simulator 115 preferably prevents conflicting events (e.g., the client cannot live and die). Depending on a client's risk preference, Simulator 115 preferably includes assumptions (i.e., everyone will die and everybody will eventually retire, if they don't die before retirement). Simulator 115 suitably incorporates many unknown factors, but Simulator 115 does not incorporate (or obviously. know) future inflation rates or future rates of return.

Simulator 115 also suitably prevents mutually exclusive events from occurring. For example, after a person retires, the person cannot experience a "disability" event, since such an event has been reserved for the gainfully employed. After a death event, all other Goals 261 that included the deceased's involvement are eliminated or re-configured to exclude the dead person. Events that are in progress while another event occurs will not be stopped or re-started—they are irrevocable. For example, if a person's death occurs in the third year of a child's four year education, the education event will continue unabated while Virtual Executor 121 settles the estate, and one full year of post-death cash flow occurs.

Often times the initial calculating of the goals result in many unfulfilled goals. For example, as shown in FIG. 36 in the current view field 124, the current household's estate goals are unfulfilled. FAS 10 preferably allows an advisor to view a full screen of the results by selecting the magnify icon 125, at which instant FAS 10 preferably enlarges the current view field 124 to a full screen, as shown in FIG. 37. In this example, the graph portions represented by the letter "B" indicate those years in which the estate of a client named David falls short in providing the necessary resources. Specifically, from 2010 through 2018, and 2034 through 2038, if David were to die first in either period, David's estate would not be capable of fulfilling its goals.

To assist an advisor in developing a financial plan which minimizes(or attempts to minimize) these shortages, FAS 10 preferably provides for an alternative view (or financial universe) of the group's current financial position to be created. This alternative view may be accessed from various menu bars and windows within FAS 10, including, for example: Data Entry window 70, as shown in FIG. 21 (by selecting the Alternate button 159); Current ALPIE Summary window 99, as shown in FIG. 22 (by selecting the Alternate Data Summary button 157); Goal Analysis window 114, as shown in FIG. 36 (by selecting the Goal List button 369); and/or the like.

When an alternative view is suitably requested by an advisor, FAS 10 preferably completely copies the demographic, goals, ALPIE, and assumptions data from the current view and creates a separate database. After the alternative view database is created, changes to the alternative view preferably do not effect the current view and vice versa. Thus, in FAS 10 it is preferable for an advisor to refrain from creating an alternative view until data has been initially entered for the current view.

In general, once an alternative view is created an advisor may preferably apply strategies to the Goals 261. In FAS 10, strategies are preferably in two general forms, passive and active strategies. Passive strategies are preferably text descriptions of what a group should do to achieve their goals, for example, one strategy for a managed income tax goal could be to use the capital gains exclusion on the sale of a home. FAS 10 preferably provides through its editor, full text descriptions of numerous passive strategies (the editor is discussed in greater detail below). Active strategies, like passive strategies, preferably contain a text component, however, this text component preferably identifies the goal assumptions or ALPIEs a group may suitably alter as part of applying the strategy to fulfill a specific goal. For example, the managed income tax goal preferably includes a Maximize deductions strategy which preferably enables an advisor to modify the group's itemized deductions assumptions (on the client(s) W-2 forms), for the alternative view. Preferably, FAS 10 strategies apply only to the alternative view, and not the current view, thereby suitably providing a group with a basis of comparison between a current financial position and an alternative financial position. FAS 10 preferably allows strategies to be assigned to each goal, if desired. Additionally, FAS 10 preferably provides a text description for each strategy which an advisor may access to determine the actions taken by an active strategy. For example, FIG. 38 shows the text description of the Marital Trust strategy, and suitably provides an advisor with buttons 127 which the advisor may select and apply (via the Apply button 128) in order to particularly tailor a strategy to a household's needs.

In addition to applying strategies to current goals, FAS 10 preferably allows an advisor to radically change or alter a group's goals, assumption, ALPIE, or the like in the alternative financial universe. FAS 10 suitably provides financial universes, but preferably current and alternate universes. Since an advisor may wish to develop numerous iterations of financial universes, FAS 10 preferably provides a "what if" feature. Changes in goals done during goal analysis may be suitably captured by the "what if" feature and presented in the appendix of the financial plan presented to the group, even if the changes are later undone.

Strategizer 400 suitably establishes various mock "what if" scenarios for budgeting and future planning, while suitably manipulating facts and assumptions. Strategizer 400 creates these scenarios by suitably producing a simulation and altering the simulation without affecting the original simulation created by Simulator 115. In practice, Strategizer 400 suitably helps to contro[008c] modifications of Simulator 115, thereby demonstrating the impact of applying different techniques and cash flow activities. These techniques and data changes are suitably presented to the advisor as "strategies," such that the advisor can preferably reconfigure and re-run a simulation by requesting a change in an Event Handler, such as Virtual Executor 121 or a specific Goal 261, thereby forcing the simulation to re-run. The advisor may access Strategizer 400, by selecting the Strategizer button 99.

In general, with reference to FIG. 39, Account 282 supplies present facts and assumptions to Simulator 115. Goal 83 then requests that copies of data from Data Entry Guide 600 be supplied to Strategizer 400, and instructs Strategizer 400 to change the copies of the data it received based on user preferences. Next, Strategizer 400 packages the data changes in preparation for a simulation and loans the data packets to Simulator 115 with a request that, on behalf of Goal 261, a simulation should occur using the existing state of the Goal 261 parameters, the additional data packets, and a provision that a data packet loan can be recalled after the simulation (at the Goal's 261 discretion and/or any other suitable method).

More particularly, a "situation" is preferably the state of an Account 282 after the occurrence of a specific event. Strategizer 400 suitably "loans" packets of data to a situation on behalf of one or more narrowly-defined strategies. As a condition of the loan, the situation suitably requests that Simulator 115 processes transactions over time using a modified copy of the original financial position's present facts, whereby the original facts remain substantially unaffected. The data packet suitably changes specific ALPIE data, events and assumptions. The situation then preferably transfers a modified financial position, events, assumptions and time frames to Simulator 115, along with a command to begin processing. Simulator 115 then preferably returns its report to the situation. The situation, with consideration for its own "data debts," preferably issues a report explaining how and why the simulated results are different due to the data loans issued by Strategizer 400.

Strategizer 400 preferably records of all its outstanding "data loans." Any subsequent change to the "terms" of the original "data loan" are suitably recorded (e.g., facts, amounts, dates), along with the name of the strategy requesting the change. Since substantially all data changes are recorded, Strategizer 400 optionally undoes the changes by suitably "calling" the loan from the situation (re-setting the terms back to the original loan). The situation then preferably "pays" the loan in full by suitably transferring back the data (or alternatively abiding by the new terms). Once the situation substantially achieves its obligation, the situation preferably requests another simulation, thereby suitably freshening the results report.

Strategizer 400 also preferably maintains an editable text report linked to its outstanding data loans. All of Strategizer's 400 outstanding loans and related text are suitably maintained in the database associated with the group. Once a strategy is implemented by the group, the credit entry suitably causes the "loan" to be paid in full and receivables suitably reduced. Using the debit entry, the original financial position, events, and/or assumptions are suitably updated.

After an alternative view has been suitably created, FAS 10 preferably allows an advisor to select specific alternative goals or all alternative goals for solving, as shown in FIG. 31. Preferably, whenever current and alternate goals exist, FAS 10 suitably calculates both goals. FAS 10 calculates alternative goals using the Simulator 115 (as previously described above), and suitably displays the results, when requested, in the alternate view field 126, on the Goal Analysis window 114 (as shown in FIG. 36).

The advisor may also preferably request FAS 10 to perform various financial planning scenarios by selecting Goal Analysis button 50, as shown in FIG. 7B, and preferably displaying Goal Analysis screen 114, as shown in FIG. 36.

Goal Analysis screen 114 preferably includes menu bar 368 and a series of buttons which may be selected to perform additional financial planning tasks. Menu bar 368 includes any suitable data entry functions commonly known in the art, and preferably allows the advisor to select various FAS 10 elements. The buttons preferably include: Home button 56; Goal List button 369 (which preferably displays a listing of the various goals which have been previously identified by the advisor); Status button 370 (which preferably displays Analysis status window 68 as shown in FIG. 31); Charts button 371 (which preferably allows the advisor to select amongst the various charts available for display); Editor button 372; Strategies button 373; Earmark button 374; and Messages button 375 (which preferably provides the advisor with goal specific notes that have been previously entered into FAS 10).

When the Goal List button 369 is selected, the previously selected goals are preferably displayed in a format which allows the advisor to select a specific goal(s) for analysis. The advisor may preferably select current analysis, an alternate analysis, or both to be calculated and analyzed.

The operation and functionality of the Status button 370 (and the Analysis Status window 68 which it displays) has already been described in detail above. Similarly, the operation of the Charts button 371 (which merely allows an advisor to select from numerous charts for the goals), and Strategies button 373 have previously been described in detail above.

When an advisor selects the Editor button 372, FAS 10 preferably displays the Editor window 130, as shown in FIG. 40. Preferably Editor window 130 includes a menu bar 131 which allows access to the features and settings of the editor, including, for example, editing text; inserting text, graphics, figures, or the like; formatting text; creating paragraphs; providing status information; notes; and help features. Editor window 130 also preferably provides a series of icons 132 used to perform standard text editing features such as spell checking, cutting, pasting, undo, redo, or the like. Additionally, a series of buttons preferably allow an advisor to access the various other features of the editor. When an advisor selects Library button 133, FAS 10 preferably displays the Library window 145 as shown in FIG. 41.

Library window 145 preferably includes a menu bar 146 which allows suitable access to a text library preferably included in FAS 10. The text library preferably provides standardized explanatory explanations for most financial positions. As shown in FIG. 41, Library window 145 preferably allows the advisor to select a particular paragraph category in the paragraph category field 147 or create a new paragraph by selecting the new paragraph button 135 (as shown in FIG. 40). Library window 145, also preferably includes a find field 148 and Find button 149 which suitably allow an advisor to search and find specific pre-existing paragraph categories. Once a paragraph category has been selected, the library paragraph field 150 displays a plurality of pre-defined paragraphs which may be selected to describe a clients particular position. Paragraph control field 152 preferably displays the text associated with a specific paragraph selected in field 150. Additionally, an advisor may choose to automatically include specific paragraphs in the summary section of the financial plan by suitably selecting check box 151. Editor window 130 (FIG. 40) also preferably provides a data field 144 which preferably displays the particular paragraphs the advisor has selected or entered for a particular section.

Additionally, Editor window 130 preferably provides an Explain button 134 which suitably allows an advisor to enter additional text explaining a pre-set paragraph. Advisors preferably may also input group specific paragraphs by suitably selecting the New button 135. Since financial proposals may often encompass hundreds of pages of text and graphics, FAS 10 suitably provides efficient access to specific paragraphs by preferably providing a Find/Replace button 136. Paragraphs may also be suitably displayed by preferably selecting a specific section of a financial proposal. In a preferred embodiment, FAS 10 preferably provides an Observations button 137, Cur Assump button 138, Cur Charts button 139, Alt Charts button 140, Alt Assump button 141, Strategies button 142, and Recommend button 143. The editor may be suitably accessed at any time during the production of a financial proposal in FAS 10, including during data entry, simulations, goals analysis, and the like.

Referring once again to Goal Analysis window 114, as shown in FIG. 36, FAS 10 preferably allows an advisor to Earmark assets by suitably selecting the Earmark button 374. The Earmarker 290, as shown in FIG. 42, is preferably the resource accountant for the group. In a preferred embodiment, Earmarker 290 defines "resources" as presently-owned assets (usually investable, financial assets, net of any debt secured by the asset) that have earmarking potential, as well as savings and excess income that occur over the next twelve months. In general, with reference to FIG. 42, ALPIE Account 282 transmits present facts and assumptions to Simulator 115. Goal A 291 requests additional resources from Earmarker 290, then Earmarker 290 determines whether it can free up resources to meet the request. If the request is accepted, Earmarker 290 notifies Simulator 115 that, on behalf of Goal A 291, a simulation should occur with the existing state of the Goal A 291 parameters plus additional information about the newly-earmarked resources. Simulator 115 then performs its set of tasks, as previously discussed. If the request is denied (because of financial hardship), Earmarker 290 notifies Goal A 291 which then determines another means for solving itself, for example by using resources previously allocated to Goal B 292, Goal C 293, and/or Goal D 294.

More particularly, as shown in the Earmarked Resources Summary window 295, FIG. 43, FAS 10 preferably provides a data field 129 which preferably contains a summary display of allocations by Earmarker 290 to different categories. Preferably Earmarker 290 avoids double counting (earmarking resources already earmarked for other current or future needs), which is a current problem in the industry. Future needs typically arise because an event creates a financial position change at some future date. After it suitably processes the group's financial position over time, Simulator 115 suitably reports the future needs and preferably invokes a time value calculator.

Next, each event suitably requests the availability of assets and/or income to satisfy future needs. The Earmark Resources window 296, as shown in FIG. 44, preferably allows an advisor to selectively allocate available resources to specific goals. The Earmark Resources window 296 preferably provides a View Assets button 288, Undo All Changes button 289, and View Savings button 297, which preferably allow the advisor to earmark assets and savings as needed.

Referring again to FIG. 42, if all of the resources are allocated, Earmarker 290 preferably requests another goal to contribute some of its resources. Usually, a future goal (for example, premiums to cover a new policy) will preferably instruct the present-year cash flow event to allocate some of its income to the goal, such that the goal preferably uses the present year cash flow to cover its future needs. The present-year cash flow is often available for fulfilling future goals, as opposed to Strategizer 400, because Strategizer 400 is preferably allowed to change numerous group budget amounts. If Strategizer 400 suitably convinces the present cash flow to allocate income, Earmarker 290 will preferably notify the original goal to allocate some of the newly found resources. Earmarker 290 preferably posts a warning message if it detects any deficit spending caused by Strategizer's 400 attempt to remedy problems not related to resource allocation.

Upon solving goals, applying strategies, earmarking resources and the like, an advisor has preferably completed the analysis of a group's financial position, and is now preferably ready to develop an output (a product—such as a Financial Plan document) to present to the clients. FAS 10 preferably provides for the production of such an output by providing a Plan subcategory 235. Plan 235 preferably provides a screen display in the WYSIWYG (What You See Is What You Get) format (i.e., the screen display mirrors the hard copy output.

Plan 235 suitably assembles the graphical, tabular, numeric, and textual information from Goal Analysis, such that the information can be suitably transmitted into a document production application, such as Adobe Acrobat. Plan 235 is preferably accessed by an advisor suitably selecting Proposal Construction button 52, as shown in FIG. 7B, at which instant FAS 10 preferably displays the Constructor Intro window 402, as shown in FIG. 45. Constructor Intro window 402 preferably contains menu bar 403 (which preferably provides the drop-down menu commands needed to manipulate data), General page tab 404, Summary page tab 405, Analysis page tab 406, To Do page tab 407, and Appendix page tab 408 which allow an advisor to select the various sections of Plan 235. Other tabs also fall within the scope of the present invention.

Constructor Intro screen 402 is preferably displayed as a 3-ring binder in which the advisor "flips" pages to display the various proposal pages, wherein the five tabs represent each of the major document sections. The advisor may display and/or edit various pages of the proposal including, but not limited to, the cover page, mission page, planner information and disclosure, table of contents, and various other pages which may exist in a proposal. The page selected by the advisor is preferably displayed on the right-hand side of the screen in the view/modify field 409. For example, in FIG. 46, the Constructor: General window 410 is shown in the view/modify field 409 after the advisor has suitably selected the General tab 404. As shown in FIG. 46, FAS 10 preferably displays the tab selected on the left side of the screen as one would preferably see in an actual hard copy proposal. Additionally, in FIG. 46, an advisor has suitably highlighted and selected the "Mission page (view only)" page in the page select field 411. The "Mission Page" for this proposal is preferably displayed in the view/modify field 409. Constructor: General window 410 116 also preferably provides a current/alternate data select field 412 wherein the advisor requests that FAS 10 display the current, or both the current and alternate data results.

Within each major section, Plan 235 also suitably sets the initial order of objects, whereby each of the objects is preferably stored in a data base such that they are preferably recalled, re-used and/or deleted in a single operation. The user suitably drags and drops these "objects" into any preferred order, while substantially maintaining the order of the major sections. Plan 235 suitably recognizes, arranges, and displays graphs, tables, and text-strings (or a collection of graphs, tables, and text) as separate, definitive objects, while also suitably recognizing that these objects have relationships to one another.

When the Summary page tab 405 is selected, FAS 10 preferably displays Constructor: Summary window 413, as shown in FIG. 47. Constructor: Summary window 413 preferably contains a summary selection field 414 which allows the advisor to select a particular summary to display in the view/modify section 409.

Plan 235 also preferably allows an advisor to view and modify the analysis performed for a specific financial proposal. As shown in FIG. 48, Constructor: Analysis window 415 is displayed whenever the Analysis page tab 406 is suitably selected. Constructor: Analysis window 415 preferably contains a goal selection field 416, an Editor button 417 (which preferably displays the Editor window 130, as shown in FIG. 40, and preferably provides the full text editing features previously described), and a view/modify section 409. For example, as shown in FIG. 48, the advisor has selected a goal of "Determine net worth" and Plan 235 has suitably displayed in the view/modify field 409 the observations, and recommendations previously entered by an advisor.

Constructor: To Do window 418, as shown in FIG. 49, preferably allows an advisor to edit and display textual messages, suggestions, and recommendations into the financial proposal. Constructor: To Do screen 134 preferably contains a view/modify section 409, an Editor button 417, and a Synchronize button 419. When suitably selected, Synchronize button 419 preferably copies the textual paragraphs previously entered in the Observations portion of the Analysis section into the Summary section of the financial proposal. Additionally, the Recommendations in the Analysis section are preferably copied into the To Do section. Thus, the Synchronize feature preferably ensures the various sections of the financial proposal are in synch with each other (i.e., one section does not propose a course of action that is contrary to another section).

Constructor: Appendix window 420, as shown in FIG. 50, preferably provides an area of the financial proposal wherein the advisor may suitably provide to the client(s) additional information about specific sections and/or goals of the financial proposal, including "what-ifs". Constructor: Appendix window 420 preferably contains a section selection field 421, wherein the advisor selects additional information to view and/or edit. These sections preferably include general assumptions, financial policies, what-ifs, and/or the like. Constructor: Appendix screen 4also includes a goal selection field 422 wherein an advisor may preferably identify additional information related to specific goals. Once an advisor has selected a specific section, which is preferably suitably displayed in the view/modify field 409, an advisor may preferably select the Edit button 423 (which preferably displays Editor window 130, FIG. 40), Remove button 424 (which preferably deletes the selected section), or View button 425 (which preferably displays the associated text).

Upon constructing the form of the final proposal, an advisor preferably returns to FAS Home window 22, as shown in FIG. 7B, and suitably selects the Printing button 54. Upon selection of the Printing button 54, FAS 10 preferably displays the Print: Exclude Goals window 426, as shown in FIG. 51.

The Print: Exclude Goals window 426 preferably provides a goals list field 427 in which all the goals for a particular group may be suitably displayed. Check marks next to the goals listed preferably indicate those which have been selected for inclusion in the output product (whether hard copy, internet version, PDF format, or the like). Individual goals may preferably be excluded from printing by double-clicking on the specific goal with a mouse button. However, the present invention preferably includes any method of selecting or deselecting goals. Additionally, an advisor may preferably exclude or include all goals from an output product by suitably selecting the Exclude All button 428 or the Include All button 429.

Once the goals are preferably selected (the order of the goals having been previously arranged by an advisor while accessing the Editor feature previously described), an advisor may print either a draft or a client version.

When an advisor suitably selects the Draft Printing button 431, FAS 10 preferably displays the Draft Print window 434, as shown in FIG. 52. When an advisor suitably selects the Client Print button 432, FAS 10 preferably displays the Client Print window 441, as shown in FIG. 53. Both the Draft Print window 434 and Client Print window 441 preferably allow an advisor to check the spelling of the entire proposal (spell checking is also preferably provided in the Editor) by suitably selecting the Check Spelling button 435. Also both preferably include a proposal style field 436 (current, or current and alternate) and a color style field 437 (black and white, or color). Both windows also preferably include a two color (red and green) stop light icon 442 which indicates (via a red light) when goals remain to be calculated, or (via a green light) when all goals have been calculated. When goals remain to be calculated an advisor may suitably select Calculate button 439, at which instant FAS 10 will calculate all remaining goals.

Additionally, the Draft Print window 434 preferably allows an advisor in the section selection field 438 to select only specific sections of a financial proposal for printing. While FAS 10 may be suitably modified to allow client print out to include only specific sections, in the preferred embodiment, FAS 10 only prints entire financial proposals for clients.

The Client Print window 441 also preferably includes a Client information field 443 within which FAS 10 preferably displays previously entered client identifiers. A Verify button 193 is also preferably provided which allows an advisor to suitably connect to the home office and verify the client identifiers prior to selecting a final version printing. As previously stated, in FAS 10 when a client version is printed, an advisor's PC is suitably connected and transmits to the home office a complete copy of the financial proposal. At the end of this transmission the client identifiers are suitably verified. If such identifiers are incorrect, the entire previously transmitted financial proposal is suitable disregarded. At which instant an advisor must preferably correct the client identifiers and retransmit the entire proposal. Providing the Verify button 193 suitably allows an advisor to verify the client identifiers prior to transmitting the final proposal.

Lastly, both the Draft Print window 434 and the Client Print window 441 suitably provide a Prepare for Printing button 440 (Print button). When the Print button 440 is suitably selected, FAS preferably converts the financial proposal into a format suitable for printing, transmitting, or the like. As previously stated FAS 10 preferably outputs a PDF formatted proposal utilizing the Printing subsystem 233, as shown in FIG. 1.

As shown in FIG. 54, the printing subsystem 233 preferably uses readily available text editors (such as Smalltalk: Document Workbench 229) and document producers (such as Adobe Acrobat 228), the operation of which are beyond the scope of the present description. However, FAS 10 may suitably utilize any text or document production product(s) which provide for documents which may be suitably created, edited, viewed, displayed, printed, and/or the like on any suitable platform (for example, a PC).

The FAS 10 printing process basically encompasses six steps, however, any number of steps or procedures may be suitably utilized to produce an output product. These steps (as indicated by the circled numbers in FIG. 54) are:

1. Document 446 is preferably subdivided into Document objects 445 (including numerous text, tables, graphs) which are preferably created and suitably arranged as a tree of text or graphic objects that corresponds to the desired organization of the financial proposal (i.e., the order of the goals, Summary section before To Do section, and the like);

2. Document objects 445 are suitably converted into a PDF file (preferably by Document Workbench 229 interfacing with Adobe Acrobat 228);

3. Document 446 and the PDF formatted version, Proposal.pdf 447, are suitably and preferably secured such that they may not be revised or edited by applications other than FAS 10;

4. Document 446 (if a client version) is preferably archived with the home office. Draft versions preferably contain a watermark or the like which suitably identifies it as a draft. Additionally, FAS 10 preferably requires a final version be archived before it may be viewed or printed;

5. The financial proposal is suitably opened by ADOBE ACROBAT 448 at which point a user may preferably view or print the document;

6. The financial proposal is printed, but preferably the printing is external to FAS 10.

Lastly, preferably controlling the flow of data objects and the like between the various program elements and a storage device such as a disk drive, floppy disk, compact disk, or the like, is the Persistence subsystem 232, as shown in FIG. 1. In FAS 10, Domain 231 entered objects preferably do not know how or where they persist in a database. Instead, the Persistence subsystem 232, preferably, loads, saves, and retrieves objects to/from a suitable Relational Database Management System (RDMS) 226, which for the preferred embodiment is Sybase SQLAnywhere.

Responsibilities of Persistence 232 include:

1. Mapping each domain object in a table which identifies where a specific domain object is located in the RDMS;

2. Mapping an object's relationship to other objects. For example, if an address is entered into FAS 10, Persistence 232 must know the various tables within which the street, city, state, and zip code may each exist;

3. Controlling the allocation of memory (commonly Random Access Memory) to specific objects. Since FAS 10 contains so much data, currently available computer systems do not provide enough memory to hold all the data all the time. Thus, FAS 10 depends upon Persistence 232 to "materialize" or place in memory those data objects which are needed at that instant, and to remove those which are not;

4. Ensuring objects are preferably written to RDMS 238 only when they have changed. Persistence 232 preferably maintains a before image every time an object is recalled from RDMS 238. The before image is then preferably compared against a returning image (i.e., an object which has served its function and is no longer being used by FAS 10). Persistence 232 then preferably only writes changed objects to RDMS 238, thereby minimizing processor time spent performing overhead functions; and 5. Ensuring a domain object exists once and only once in RDMS 238 by preferably maintaining a lookup table of all objects.

Additionally, Persistence 232 preferably provides suitable lookup tables for static data (i.e., data entered by the home office and generic to all clients, for example, state codes), reference data (for example, tax tables), and the Text Library.

It will be appreciated that the foregoing detailed description of a preferred embodiment of the present invention is representative of an exemplary FAS 10 and includes any financial planning system which falls within the scope and spirit of the present invention. Further, those skilled in the art will recognize that various changes and modifications, such as the order of window appearance or specific selections, may be made without departing from the true spirit and scope of the present invention. Those skilled in the art will recognize that the invention is not limited to the specifics as shown here, but is claimed in any form or modification falling within the scope of the appended claims. For that reason, the scope of the present invention is set forth in the following claims.

What is claimed is:

1. A financial planning system comprising:

a computer processor communicating with a data entry device, wherein said data entry device is configured to input economic group data;

a goals and assumptions identifier communicating with said processor, wherein said goals and assumptions identifier is configured to input and associate at least one goal and at least one assumption with said economic group data; and a simulator communicating with said processor;

wherein said simulator is configured to simulate the passage of time, to analyze an economic group's available financial resources with respect to fulfilling said at least one goal based upon said at least one assumption, and to process at least one financial position for an economic group based upon an analysis of said available financial resources and in response to at least one hypothetical event or transaction;

wherein said simulator obtains demographic data and financial data pertaining to said economic group; and wherein said simulator analyzes and solves said at least one goal in an efficient order, accounting for any dependency of future goals upon prior goals, based upon said at least one assumption, said demographic data, and said financial data.

2. The financial planning system of claim 1 wherein said economic group comprises at least one member, and said at least one member is selected from the group consisting of a person, a legal entity, and a charity.

3. The financial planning system of claim 2 wherein said economic group data comprises demographic data pertaining to said at least one member.

4. The financial planning system of claim 3 wherein said economic group comprises a plurality of members and said demographic data includes relationship data between any two of said plurality of members.

5. The financial planning system of claim 4 wherein said economic group data further comprises financial data, including assets, liabilities, insurance policies, income, and expenses associated with said economic group.

6. The financial planning system of claim 5 wherein said economic group data, said demographic data, and said financial data are relationally linked data objects, and wherein a modification in any one data object is broadcast to each related data object so that said related data objects can be updated to reflect said modification.

7. The financial planning system of claim 1 wherein said simulator comprises at least one event handler configured to process transactions and financial events associated with a hypothetical occurrence of a particular event.

8. The financial planning system of claim 7 wherein economic group data, demographic data, and financial data are relationally linked data objects, wherein a modification in any one data object is broadcast to each related data object so that said related data objects can be updated to reflect said modification, and wherein said at least one event handler accesses said relationally linked data objects, processes said transactions and financial events associated with said particular event, and permits said simulator to simulate said economic group's financial position in response to said particular event.

9. The financial planning system of claim 7 wherein said at least one event handler is a virtual executor, wherein said virtual executor is configured to simulate modifications to an economic group's financial position resulting from a hypothetical death of a member of said economic group, and wherein said at least one goal includes probating an estate after said hypothetical death of said member.

10. The financial planning system of claim 9 wherein economic group data, demographic data, and financial data are relationally linked data objects, wherein a modification in any one data object is broadcast to each related data object so that said related data objects can be updated to reflect said modification, and wherein said virtual executor accesses said relationally linked data objects, processes said transactions and financial events associated with said death, and permits said simulator to simulate said economic group's financial position in response to said death.

11. The financial planning system of claim 1 wherein said simulator further comprises a time value calculator configured to compute a present-day value for a simulated future financial position.

12. The financial planning system of claim 11 wherein said time value calculator further is configured to identify a potential future financial shortage and to calculate a present-day savings amount which would eliminate said potential future financial shortage.

13. The financial planning system of claim 1 wherein said simulator is configured to avoid simulating mutually exclusive hypothetical events or transactions.

14. The financial planning system of claim 1 further comprising an earmarker communicating with said processor, wherein said earmarker is configured to identify specific economic group data with specific goals.

15. The financial planning system of claim 14 wherein said specific economic group data comprise financial data, including presently-owned assets, savings, and excess income associated with said economic group.

16. The financial planning system of claim 14 wherein said earmarker device further is configured to avoid earmarking resources already earmarked for other current or future needs.

17. The financial planning system of claim 1 further comprising a strategizer communicating with said processor, wherein said strategizer is configured to compare an economic group's current financial position with at least one alternative financial position.

18. The financial planning system of claim 17 wherein said strategizer is configured to create said at least one alternative financial position by applying at least one strategy to a copy of said economic group's current financial position and by requesting that said simulator process transactions using said at least one strategy and said copy of said economic group's current financial position to demonstrate an impact of applying said at least one strategy to an economic group's financial position.

19. The financial planning system of claim 18 wherein said at least one strategy includes modifying at least one data object selected from the group consisting of said economic group data, said at least one goal, and said at least one assumption.

20. The financial planning system of claim 19 wherein said economic group data comprises at least one data object selected from the group consisting of demographic data and financial data.

21. The financial planning system of claim 1 further comprising means for providing an output of an economic group's financial plan based upon an analysis of said economic group's financial position.

22. The financial planning system of claim 21 wherein said output of said economic group's financial plan is a document that provides a current financial plan and at least one alternative financial plan, wherein said current financial plan is based upon an analysis of said economic group's financial position using current goals and assumptions, and wherein said at least one alternative financial plan is based upon an analysis of said economic group's financial position using modified goals and assumptions.

23. The financial planning system of claim 1 further comprising a persistence system and a relational database management system, wherein said persistence system is configured to retrieve data objects from, load, and then write data objects to said relational database management system.

24. The financial planning system of claim 23 wherein said persistence system is configured to place in memory those data objects which are needed by said financial planning system and further configured to remove from memory those data objects which are not needed by said financial planning system.

25. The financial planning system of claim 23 wherein said persistence system is configured to write data objects to said relational database management system only when said data objects have been modified.

26. The financial planning system of claim 23 wherein said persistence system is configured to maintain an object lookup table so that a data object exists in said relational database management system only once.

27. A financial planning system comprising:
a computer processor communicating with a data entry device, wherein said data entry device is configured to input economic group data;
a goals and assumptions identifier communicating with said processor, wherein said goals and assumptions identifier is configured to input and associate at least one goal and at least one assumption with said economic group data; and
a simulator communicating with said processor, wherein said simulator is configured to simulate the passage of time, to analyze an economic group's available financial resources with respect to fulfilling said at least one goal based upon said at least one assumption, and to process at least one financial position for an economic group based upon an analysis of said available financial resources and in response to at least one hypothetical event or transaction, and wherein said simulator comprises a virtual executor configured to simulate modifications to an economic group's financial position resulting from a hypothetical death of a member of said economic group, and wherein said at least one goal includes probating an estate after said hypothetical death of said member.

28. The financial planning system of claim 27 wherein said economic group data comprises demographic data pertaining to said at least one member.

29. The financial planning system of claim 28 wherein said economic group comprises a plurality of members and said demographic data includes relationship data between any two of said plurality of members.

30. The financial planning system of claim 29 wherein said economic group data further comprises financial data, including assets, liabilities, insurance policies, income, and expenses associated with said economic group.

31. The financial planning system of claim 30 wherein economic group data, demographic data, and financial data are relationally linked data objects, wherein a modification in any one data object is broadcast to each related data object so that said related data objects can be updated to reflect said modification, and wherein said virtual executor accesses said relationally linked data objects, processes said transactions and financial events associated with said death, and permits said simulator to simulate said economic group's financial position in response to said death.

32. The financial planning system of claim 27 wherein said simulator further comprises a time value calculator configured to compute a present-day value for a simulated future financial position.

33. The financial planning system of claim 32 wherein said time value calculator further is configured to identify a potential future financial shortage and to calculate a present-day savings amount which would eliminate said potential future financial shortage.

34. The financial planning system of 27 claim wherein said simulator is configured to avoid simulating mutually exclusive hypothetical events or transactions.

35. The financial planning system of claim 27 further comprising an earmarker communicating with said processor, wherein said earmarker is configured to identify specific economic group data with specific goals.

36. The financial planning system of claim 35 wherein said specific economic group data further comprise financial data, including presently-owned assets, savings, and excess income associated with said economic group.

37. The financial planning system of claim 35 wherein said earmarker device further is configured to avoid earmarking resources already earmarked for other current or future needs.

38. The financial planning system of 27 claim further comprising a strategizer communicating with said processor, wherein said strategizer is configured to compare an economic group's current financial position with at least one alternative financial position.

39. The financial planning system of claim 38 wherein said strategizer is configured to create said at least one alternative financial position by applying at least one strategy to a copy of said economic group's current financial position and by requesting that said simulator process transactions using said at least one strategy and said copy of said economic group's current financial position to demonstrate an impact of applying said at least one strategy to an economic group's financial position.

40. The financial planning system of claim 39 wherein said at least one strategy includes modifying at least one data object selected from the group consisting of said economic group data, said at least one goal, and said at least one assumption.

41. The financial planning system of claim 40 wherein said economic group data comprises at least one data object selected from the group consisting of demographic data and financial data.

42. The financial planning system of claim 27 further comprising means for providing an output of an economic group's financial plan based upon an analysis of said economic group's financial position.

43. The financial planning system of claim 42 wherein said output of said economic group's financial plan is a document that provides a current financial plan and at least one alternative financial plan, wherein said current financial plan is based upon an analysis of said economic group's financial position using current goals and assumptions, and wherein said at least one alternative financial plan is based upon an analysis of said economic group's financial position using modified goals and assumptions.

44. The financial planning system of claim 27 further comprising a persistence system and a relational database management system, wherein said persistence system is configured to retrieve data objects from, load, and then write data objects to said relational database management system.

45. The financial planning system of claim 44 wherein said persistence system is configured to place in memory those data objects which are needed by said financial planning system and further configured to remove from memory those data objects which are not needed by said financial planning system.

46. The financial planning system of claim 44 wherein said persistence system is configured to write data objects to said relational database management system only when said data objects have been modified.

47. The financial planning system of claim 44 wherein said persistence system is configured to maintain an object lookup table so that a data object exists in said relational database management system only once.

48. A method for simulating an economic group's financial position comprising the steps of:
providing economic group data, including demographic data and financial data, for said economic group;
providing at least one goal having at least one assumption needed to achieve said goal;
associating said economic group data for said economic group with said at least one goal and said at least one assumption;
analyzing said economic group's available financial resources with respect to fulfilling said at least one goal based upon said at least one assumption;
solving said at least one goal in an efficient order, accounting for any dependency of future goal upon prior goals, based upon said at least one assumption, said demographic data, and said financial data; and
processing at least one financial position for said economic group based upon a analysis of said available financial resources and in response to at least one hypothetical event or transaction.

49. The method of claim 48 wherein the step of providing a simulator further comprises the step of providing at least one event handler for processing transactions and financial events associated with a hypothetical occurrence of a particular event.

50. The method of claim 49 wherein said at least one event handler is a virtual executor for simulating modifications to said economic group's financial position resulting from a hypothetical death of a member of said economic group, and wherein said at least one goal includes probating an estate after said hypothetical death of said member.

51. The method of claim 50 wherein the step of providing a virtual executor further comprises at least one of the following steps:
projecting a death of a member of said economic group;
requesting data pertaining to said economic group;
receiving said data;
determining legal survivors and beneficiaries of said member;
paying necessary expenses from said estate;
determining and transferring to said simulator property amounts, net of said expenses and taxes, passing to said legal survivors and beneficiaries of said member;
projecting future financial needs of said legal survivors and beneficiaries; and
simulating disbursements of available financial resources by said legal survivors and beneficiaries until a hypothetical date.

52. The method of claim 51 wherein the step of determining and transferring further comprises at least one of the following steps:
compiling all assets and insurance policies included in said member's gross estate;
assigning values to includable assets;
determining a value for life insurance policies designating said member as an insured;
assigning said value of said life insurance policies to beneficiaries;
depositing said value of said life insurance policy into a hypothetical estate checking account;
probating said gross estate based upon terms and provisions of said member's will;
determining intestacy laws applicable to said member's estate;
determining community property laws applicable to said member's estate;
completing federal and state estate tax and inheritance tax returns;
calculating applicable inheritance taxes;
selling non-cash estate assets as needed to pay expenses;
distributing remaining property and outstanding debts secured by property to heirs and charities, pursuant to terms of said life insurance policies and terms and provisions of said member's will and trust documents;
distributing a virtual memo to beneficiaries responsible for any state inheritance taxes on a received inheritance;
distributing a virtual memo to trustees of trusts established by said member's will; and
indicating an amount of net property being deposited in trust on behalf of named beneficiaries according to terms of said trusts.

53. The method of claim 48 wherein the step of providing a simulator further comprises the step of providing a time value calculator for computing a present-day value for a simulated future financial position.

54. The method of claim 53 wherein the step of providing a time value calculator further comprises identifying a potential future financial shortage and calculating a present-day savings amount which would eliminate said potential future financial shortage.

55. The method of claim 48 wherein the step of providing a simulator further comprises the step of avoiding simulation of mutually exclusive hypothetical events or transactions.

56. The method of claim 48 further comprising the step of providing an earmarker for identifying specific economic group data with specific goals.

57. The method of claim 56 wherein the step of providing an earmarker further comprises the step of avoiding earmarking resources already earmarked for other current or future needs.

58. The method of claim 48 further comprising the step of providing a strategizer for comparing an economic group's current financial position with at least one alternative financial position.

59. The method of claim 58 wherein the step of providing a strategizer further comprises, in any order, the steps of:

copying said economic group's current financial position;

creating at least one alternative financial position by
(i) applying at least one strategy to a copy of said economic group's current financial position; and
(ii) requesting that said simulator process transactions over time using said at least one strategy and said copy of said economic group's current financial position;

comparing said current financial position to said at least one alternative financial position; and demonstrating an impact of said at least one strategy on an economic group's financial position.

60. The method of claim 59 wherein said at least one strategy includes modifying at least one data object selected from the group consisting of said economic group data, said goals, and said assumptions.

61. The method of claim 60 wherein said economic group data comprises at least one data object selected from the group consisting of demographic data and financial data.

62. The method of claim 48 further comprising the step of providing an output of an economic group's financial plan based upon an analysis of said economic group's financial position.

63. The method of claim 62 wherein said output of said economic group's financial plan is a document that provides a current financial plan and at least one alternative financial plan, and wherein said current financial plan is based upon an analysis of said economic group's financial position using current goals and assumptions and said at least one alternative financial plan is based upon an analysis of said economic group's financial position using modified goals and assumptions.

64. The method of claim 48 further comprising the steps of:
providing a persistence system;
providing a relational database management system;
retrieving data objects from said relational database management system;
loading said data objects onto said persistence system; and
writing said data objects to said relational database management system.

65. The method of claim 64 wherein said persistence system maintains an object lookup table so that a data object exists in said relational database management system only once.

66. The method of claim 64 wherein the step of writing further comprises writing said data objects to said relational database management system only when said data objects have been modified.

67. A method for simulating an economic group's financial position comprising the steps of:
providing economic group data for said economic group;
providing at least one goal having at least one assumption needed to achieve said goal;
associating said economic group data for said economic group with said at least one goal and said at least one assumption;
providing a simulator to analyze said economic group's available financial resources with respect to fulfilling said at least one goal based upon said at least one assumption and to process at least one financial position for said economic group based upon an analysis of said available financial resources and in response to at least one hypothetical event or transaction; and providing a virtual executor for simulating modifications to said economic group's financial position resulting from a hypothetical death of a member of said economic group, and wherein said at least one goal includes probating an estate after said hypothetical death of said member.

68. The method of claim 67 wherein the step of providing a virtual executor further comprises at least one of the following steps:
projecting a death of a member of said economic group;
requesting data pertaining to said economic group;
receiving said data;
determining legal survivors and beneficiaries of said member;
paying necessary expenses from said estate;
determining and transferring to said simulator property amounts, net of said expenses and taxes, passing to said legal survivors and beneficiaries of said member;
projecting future financial needs of said legal survivors and beneficiaries; and
simulating disbursements of available financial resources by said legal survivors and beneficiaries until a hypothetical date.

69. The method of claim 68 wherein the step of determining and transferring further comprises at least one of the following steps:
compiling all assets and insurance policies included in said member's gross estate;
assigning values to includable assets;
determining a value for life insurance policies designating said member as an insured;
assigning said value of said life insurance policies to beneficiaries;
depositing said value of said life insurance policy into a hypothetical estate checking account;
probating said gross estate based upon terms and provisions of said member's will;
determining intestacy laws applicable to said member's estate;
determining community property laws applicable to said member's estate;
completing federal and state estate tax and inheritance tax returns;
calculating applicable inheritance taxes;
selling non-cash estate assets as needed to pay expenses;
distributing remaining property and outstanding debts secured by property to heirs and charities, pursuant to terms of said life insurance policies and terms and provisions of said member's will and trust documents;
distributing a virtual memo to beneficiaries responsible for any state inheritance taxes on a received inheritance;
distributing a virtual memo to trustees of trusts established by said member's will; and
indicating an amount of net property being deposited in trust on behalf of named beneficiaries according to terms of said trusts.

70. The method of claim 67 wherein the step of providing a simulator further comprises the step of providing a time value calculator for computing a present-day value for a simulated future financial position.

71. The method of claim 70 wherein the step of providing a time value calculator further comprises identifying a potential future financial shortage and calculating a present-day savings amount which would eliminate said potential future financial shortage.

72. The method of claim 67 further comprising the step of providing an earmarker for identifying specific economic group data with specific goals.

73. The method of claim 72 wherein the step of providing an earmarker further comprises the step of avoiding earmarking resources already earmarked for other current or future needs.

74. The method of claim 67 further comprising the step of providing a strategizer for comparing an economic group's current financial position with at least one alternative financial position.

75. The method of claim 74 wherein the step of providing a strategizer further comprises, in any order, the steps of:

copying said economic group's current financial position;

creating at least one alternative financial position by
(i) applying at least one strategy to a copy of said economic group's current financial position; and
(ii) requesting that said simulator process transactions over time using said at least one strategy and said copy of said economic group's current financial position;

comparing said current financial position to said at least one alternative financial position; and demonstrating an impact of said at least one strategy on an economic group's financial position.

76. The method of claim 75 wherein said at least one strategy includes modifying at least one data object selected from the group consisting of said economic group data, said goals, and said assumptions.

77. The method of claim 67 further comprising the step of providing an output of an economic group's financial plan based upon an analysis of said economic group's financial position.

78. The method of claim 77 wherein said output of said economic group's financial plan is a document that provides a current financial plan and at least one alternative financial plan, and wherein said current financial plan is based upon an analysis of said economic group's financial position using current goals and assumptions and said at least one alternative financial plan is based upon an analysis of said economic group's financial position using modified goals and assumptions.

* * * * *